US011147405B2

(12) United States Patent
Stanley, Jr. et al.

(10) Patent No.: US 11,147,405 B2
(45) Date of Patent: *Oct. 19, 2021

(54) CABINET SYSTEM INCLUDING ACCESSORY

(71) Applicants: Robern, Inc., Bristol, PA (US); Kohler Co., Kohler, WI (US)

(72) Inventors: James L. Stanley, Jr., Levittown, PA (US); Howard Katz, Riegelsville, PA (US); Marwan Estiban, Thiensville, WI (US); James A. DeHope, Hatboro, PA (US); Travis Andren, Philadelphia, PA (US)

(73) Assignees: ROBERN, INC.; KOHLER CO.

( * ) Notice: Subject to any disclaimer, the term of this patent is extended or adjusted under 35 U.S.C. 154(b) by 0 days.

This patent is subject to a terminal disclaimer.

(21) Appl. No.: 16/774,677

(22) Filed: Jan. 28, 2020

(65) Prior Publication Data

US 2021/0228008 A1 Jul. 29, 2021

Related U.S. Application Data

(63) Continuation of application No. 15/377,715, filed on Dec. 13, 2016, now Pat. No. 10,582,769.

(Continued)

(51) Int. Cl.
*A47G 29/00* (2006.01)
*A47G 29/08* (2006.01)
(Continued)

(52) U.S. Cl.
CPC ............ *A47G 29/08* (2013.01); *A47B 67/005* (2013.01); *A47B 67/02* (2013.01); *G06F 1/1632* (2013.01);
(Continued)

(58) Field of Classification Search
CPC ........ A47G 29/08; A47B 67/005; A47B 67/02
(Continued)

(56) References Cited

U.S. PATENT DOCUMENTS 2,199,731 A * 5/1940 Pryne ...................... A47B 67/02
312/310
5,164,861 A * 11/1992 Katz ....................... A47B 46/00
312/227

(Continued)

FOREIGN PATENT DOCUMENTS

CN 201228941 4/2009
CN 201699678 1/2011
(Continued)

*Primary Examiner* — Alexander Talpalatski
(74) *Attorney, Agent, or Firm* — The Belles Group, P.C.

(57) ABSTRACT

A system that includes a cabinet and an accessory capable of being stored within a storage compartment of the cabinet. The cabinet may include a cabinet housing and a mirrored door having a ferromagnetic element. The mirrored door may include a first mirror having a reflective surface forming an outer surface of the mirrored door and a second mirror having a reflective surface forming an inner surface of the mirrored door. The ferromagnetic element may be embedded within the first and second mirrors. In an example the first ferromagnetic element may be an elongated plate formed of a ferromagnetic material. The accessory may include another ferromagnetic element that may include one or more magnets. The accessory may be sized and shaped to be capable of being stored within a storage compartment of the cabinet. The accessory may be mounted to the mirrored door by magnetic attraction between the ferromagnetic elements.

13 Claims, 40 Drawing Sheets

Related U.S. Application Data

(60) Provisional application No. 62/271,921, filed on Dec. 28, 2015.

(51) Int. Cl.
*A47B 67/02* (2006.01)
*A47B 67/00* (2006.01)
*H02J 7/00* (2006.01)
*G06F 1/16* (2006.01)

(52) U.S. Cl.
CPC .............. *G06F 1/1654* (2013.01); *H02J 7/00* (2013.01); *A47B 2220/0061* (2013.01); *A47B 2220/0091* (2013.01); *A47G 2200/10* (2013.01)

(58) Field of Classification Search
USPC ......................................................... 320/115
See application file for complete search history.

(56) References Cited

U.S. PATENT DOCUMENTS

| | | | | |
|---|---|---|---|---|
| 5,355,627 A * | 10/1994 | Katz | ...................... | A47B 81/00 312/227 |
| 5,947,304 A * | 9/1999 | Thorp | ...................... | B43L 1/04 211/69.5 |
| 6,089,685 A * | 7/2000 | Ryan | ...................... | A47B 67/04 312/291 |
| 6,666,875 B1 * | 12/2003 | Sakurai | .............. | A61B 17/1628 606/169 |
| 8,151,980 B2 * | 4/2012 | DeMartino | ............ | A47G 29/08 206/6.1 |
| 8,278,873 B2 * | 10/2012 | Smith | ..................... | H02J 50/10 320/108 |
| 9,211,004 B2 * | 12/2015 | Diemel, Jr. | ............. | A47B 67/02 |
| 9,675,172 B2 * | 6/2017 | Pandorf | ................. | A47B 67/02 |
| 9,934,366 B1 * | 4/2018 | Zanuzoski | ............. | G16H 20/13 |
| 2006/0119235 A1 * | 6/2006 | Aisley | .................... | A47B 47/00 312/242 |
| 2009/0199588 A1 * | 8/2009 | Laible | ................... | F16K 49/002 62/449 |
| 2009/0266901 A1 * | 10/2009 | Dine | ................ | G06K 19/06196 235/493 |
| 2009/0303701 A1 | 12/2009 | Sarmiento et al. | | |
| 2013/0235607 A1 | 9/2013 | Yang et al. | | |

FOREIGN PATENT DOCUMENTS

| | | |
|---|---|---|
| CN | 201943542 | 8/2011 |
| CN | 203073669 | 7/2013 |
| DE | 102004042929 | 3/2006 |
| KR | 1005442250000 | 1/2006 |

* cited by examiner

CABINET SYSTEM INCLUDING ACCESSORY

CROSS-REFERENCE TO RELATED PATENT APPLICATIONS

The present application is a continuation of U.S. patent application Ser. No. 15/377,715, filed Dec. 13, 2016, which claims the benefit of U.S. Provisional Patent Application No. 62/271,921, filed Dec. 28, 2015. The disclosures of the aforementioned priority applications are incorporated herein by reference in their entireties.

BACKGROUND

Cabinets are used for storage of personal belongings that are desired to be hidden from view. For example, medicine cabinets are typically hung from a wall in a bathroom so that a person can store medicine and personal hygiene tools in the cabinet out of sight from others. Frequently, medicine cabinets have a mirrored exterior surface so that the medicine cabinet can have the dual function of storing a person's personal items and enabling the person to use the mirror in a traditional manner. Cabinets of this type take up valuable wall space in a room without providing any functions, besides storage and mirror capabilities, that may be much-needed or desired in the room. Thus, a need exists for a cabinet that includes functionalities in addition to those traditionally provided.

BRIEF SUMMARY

The invention may be directed to a system that includes a cabinet and an accessory capable of being stored within a storage compartment of the cabinet. The cabinet may include a cabinet housing and a mirrored door having a ferromagnetic element. The mirrored door may include a first mirror having a reflective surface forming an outer surface of the mirrored door and a second mirror having a reflective surface forming an inner surface of the mirrored door. The ferromagnetic element may be embedded within the first and second mirrors. In an example the first ferromagnetic element may be an elongated plate formed of a ferromagnetic material. The accessory may include another ferromagnetic element that may include one or more magnets. The accessory may be sized and shaped to be capable of being stored within a storage compartment of the cabinet. The accessory may be mounted to the mirrored door by magnetic attraction between the ferromagnetic elements.

In an aspect, the invention may be a system comprising a cabinet and an accessory that is capable of being stored within a storage compartment of the cabinet. The cabinet may include a mirrored door having a ferromagnetic element. The accessory may include another ferromagnetic element. The accessory may be mounted to the door by magnetic attraction between the ferromagnetic elements. When the accessory is within the cabinet, it may be mounted to a charger so as to charge a power source of the accessory. In some embodiments, the accessory may be automatically transitioned into an active state when it is detected that the accessory is mounted to the door. The accessory may include a user-operated actuator that can cause the accessory circuit to operate according to a first routine when the accessory is mounted to the door and a second routine when the accessory is not mounted to the door.

In an aspect, the invention may be a system comprising a cabinet comprising: a cabinet housing; and a mirrored door coupled to the cabinet housing to form a cabinet storage compartment, the mirrored door comprising a first ferromagnetic element; and an accessory sized and shaped to be capable of being stored within the storage compartment of the cabinet, the accessory comprising a second ferromagnetic element; wherein the accessory can be mounted to the mirrored door by magnetic attraction between the first and second ferromagnetic elements.

In another aspect, the invention may be a system comprising a cabinet comprising: a cabinet housing; a door coupled to the cabinet housing to form a cabinet storage compartment, the cabinet storage compartment having a first depth measured from a rear surface of the cabinet housing and an inner surface of the door; a support member within the cabinet storage compartment, the support member having a front surface; and a power supply circuit; a charger mounted to the front surface of the support member, the charger comprising a charging circuit in operable cooperation with the power supply circuit; and an accessory comprising an accessory circuit comprising, in operable cooperation, a power source and a user perceptible signal generator; the accessory alterable between: (1) a charging state in which the accessory is mounted to the charger and the charging circuit provides power to the power source; and (2) a use state in which the accessory is decoupled from the charger; and wherein, in the charging state, the support member, the charger and the accessory are arranged in a horizontal stack having a cumulative depth that is less than or equal to the first depth.

In yet another aspect, the invention may be a system comprising a cabinet comprising: a cabinet housing; a door coupled to the cabinet housing to form a cabinet storage compartment, the cabinet storage compartment having a first depth measured from a rear surface of the cabinet housing to an inner surface of the door; a support member within the cabinet storage compartment, the support member having a front surface; and a power supply circuit; a docking station mounted to the front surface of the support member; and an accessory comprising a mirror; the accessory alterable between: (1) a docked state in which the accessory is mounted to the docking station; and (2) a use state in which the accessory is decoupled from the docking station; and wherein, in the docked state, the support member, the docking station and the accessory are arranged in a horizontal stack having a cumulative depth that is less than or equal to the first depth.

In a further aspect, the invention may be a system comprising a cabinet comprising: a cabinet housing; a door coupled to the cabinet housing to form a cabinet storage compartment; a support member mounted in the cabinet storage compartment, the support member having a front surface having a first mounting element; an apparatus comprising: a second mounting element; a locking element alterable between: (1) an unlocked state in which the second mounting element of the apparatus can be coupled and decoupled from the first mounting element of the support member of the cabinet; and (2) a locked state in which the second mounting element of the apparatus is prohibited from being decoupled from the first mounting element of the support member.

In a still further aspect, the invention may be a system comprising a cabinet comprising: a cabinet housing; a door coupled to the cabinet housing to form a cabinet storage compartment; and a power supply circuit; a charger mounted within the cabinet storage compartment, the charger comprising: a charger housing; and a charging circuit in operable cooperation with the power supply circuit, the charging circuit comprising an inductive element; and an accessory comprising an accessory circuit comprising, in operable cooperation, an inductive element, a power source, and a user perceptible signal generator; wherein the charger and the accessory are configured so that the accessory can be mounted to the charger in a first rotational orientation and a second rotational orientation, the inductive element of the accessory being in operable cooperation with the inductive element of the charger irrespective of whether the accessory is mounted to the charger in the first or second rotational orientations.

In yet another aspect, the invention may be a system comprising a support structure; an accessory comprising: an accessory housing; and an accessory circuit including, in operable cooperation, a user perceptible signal generator, a power source, and a sensor element configured to detect when the accessory is mounted to the support structure, the accessory circuit configured to automatically transition the circuit from an inactive state to an active state upon the sensor element detecting that the accessory is mounted to the support structure, the user perceptible signal generator generating a user perceptible signal when the accessory circuit is in the active state.

In another aspect, the invention may be a system comprising a support structure; an accessory comprising: a user-operated actuator; an accessory circuit including, in operable cooperation, a light source, a power source, and a sensor element; the sensor element configured to detect whether the accessory is (a) in a mounted state in which the accessory is mounted to the support structure, or (b) in a non-mounted state in which the accessory is not mounted to the support structure; wherein in the mounted state, actuation of the user-operated actuator causes the accessory circuit to operate according to a first routine; and wherein in the non-mounted state, actuation of the user-operated actuator causes the accessory circuit to operate according to a second routine, the first routine being different from the second routine.

In another aspect, the invention may be a method or system for determining whether an accessory is mounted to a support structure, the method comprising mounting an accessory to a support structure; measuring, by a sensor, a parameter associated with the accessory or the support structure a predetermined number of times; determining a lowest measured parameter value; determining a high and a low threshold of a detection range based on the lowest measured parameter value; subsequently measuring, by the sensor, the parameter associated with the accessory or the support structure; and determining that the accessory is mounted to the support structure by determining that the subsequent parameter measurement is within the detection range. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
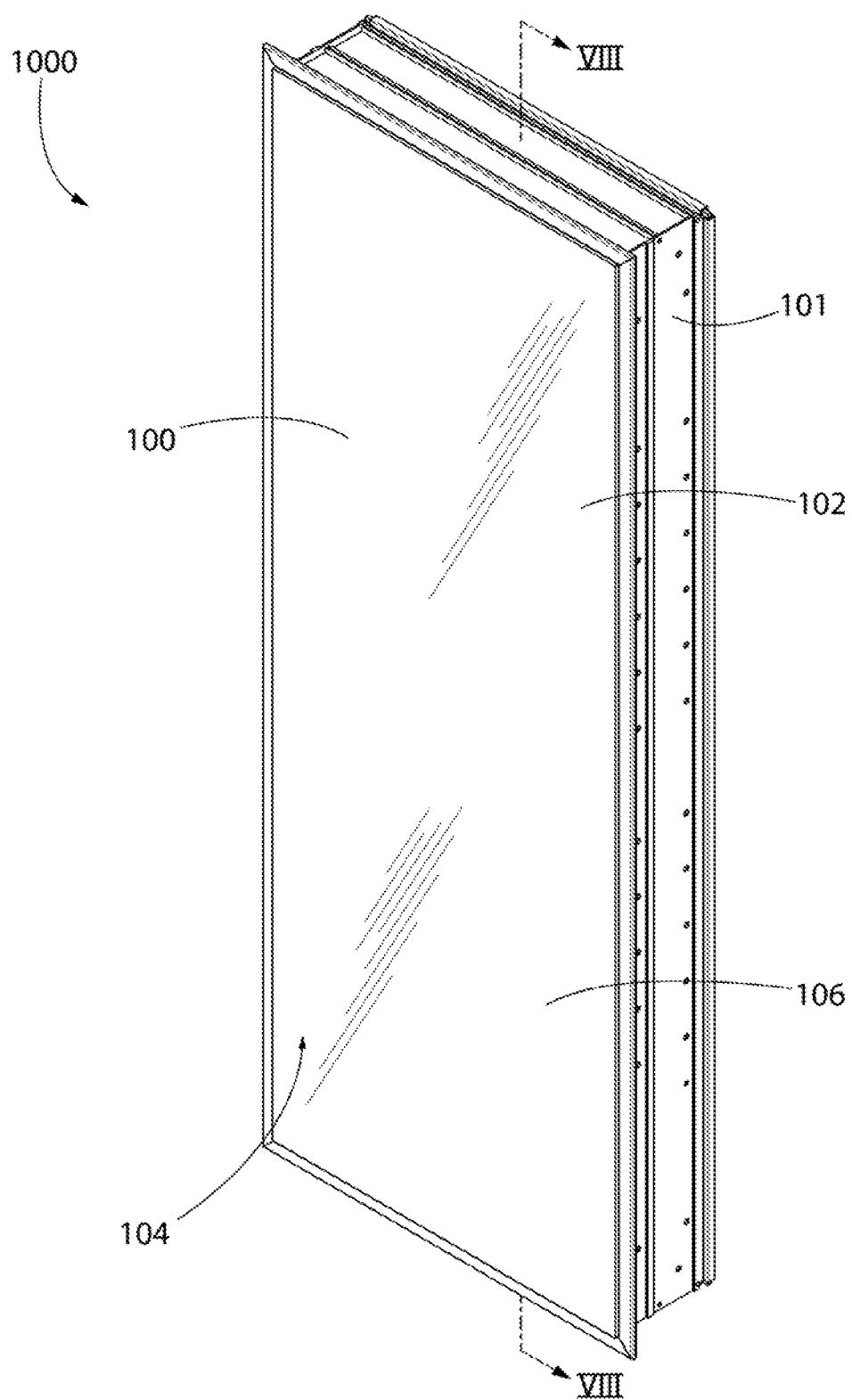
FIG. 1 is a front perspective view of a cabinet in accordance with an embodiment of the present invention with a door in a close state.

The following description of the preferred embodiment(s) is merely exemplary in nature and is in no way intended to limit the invention, its application, or uses. The description of illustrative embodiments according to principles of the present invention is intended to be read in connection with the accompanying drawings, which are to be considered part of the entire written description. In the description of the exemplary embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and similar refer to a relationship wherein structures are secured or attached to one another either directly or indirectly through intervening structures, as well as both movable or rigid attachments or relationships, unless expressly described otherwise. Moreover, the features and benefits of the invention are described by reference to the exemplary embodiments illustrated herein. Accordingly, the invention expressly should not be limited to such exemplary embodiments, even if indicated as being preferred. The discussion herein describes and illustrates some possible non-limiting combinations of features that may exist alone or in other combinations of features. The scope of the invention is defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Figure 2:
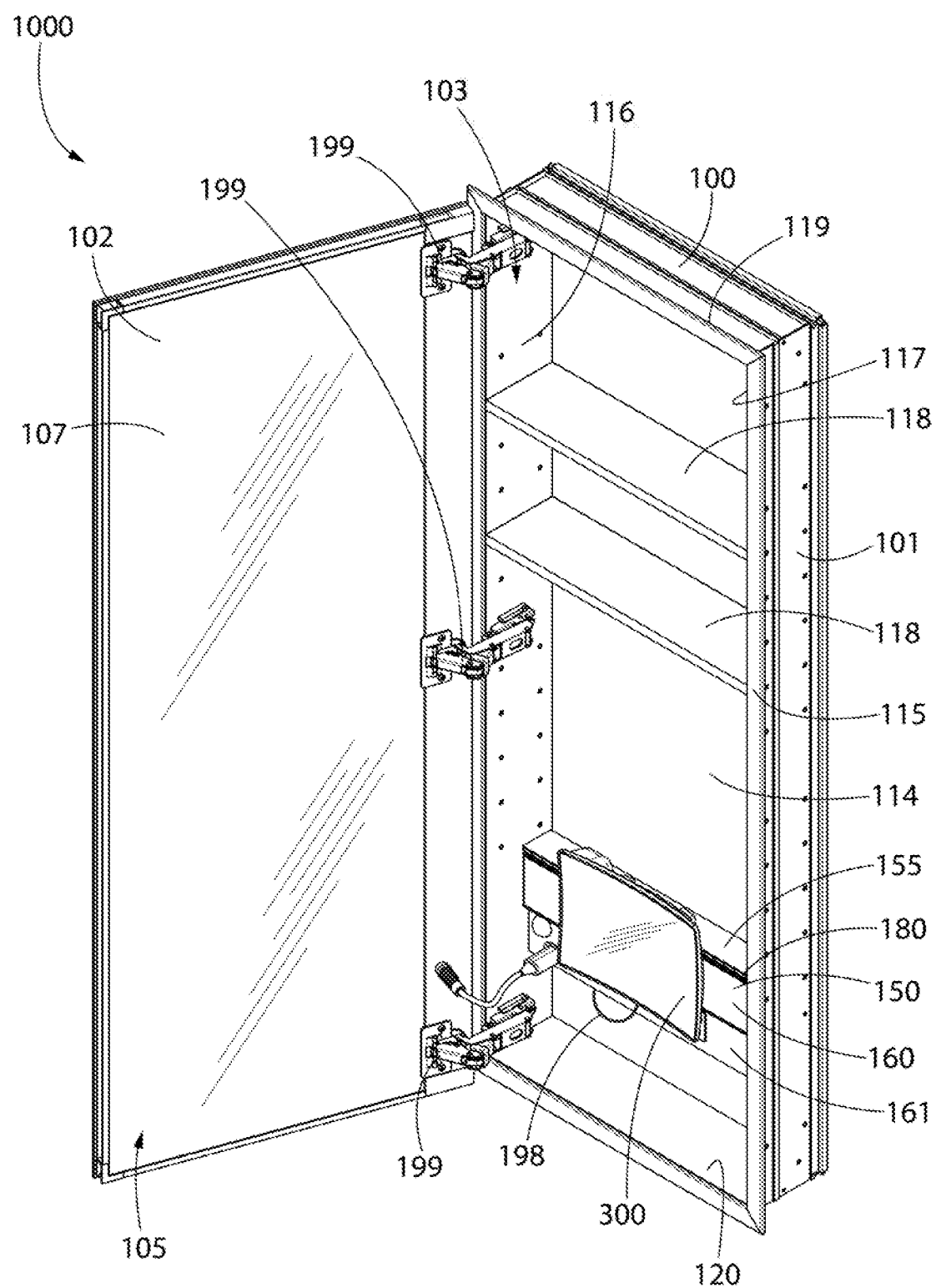
FIG. 2 is a front perspective view of the cabinet of FIG. 1 with the door in an open state and an accessory coupled to a charger.
Figure 3:
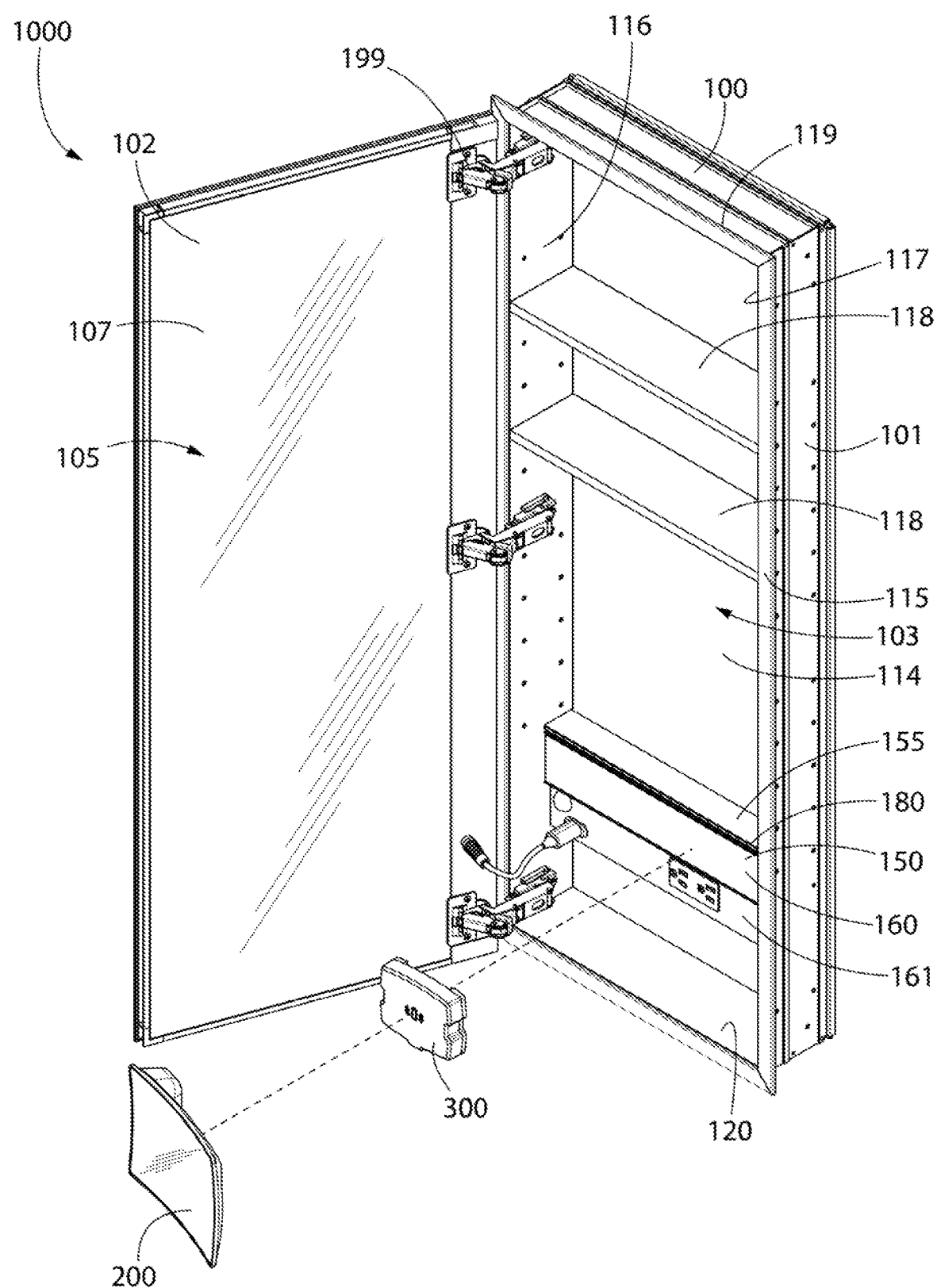
FIG. 3 is a front perspective view of the cabinet of FIG. 2 with the charger and the accessory exploded.

Referring first to FIGS. 1-3 concurrently, a system 1000 comprising a cabinet 100, a charger 200 (also referred to herein as a docking station), and an accessory 300 is illustrated in accordance with an embodiment of the present application. In certain embodiments, one of the charger 200 and the accessory 300 may be referred to herein as an apparatus. The cabinet 100 generally comprises a cabinet housing 101 and a door 102 coupled to the cabinet housing 101. The door 102 is pivotably coupled to the cabinet housing 101 by one or more hinges 199 that permit the door 102 to open and close relative to the cabinet housing 101 in a conventional manner. Three hinges 199 are illustrated, but more or less may be used in alternative embodiments. The door 102 is illustrated in a closed state in FIG. 1 and in an open state in FIG. 2. The cabinet housing 101 and the door 102 collectively form a cabinet storage compartment 103. In some embodiments the cabinet 100 may be used as a bathroom cabinet or a medicine cabinet to store items that are typically used in the bathroom, such as a toothbrush, toothpaste, contact lenses, feminine hygiene products, deodorant, medicine, or the like. Of course, other uses for the cabinet 100 are possible and within the scope of this application.

The cabinet housing 101 comprises a rear surface 114, a first wall having a first side surface 116 extending from the rear surface 114 to a front edge 115, a second wall having a second side surface 117 extending from the rear surface 114 to the front edge 115, a top wall 119 and a bottom wall 120 extending from the top and bottom of the rear surface 114. The rear surface 114, the first and second side surfaces 116, 117, and the top and bottom walls 119, 120, collectively with the door 102, define the cabinet storage compartment 103. In the exemplified embodiment several shelves 118 are positioned within the cabinet storage compartment 103. The shelves 118 may be adjustable such that they can be positioned at varying locations within the cabinet storage compartment 103.

The door 102 comprises an outer surface 104 that is exposed when the door 102 is in the closed state and an inner surface 105 that is only exposed when the door 102 is in the open state. The outer surface 104 of the door 102 may also be exposed when the door 102 is in the open state. In certain embodiments, the door 102 may be a mirrored door such that one or both of the outer and inner surfaces 104, 105 of the door 102 are mirrored surfaces. Specifically, the door 102 comprises a first mirror 106 having a reflective surface forming the outer surface 104 of the door 102 and a second mirror 107 having a reflective surface forming the inner surface 105 of the door 102. Of course, the invention is not to be so limited in all embodiments and in certain other embodiments one or both of the inner and outer surfaces 104, 105 of the door 102 may not be mirrored or reflective surfaces.

Figure 5:
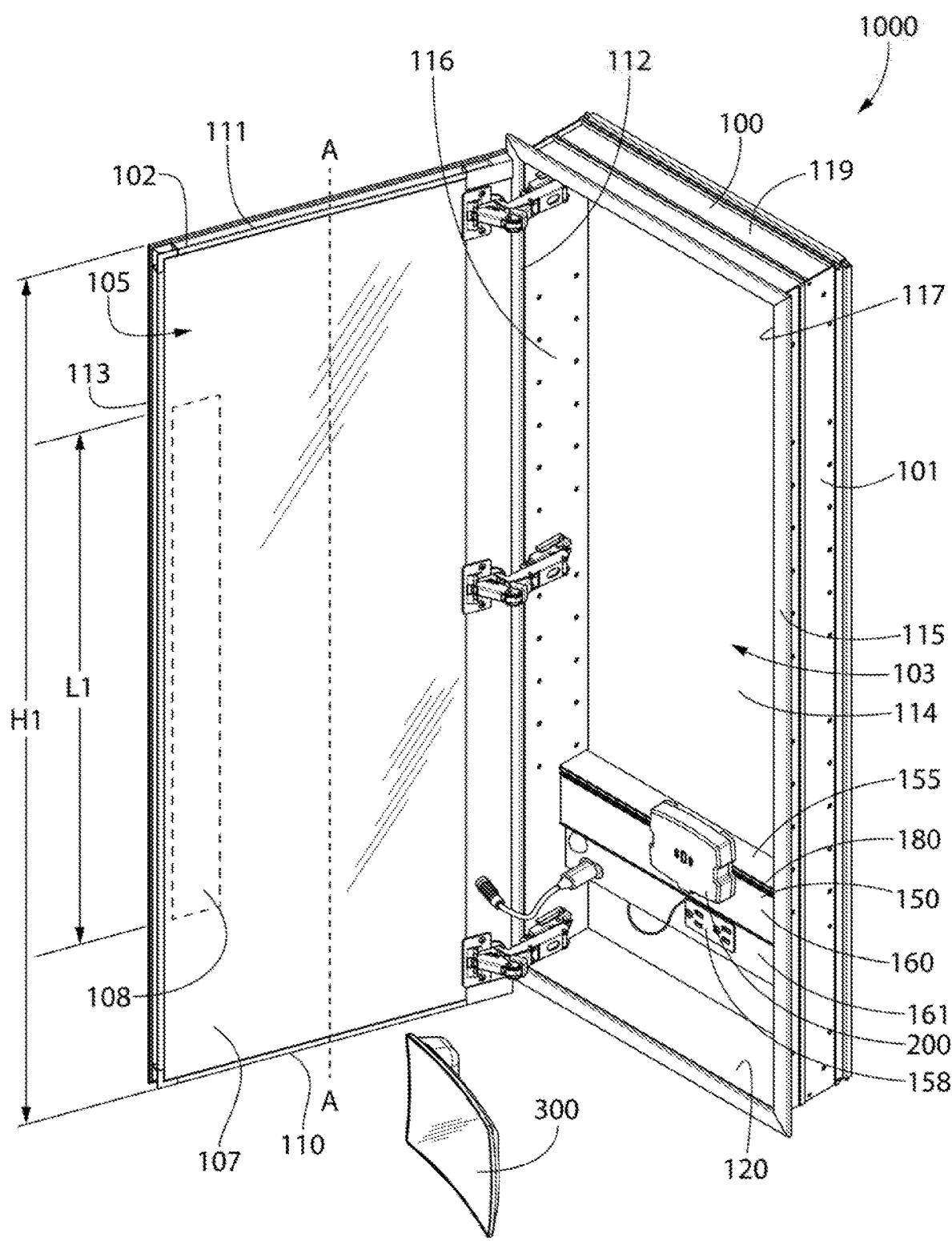
FIG. 5 is a front perspective view of the cabinet of FIG. 2 illustrating a ferromagnetic element on the door in dashed lines and the accessory detached from the charger.
Figure 7:
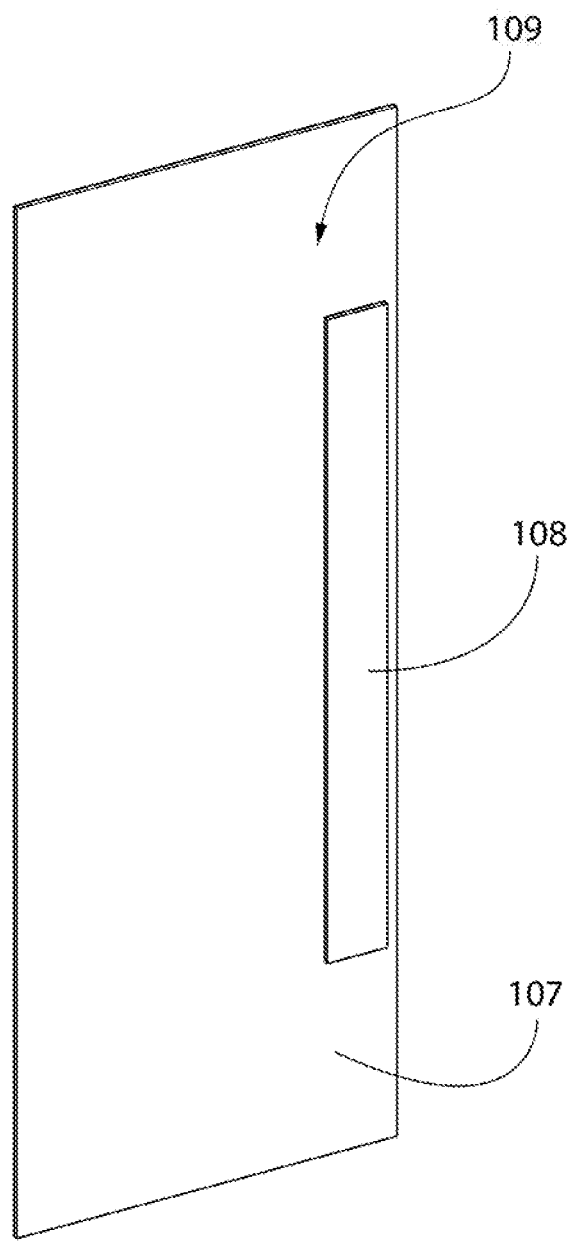
FIG. 7 is a rear view of a rear surface of a mirror of the cabinet of FIG. 1 with the ferromagnetic element coupled thereto.

Referring briefly to FIGS. 2, 5, and 7, in the exemplified embodiment the door 102 comprises a first ferromagnetic element 108 (illustrated in dotted lines in FIG. 5 and solid lines in FIG. 7). The first ferromagnetic element 108 may be any type of element that has a high susceptibility to magnetization. For example, in the exemplified embodiment the first ferromagnetic element 108 is an elongated plate formed of a ferromagnetic material including a ferromagnetic metal such as iron, nickel, cobalt, alloys thereof, and the like. The first ferromagnetic element 108 may alternatively be one or more magnets or an elongated plate (formed of any material, include plastic or the like) having one or more magnets coupled thereto. The first ferromagnetic element 108 may be a collection of magnets, ferromagnetic metals, or the like that are capable of magnetically coupling to a second ferromagnetic element of the accessory 300 as discussed in more detail below. Furthermore, in some embodiments the first ferromagnetic element 108 may be omitted and the accessory 300 may be coupled to the door 102 in other ways such as suction cups, hook-and-loop, adhesion, fasteners, or the like.

In the exemplified embodiment, the first ferromagnetic element 108 is embedded within the door 102 such that it is not exposed on the inner or outer surfaces 104, 105 of the door 102. Rather, in the exemplified embodiment the first ferromagnetic element 108 is located entirely between the first and second mirrors 106, 107 and within a cavity of the door 102. More specifically, in the exemplified embodiment the first ferromagnetic element 108 is coupled directly to a rear surface 109 of the second mirror 107 that is opposite the exposed reflective surface of the second mirror 107 that forms the inner surface 105 of the door 102. The first ferromagnetic element 108 may be coupled to the rear surface 109 of the second mirror 107 using any desired technique, including fasteners, screws, nails, adhesive, hook-and-loop, mechanical interaction, or the like. Although the first ferromagnetic element 108 is coupled to the rear surface 109 of the second mirror 107 in the exemplified embodiment, in other embodiments the first ferromagnetic element 108 may be coupled directly to the inner and/or outer surface 104, 105 of the door 102 such that the ferromagnetic element 108 is visible and exposed. Furthermore, although the first ferromagnetic element 108 is located on the second mirror 108 that forms the inner surface 105 of the door 102 in the exemplified embodiment, in other embodiments the first ferromagnetic element 108 may be positioned at other locations along the cabinet 100.

In the exemplified embodiment, the door 102 has a height H1 measured between a bottom edge 110 of the door 102 and a top edge 111 of the door 102. Furthermore, as noted above the first ferromagnetic element 108 is an elongated plate having a length L1. In the exemplified embodiment, the length L1 extends along a majority of the height H1 of the door 102. More specifically, a ratio of the height H1 of the door 102 to the length L1 of the elongated plate may be between 1.1:1 and 1.9:1, and more specifically between 1.4:1 and 1.8:1. Of course, the length L1 of the elongated plate may extend along less than half of the height H1 of the door 102 in other embodiments or along the entire height H1 of the door 102 in still other embodiments. Having the elongated plate extend along a majority of the height H1 of the door 102 provides more mounting locations for the accessory 300 along the elongated plate and the door 102 as discussed in more detail below.

In the exemplified embodiment, the first ferromagnetic element 108 is located closer to the free edge of the door 102 than to the edge of the door 102 that is coupled to the cabinet housing 101. Specifically, in the exemplified embodiment, the door 102 comprises a pivot edge 112 that is coupled to the cabinet housing 101, a free edge 113 that is not coupled to the cabinet housing 101, and a vertical centerline A-A dividing the door 102 into a first half comprising the pivot edge 112 and a second half comprising the free edge 113. In the exemplified embodiment, the first ferromagnetic element 108 is located in the second half of the door 102 between the vertical centerline A-A and the free edge 113 of the door 102. More specifically, the first ferromagnetic element 108 may be located adjacent to and may extend along the free edge 113 of the door 102. In the exemplified embodiment, the first ferromagnetic element 108 is elongated along the free edge 113 of the door 102 in the direction of the vertical centerline A-A of the door 102. The first ferromagnetic element 108 may alternatively be elongated along the pivot edge 112 or along one of the top or bottom edges of the door 102. As noted above, although the first ferromagnetic element 108 is depicted on the inner surface 105 of the door 102 in the exemplified embodiment, it may be on the outer surface 104 of the door 102 in other embodiments.

Figure 13:
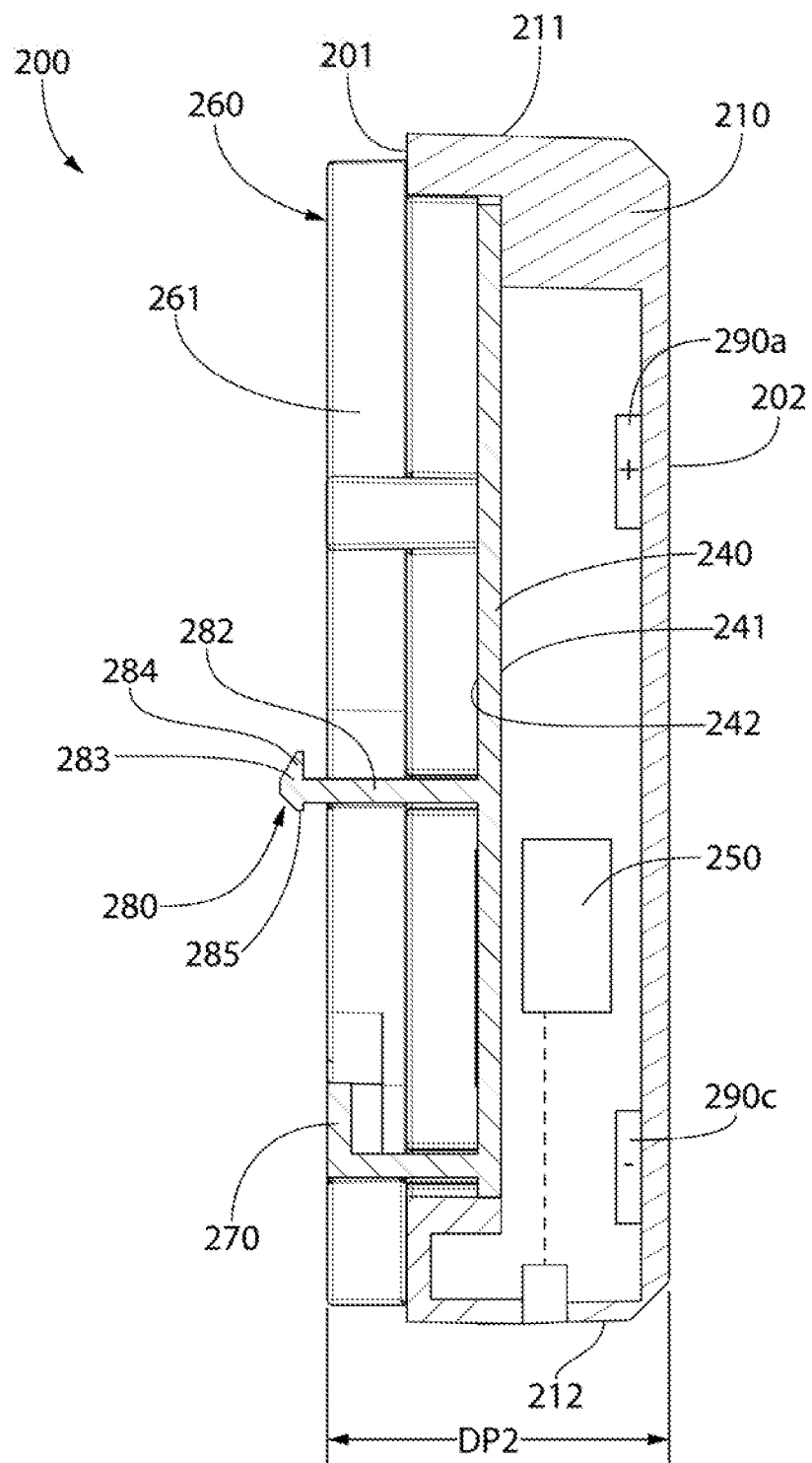
FIG. 13 is a cross-sectional view taken along line XIII-XIII of FIG. 9.

Referring to FIGS. 2-6 and 8, the system 1000 will be further described. As discussed above, the system 1000 comprises, in addition to the cabinet 100, a support member 150 (also referred to herein as a shelf), the charger 200, and the accessory 300. In certain embodiments the support member 150 may be considered to form a part of the cabinet 100. The support member 150 is located within and may be mounted within the cabinet storage compartment 103 of the cabinet housing 101. The cabinet 100 comprises a power supply circuit 157 (FIG. 8) that provides power to a charging circuit 250 (FIG. 13) of the charger 200 when those two components are operably coupled together, although the charger 200 may be omitted in some embodiments as discussed below. In the exemplified embodiment, the charging circuit 250 of the charger 200 in turn supplies power to a power source of the accessory 300 when those two components are operably coupled together. The details of the coupling between the physical components and the electrical components thereof will be described in more detail below. As noted above, in some embodiments the charger 200 may be a docking station. In such embodiments, the docking station may not provide power to the accessory 300, but may simply be used to dock the accessory 300 within the cabinet storage compartment 103. Furthermore, it should be appreciated, and will be discussed in more detail below, that the charger 200 may be omitted in some embodiments such that the apparatus 300 may be coupled directly to the support member 150 and to the power supply circuit 157 to supply power to the power source of the accessory 300.

The support member 150 comprises a front surface 151 and a rear surface 152. The support member 150 is positioned within or mounted to the cabinet housing 101 so that the rear surface 152 of the support member 150 is adjacent to (and in some embodiments in surface contact with) the rear surface 114 of the cabinet housing 101. Furthermore, the support member 150 may comprise a top surface 162 that forms a shelf so that objects stored within the support member 150 may be positioned thereon. In certain embodiments, the entire support member 150 is referred to herein as a shelf. The support member 150 also comprises a bottom surface 163 opposite the top surface 162. The front surface 151 of the support member 150 extends from the bottom surface 163 of the support member 150 to the top surface 152 of the support member 150. Furthermore, the support member 150 extends the entire distance between the first side surface 116 of the cabinet housing 101 and the second side surface 117 of the cabinet housing 101. In other embodiments the support member 150 may extend part of, rather than the entirety of, the distance between the first and second side surfaces 116, 117 of the cabinet housing 101 without losing any of the functionality described herein.

The support member 150 comprises a support member housing 155 that defines a cavity 156, and the power supply circuit 157 is positioned within the cavity 156 of the support member housing 155. Thus, the support member 150 includes the necessary circuitry to enable the support member 150 to provide power to the charging circuit 250 of the charger 200, which in turn charges or powers the power source of the accessory 300 when the accessory is in a charging state as described in more detail below. The power supply circuit 157 may comprise a direct current power outlet 159 and/or an alternating current power outlet 158, which may be integrated into the support member 150.

In the exemplified embodiment, the front surface 151 of the support member 150 is generally vertically oriented. More specifically, the front surface 151 of the support member 150 may be a stepped surface comprising a first riser surface 160 and a second riser surface 161. As shown, the second riser surface 161 may be horizontally offset from the first riser surface 160 toward the rear surface 114 of the cabinet housing 101. The charger 200 may mount to the support member 150 at the first riser surface 160 and at least one, or both, of the DC and AC power outlets 158, 159 may be located on the second riser surface 161. In the exemplified embodiment the DC power outlet 159 is more specifically located on a bottom surface 163 of the support member 150 and the AC power outlet 158 is located on the second riser surface 161 of the front surface 151 of the support member 150.

Figure 4:
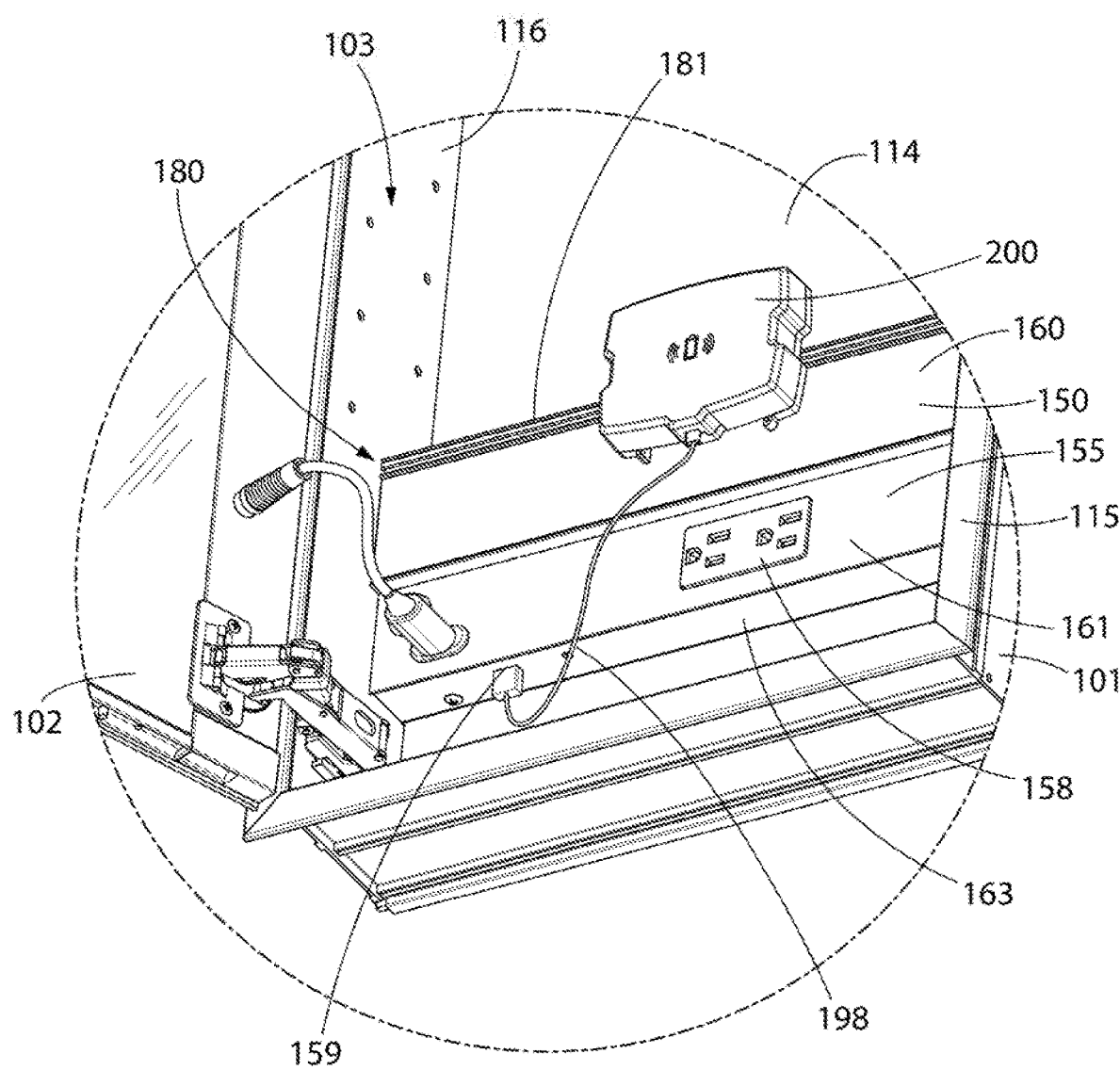
FIG. 4 is a close-up view of a portion of a cabinet storage compartment of the cabinet of FIG. 2.
Figure 8:
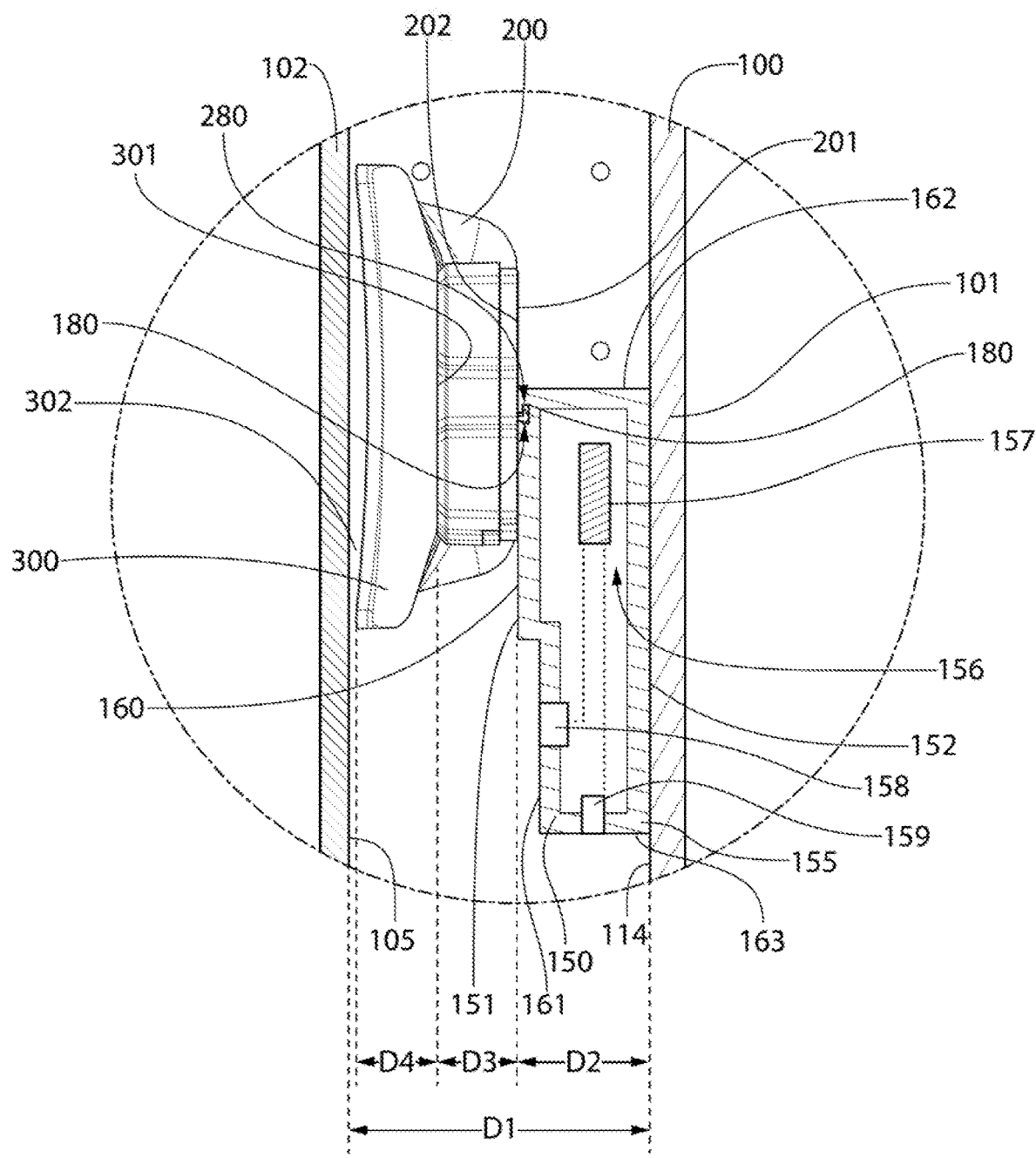
FIG. 8 is a cross-sectional view taken along line VIII-VIII of FIG. 1.
Figure 9:
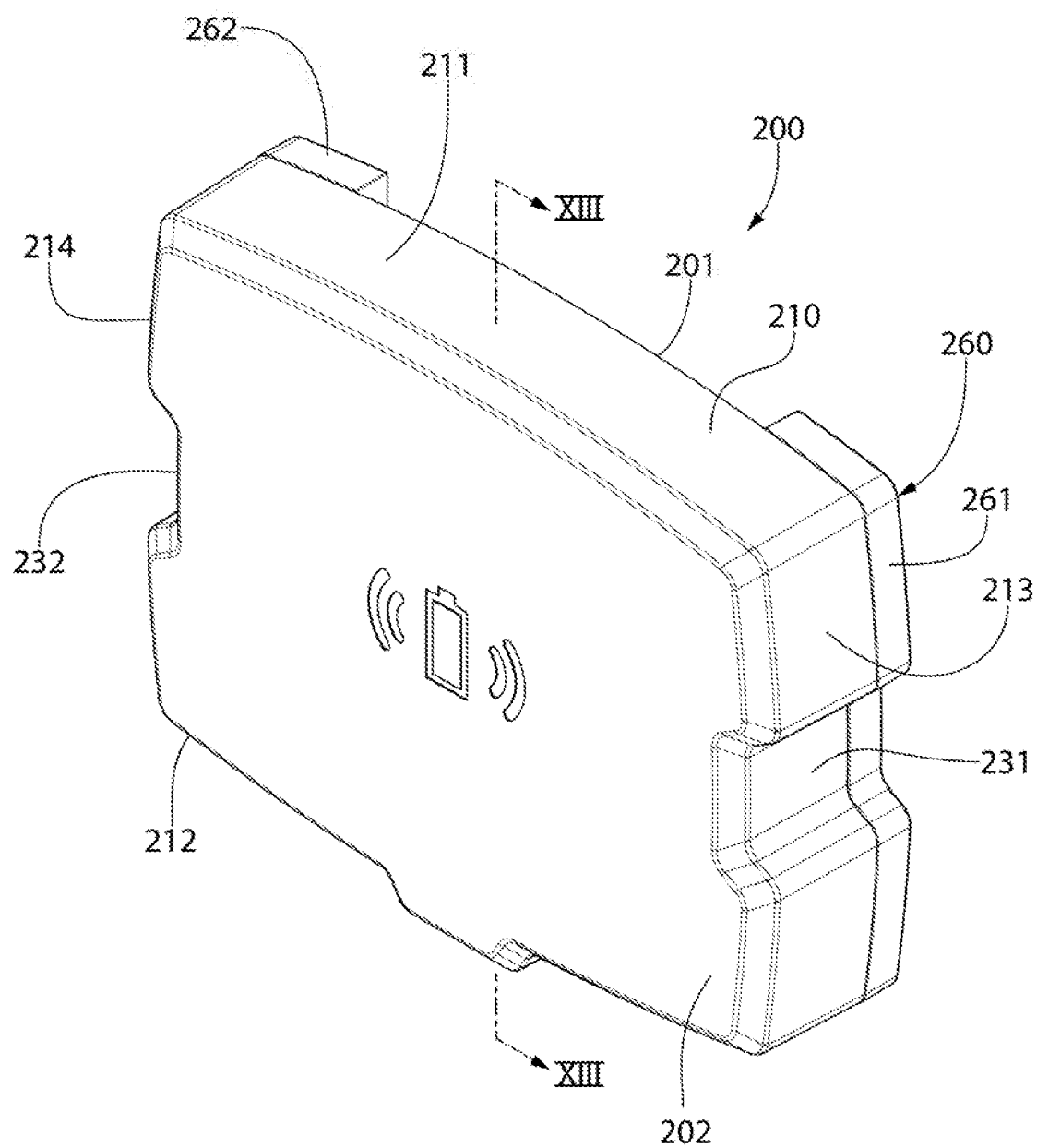
FIG. 9 is a front perspective view of a charger in accordance with an embodiment of the present invention.
Figure 15:
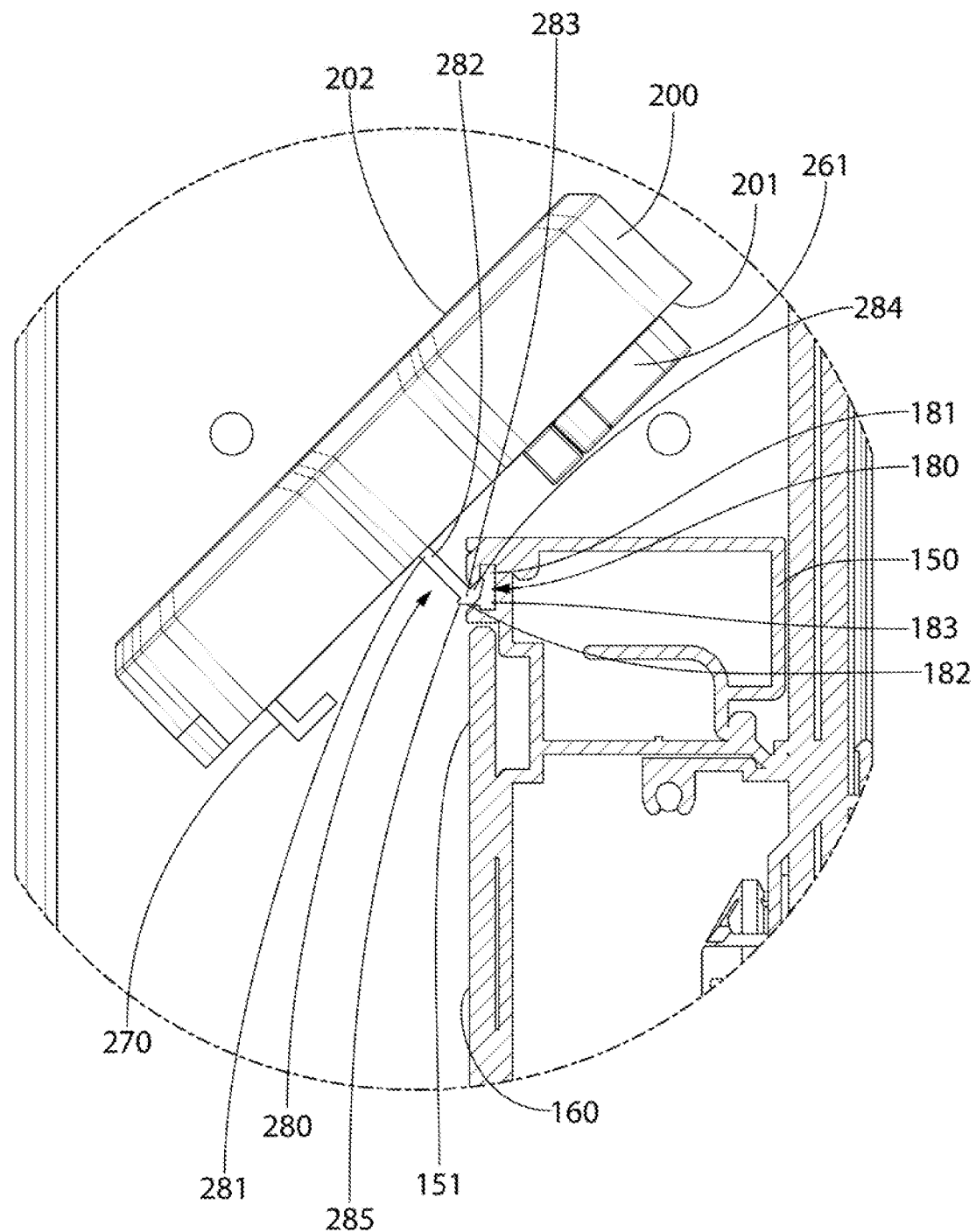
FIG. 15 is a side view of FIG. 14.

Referring to FIGS. 4, 8, and 15, the support member 150 also comprises a first mounting element 180 (also labeled in FIGS. 2, 3, 5, and 6 for clarity of understanding). The first mounting element 180 provides the location at which the charger 200 (or docking station) may be coupled to the support member 150. In the exemplified embodiment, the first mounting element 180 of the support member 150 is located on the front surface 151, and more specifically on the first riser surface 160 of the support member 150.

In the exemplified embodiment, the first mounting element 180 is a groove 181. However, the invention is not to be so limited in all embodiments and in other embodiments the first mounting element 180 may be a protuberance. Specifically, the first mounting element 180 of the support member 150 mates with a second mounting element 280 of the charger 200 (see FIGS. 8 and 15). In the exemplified embodiment the first mounting element 180 is the groove 181 and the second mounting element 280 is a protuberance 281 that mates with the groove 181. However, in other embodiments the first mounting element 180 of the support member 150 may be a protuberance and the second mounting element 280 of the charger 200 may be a groove that mates with the protuberance of the support member 150. Thus, the first mounting element 180 of the support member 150 may be one of a protuberance and a groove and the second mounting element 280 of the charger 200 (or docking station or other apparatus) is the other one of a protuberance and a groove, the protuberance or the groove of the first mounting element 180 of the support member 150 cooperatively mating with the protuberance or the groove of the second mounting element 280 of the charger 200 (or docking station or other apparatus) to couple the charger 200 (or docking station or other apparatus) to the support member 150.

Returning to the exemplified embodiment of the first mounting element 180 of the support member 150, the first mounting element 180 is the groove 181 comprising an entry section 182 and a nesting section 183. In the exemplified embodiment, the groove 181 is an elongated groove that extends the entire length of the support member 150 between the opposing sides of the support member 150 at a location adjacent the top surface 162 of the support member 150. Of course, the invention is not to be so limited in all embodiments and the groove 181 may be elongated without extending the entire length of the support member 150. The entry section 182 of the groove 181 forms a narrowed passageway into the nesting section 183 of the groove 181. Stated another way, the entry section 182 of the groove 181 has a cross-sectional area that is less than the cross-sectional area of the nesting section 183 of the groove 181. This structure/shape of the groove 181 requires that a specific technique, which will be described in more detail below with reference to FIGS. 14-19, be used in order to couple the charger 200 to the support member 150.

The charger 200 is mechanically coupled to the support member 150 in a manner that will be described in more detail below with specific reference to FIGS. 14-19. It is worth noting that the charger 200 is coupled to the support member 150 in such a manner that no portion of the charger 200 protrudes beyond the first riser 160 so as to overlie the second riser 161. Thus, the charger 200 is coupled to the first riser 160 of the support member 150 and does not extend into the region of the second riser 161. Stated another way, there is no axis extending perpendicular to the front and rear surfaces 151, 152 of the support member 150 that intersects both the charger 200 and the second riser 161. In the exemplified embodiment, the charger 200 extends/protrudes above the top surface 162 of the support member 150, although this is not required in all embodiments.

In the exemplified embodiment, the charger 200 is operably coupled to the DC power outlet 159 of the support member 150 via a cable 198 so that power from the power supply circuit 157 can be provided to the charging circuit 250. The cable 198 plugs into the DC power outlet 159 at one end and into a port on the charger 200 at the other end. Although described and illustrated herein with the charger 200 powered by the DC power outlet 159, the invention is not to be so limited in all embodiments and the charger 200 may be operably coupled to the AC power outlet 158 to provide power to the charging circuit 250. Alternatively, inductive power transmission, other wireless power transmission, or any other type of power transmission may be used to provide power from the power supply circuit 157 of the support member 150 to the charging circuit 250 of the charger 200. Whichever of the DC and AC power outlets 158, 159 is not being used by the charger 200 may be available for charging another device, such as a cell phone, a hair dryer, a hair straightener, a charger for an electric toothbrush, or the like. Power may be provided to the power supply circuit 157 via an operable connection to a power source such as an AC wall socket or the like that is not illustrated in the figures provided herewith but would be readily understood by persons skilled in the art.

The support member 150 may be fixedly coupled to the cabinet housing 101 or it may be removable. As noted above, the rear surface 152 of the support member 150 is positioned adjacent to and in some embodiments in surface contact with the rear surface 114 of the cabinet housing 101. The charger 200 comprises a rear surface 201 and an opposite front surface 202. The charger 200 is coupled to the support member 150 so that the rear surface 202 of the charger 200 is adjacent to the front surface 151 of the support member 150. The manner in which the charger 200 is coupled to the support member 150 will be described in greater detail below. The accessory 300 comprises a rear surface 301 and an opposite front surface 302. The accessory 300 is coupled to the charger 200 so that the rear surface 301 of the accessory 300 is adjacent to the front surface 202 of the charger 200. The manner in which the accessory 300 may be coupled to the charger 200 will be described in greater detail below.

The accessory 300 is sized and shaped to be capable of being stored within the storage compartment 103 of the cabinet 100 even with the door 102 in the closed state. More specifically, the accessory 300, the charger 200, and the support member 150 can be stored within the storage compartment 103 of the cabinet 100. Specifically, the cabinet storage compartment 103 has a first depth D1 measured from the rear surface 114 of the storage compartment 103 to the inner surface 105 of the door 102 when the door 102 is closed or to the front edge 115 of the storage compartment 103. The shelf has a second depth D2 measured from the rear surface 114 of the cabinet housing 101 (or form the rear surface 152 of the support member 150) to the front surface 151 of the support member 150. The charger 200 has a third depth D3 measured from the rear surface 201 of the charger 200 to the front surface 202 of the charger 200. The accessory 300 has a fourth depth D4 measured from the rear surface 301 of the accessory 300 to the front surface 302 of the accessory 302. The charger 200 and the accessory 300 may be arranged in a horizontal stack within the cabinet storage compartment 103 such that the horizontal stack has a cumulative depth that is equal to or less than the first depth D1 of the cabinet storage compartment 103. Stated another way, a summation of the second, third, and fourth depths D2, D3, D4 of the support member 150, the charger 200, and the accessory 300 is less than or equal to the first depth D1 of the cabinet storage compartment 103. Thus, the support member 150, the charger 200, and the accessory 300 are positioned within the cabinet storage compartment 103 in a stacked arrangement as shown in FIG. 8 such that the collective depths D2, D3, D4 of the support member 150, the charger 200, and the accessory 300 must be equal to or less than the depth D1 of the cabinet storage compartment 103 in order to enable the support member 150, the charger 200, and the accessory 300 to be positioned together within the cabinet storage compartment 103 with the door 102 in the closed state.

Referring to FIGS. 2-6 concurrently, the functionality and use of the accessory 300, and its corresponding placement or positioning relative to the cabinet 100, will be described. More specific details regarding the manner in which the accessory 300 is coupled to various parts of the cabinet 100 will be described below after a detailed description of the accessory 300 is provided. In FIG. 2, the accessory 300 is illustrated in a charging state in which the accessory 300 is mounted to the charger 200 and the charger 200 provides power to the accessory 300. Specifically, in FIG. 2 the charger 200 is coupled to the support member 150 and the accessory 300 is coupled to the charger 200. The details of the electronic components of the charger 200 and the accessory 300 and the interaction and functionality of those electronic components will be discussed in more detail below. The current description is intended to provide an overview of the positioning and use of the accessory 300 without going into great detail, which will instead be provided later on in this document.

In the exemplified embodiment, the accessory 300 is coupled to the charger 200 via magnetic coupling. Specifically, as will be discussed in more detail below, the accessory 300 may include a second ferromagnetic element for coupling the accessory 300 to the first ferromagnetic element 108 and a third ferromagnetic element for coupling the accessory 300 to the charger 200, and more specifically to a fourth ferromagnetic element of the charger 200. In alternative embodiments, other mechanisms may be used for coupling the accessory 300 to the charger 200, such as hook-and-loop, adhesion, mechanical interlock, or the like. Regardless of the manner in which the accessory 300 is coupled to the charger 200, in certain embodiments the accessory 300 includes an internal power source that is charged by the charger 200 inductively when the accessory 300 is coupled to or at least positioned near/adjacent to the charger 200. Although inductive/wireless charging is described herein in the exemplified embodiment, the accessory 300 may be charged by other techniques including coupling the accessory 300 to the charger 200 via an electric wire. Furthermore, in other embodiments the accessory 300 may be charged, if necessary, by directly coupling the accessory 300 to a source of power (i.e., a wall outlet or the like) without the need for the charger 200.

As noted above, in FIG. 2 the accessory 300 is illustrated in the charging state as the accessory 300 is coupled to the charger 200. In FIG. 5, the accessory 300 is illustrated in a decoupled state (which may also be a use state) in which the accessory 300 is decoupled from the charger 200. In certain embodiments, the accessory 300 may be transitioned from the charging state to the decoupled state simply by pulling on the accessory 300 with sufficient force in a direction away from the charger 200 to overcome any connection forces, such as magnetic attraction in the exemplified embodiment as discussed in more detail below, between the accessory 300 and the charger 200. Of course, depending on the manner in which the accessory 300 and the charger 200 are coupled together, the manner of transitioning the accessory 300 between the charging state and the use state may be changed.

Figure 6:
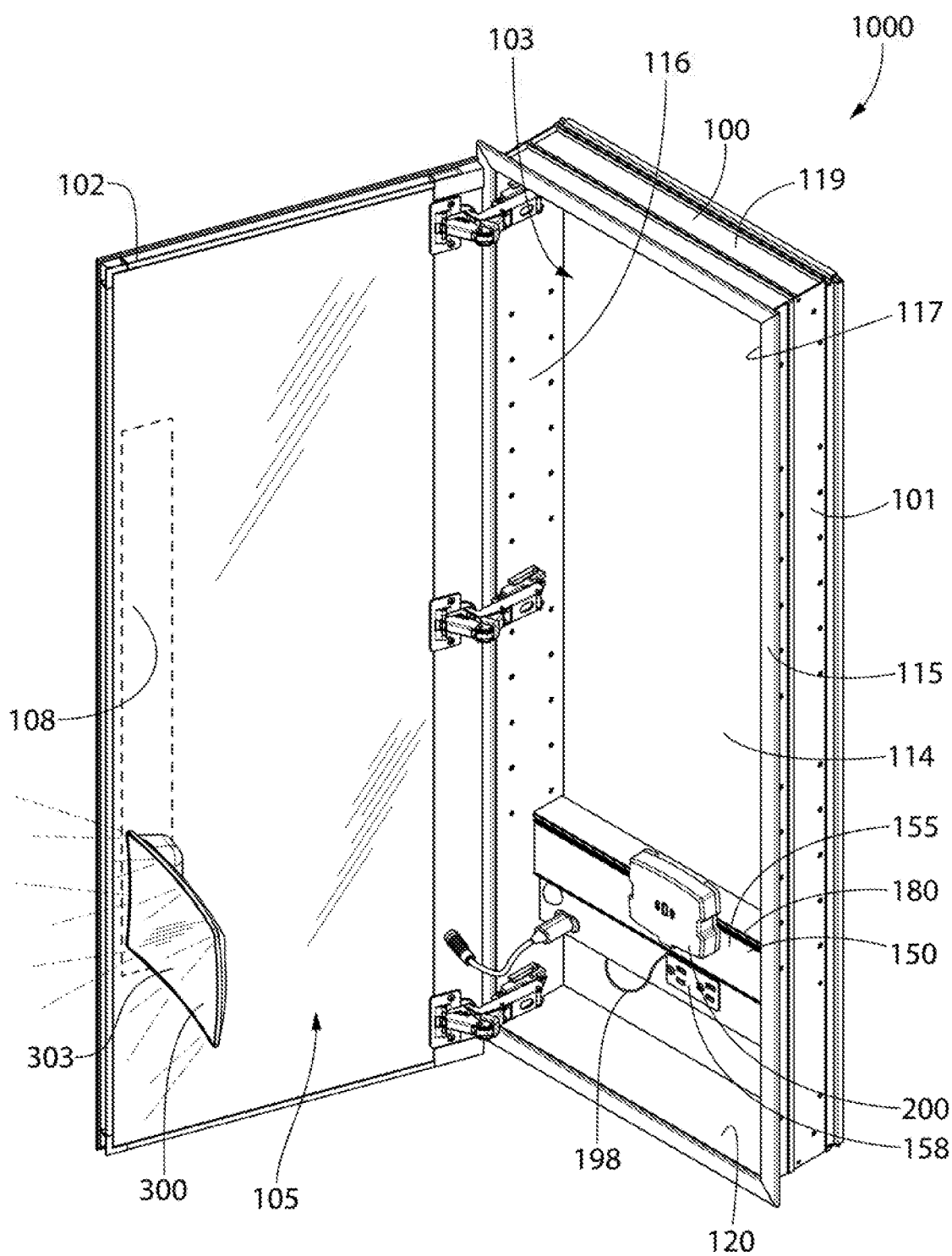
FIG. 6 is a front perspective view of the cabinet of FIG. 2 with the accessory powered on and coupled to the door.

Finally, referring to FIG. 6, the accessory 300 is illustrated in a use state in which the accessory 300 is coupled to the door 102. More specifically, in the exemplified embodiment the accessory 300 can be mounted to the door 200 by magnetic attraction between the first ferromagnetic element 108 of the door 102 and the second ferromagnetic element of the accessory 300. Because the first ferromagnetic element 108 is an elongated plate formed of a ferromagnetic material, the accessory 300 may in certain embodiments be coupled to the door 102 at any of an infinite number of selectable positions along the first ferromagnetic element 108.

In the exemplified embodiment, during use the accessory 300 is coupled to the door 102 of the cabinet 100, and more specifically to the first ferromagnetic element 108 that is coupled to the door 102 as described herein above. However, the invention is not to be so limited. In some embodiments during use the accessory 300 is coupled to a support structure, which may be the door 102 or some other structure including a separate support unit for supporting the accessory 300 during use, another portion of the cabinet 100, or the like. For example, in one embodiment the first ferromagnetic element 108 may be a separate element that a user can mount wherever he/she desires, such as in a shower. The accessory 300 can then be mounted to the first ferromagnetic element 108 as described herein so that the accessory 300 can be used while the user is in the shower.

In the exemplified embodiment, the accessory 300 comprises a third mirror 303. More specifically, in some embodiments the third mirror 303 of the accessory 300 is a magnification mirror. Magnification mirrors are often used by persons while applying makeup or otherwise attempting to get a close-up look of a portion of their body. Enabling the accessory 300 to be mounted at any location along the first ferromagnetic element 108 renders the accessory 300 more accessible to persons of different heights. Thus, a shorter person (or a person who is sitting down) may want to couple the accessory 300 lower down along the first ferromagnetic element 108 whereas a taller person may want to couple the accessory 300 higher up along the first ferromagnetic element 108. The system 1000 described herein permits such adjustability so that persons of varying stature may be able to use the accessory 300 comfortably. Although described herein as being a magnification mirror, the accessory 300 is not to be so limited in all embodiments. In other embodiments, the accessory 300 may be, without limitation, a tablet, a smart phone, a radio, a television, a touch screen, or other electronic devices that may be desirable to use while the user is conducting personal hygiene activities.

In certain embodiments, as illustrated in FIG. 6, the accessory 300 may also include a user perceptible signal generator, which in the exemplified embodiment is a light source. The accessory 300 is illustrated in FIG. 6 with the light source powered on so that the accessory 300 is transmitting light therefrom. In some embodiments, the details of which will be described in more detail below, the accessory 300, and more specifically the user perceptible signal generator or light source of the accessory 300, may be powered on automatically upon the accessory 300 being coupled to the first ferromagnetic element 108. Specifically, the accessory 300 may include the necessary circuitry to determine when the accessory 300 is coupled to the first ferromagnetic element 108 so that the user perceptible signal generator or light source is automatically powered or turned on when the accessory 300 is coupled to the first ferromagnetic element 108 and ready for use. This may occur due to a sensor of the accessory 300 sensing that the accessory 300 is coupled to the first ferromagnetic element 108 (or other support structure) as discussed in more detail below with reference to FIGS. 28-29B. Alternatively, the accessory 300 may include a mechanical switch that is automatically activated upon the accessory 300 being coupled to the first ferromagnetic element 108. Specifically, coupling the accessory 300 to the first ferromagnetic element 108 may result in a switch on a surface of the accessory 300 being activated due to the contact between the accessory 300 (or the switch thereof) and the first ferromagnetic element 108 (or the door 102 of the cabinet 100).

Referring to FIGS. 9-13 concurrently, the charger 200 and its components will be described in detail. The charger 200 generally comprises a housing 210 that forms the rear and front surfaces 201, 202 of the charger 200, a locking element 260, a stopper element 270, and the second mounting element 280. In one embodiment the stopper element 270 and the second mounting element 280 are integrally formed on the same plate. Specifically, the charger 200 includes a plate 240 having a front surface 241 and a rear surface 242, and each of the stopper element 270 and the second mounting element 280 are formed integrally with the plate 240 and extend from the rear surface 242. The stopper element 270 comprises a first wall 271 extending normal to the rear surface 242 of the plate 240 and a second wall 272 extending normal to the first wall 271 and substantially parallel to the rear surface 242 of the plate 240. As discussed in more detail below, the stopper element 270 ensures that sufficient space is maintained between the charger 200 and the support member 150 to enable the locking element 260 to be capable of transitioning between a locked state and an unlocked state.

The housing 210 comprises a top surface 211, a bottom surface 212 opposite the top surface 211, a first side surface 213, and a second side surface 214 opposite the first side surface 213. Furthermore, the charger 200 includes the charging circuit 250 disposed within the housing 210 as illustrated generically in FIG. 13. The charging circuit 250 is described in more detail below, but in some embodiments the charging circuit 250 may include an inductor so that the charging circuit 250 can inductively charge the accessory 300 as described herein. Finally, the charger 200 includes an arrangement of magnets 290. As discussed in more detail below, the arrangement of magnets 290 is positioned at the front surface 202 of the charger 200 in the exemplified embodiment and permits coupling of the accessory 300 to the charger 200. In the exemplified embodiment, the arrangement of magnets 290, includes first, second, third, and fourth magnets 290a-d.

In the exemplified embodiment, the second mounting element 280 is a protuberance 281 that extends beyond the rear surface 201 of the charger 200. Of course, as discussed above, the protuberance 281 may be replaced by a groove depending on the characteristics of the first mounting element 180 of the support member 150. The protuberance 281 comprises a post section 282 and a flange section 283, the flange section 283 located at a distal end of the post section 282. The flange section 283 comprises a top portion 284 and a bottom portion 285. A distance measured from the post section 282 to a distal end of the top portion 284 of the flange section 283 is greater than a distance measured from the post section 282 to a distal end of the bottom portion 285 of the flange section 283. In the exemplified embodiment, the protuberance 281 is elongated along the width of the charger 200 between the first and second side surfaces 213, 214 of the charger 200.

Figure 10:
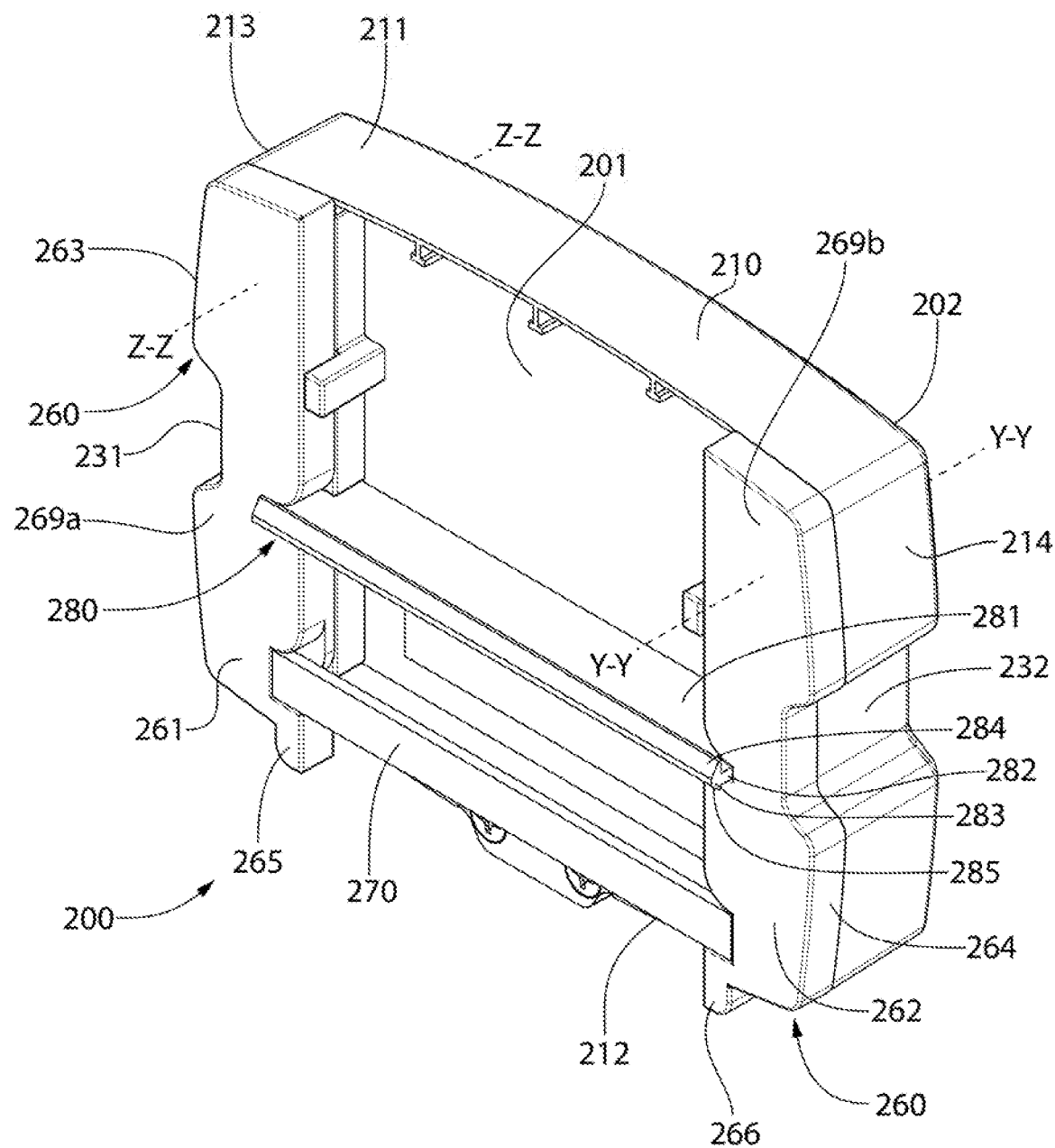
FIG. 10 is a rear perspective view of the charger of FIG. 9 with a locking element thereof in a locked state.
Figure 11:
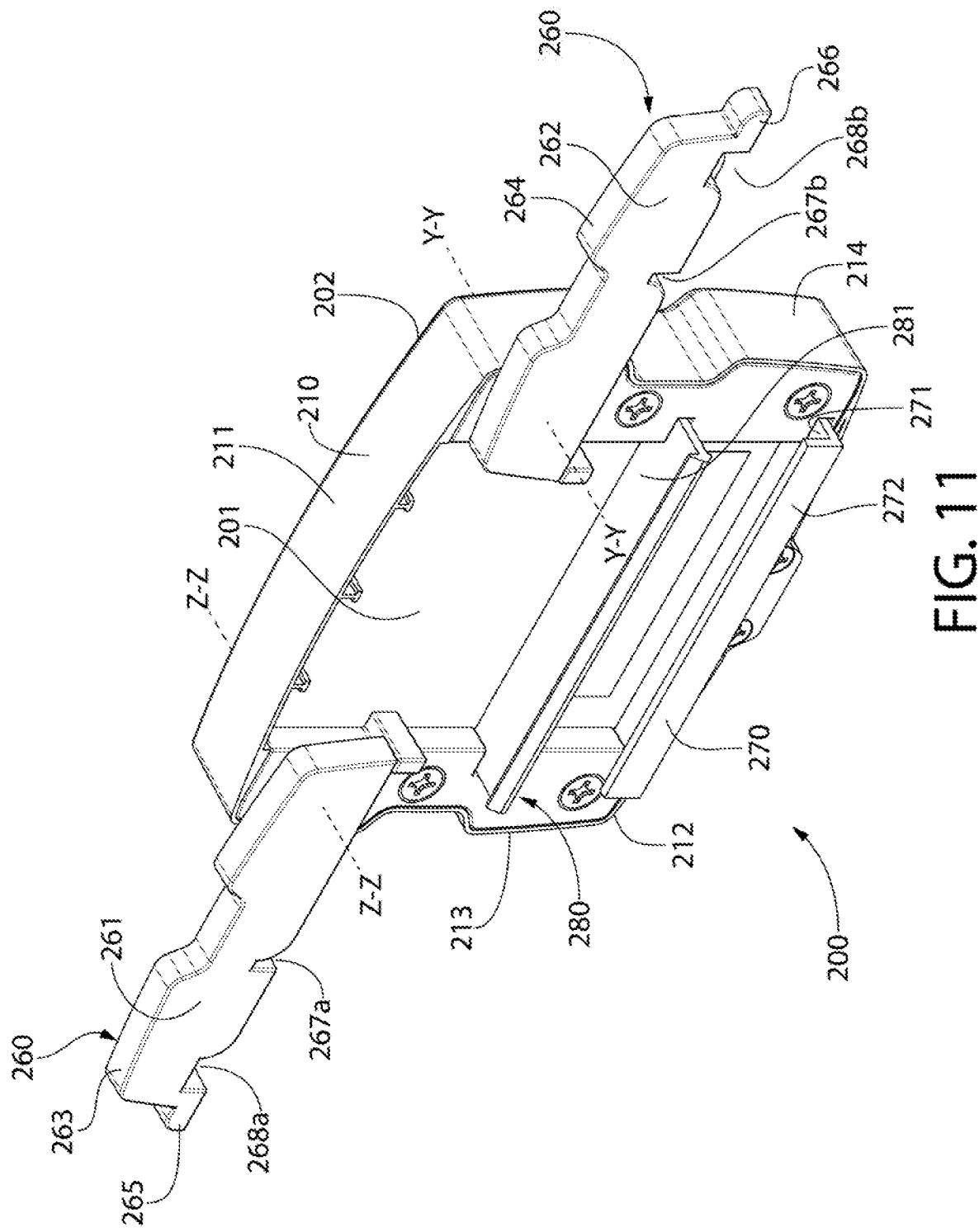
FIG. 11 is a rear perspective view of the charger of FIG. 9 with the locking element in an unlocked state.
Figure 12:
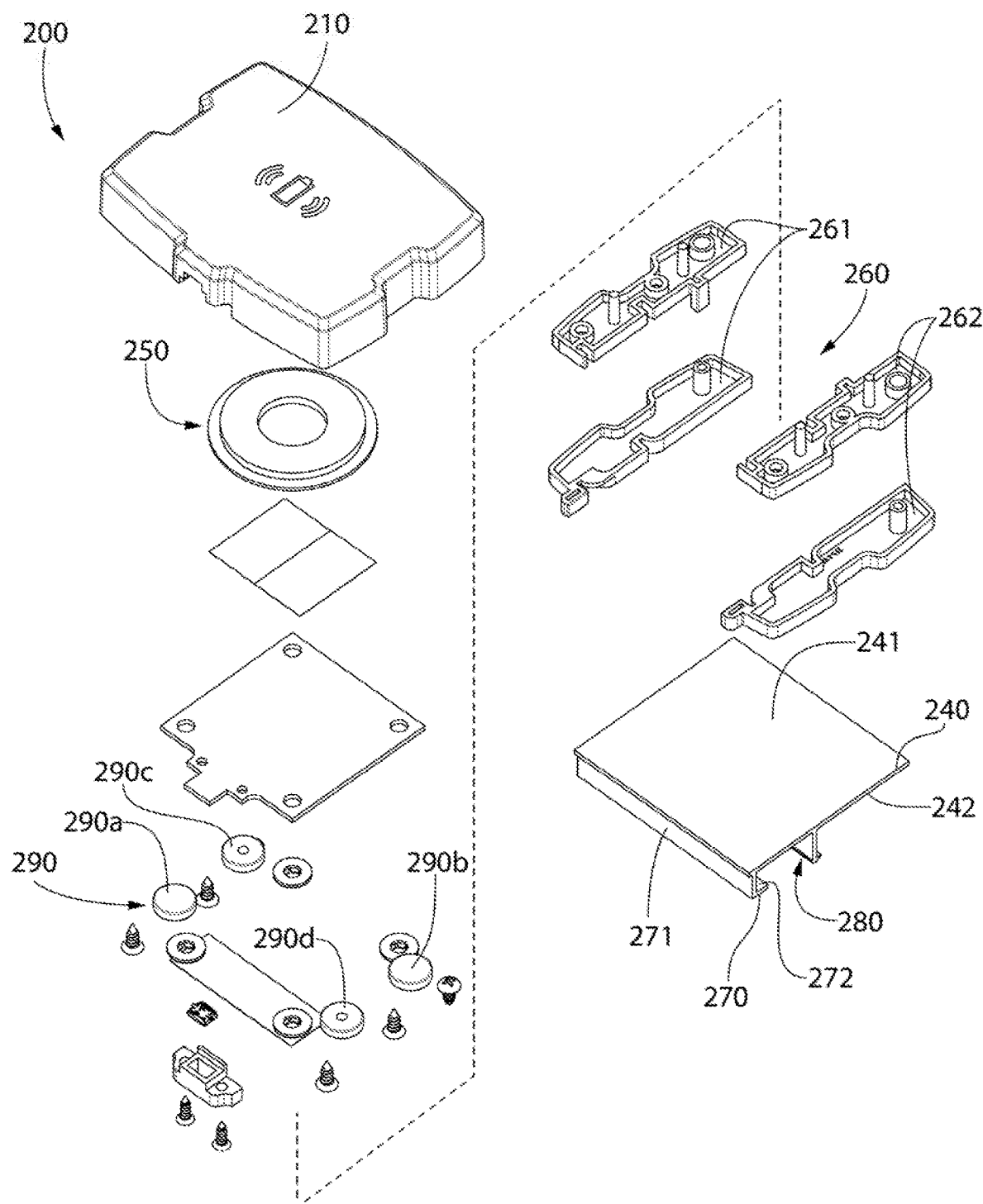
FIG. 12 is an exploded view of the charger of FIG. 9.

The locking element 260 is alterable between an unlocked state in which the second mounting element 280 of the charger 200 can be coupled to and decoupled from the first mounting element 180 of the support member 150 and a locked state in which the second mounting element 280 of the charger is prohibited from being decoupled from (and possibly also coupled to) the first mounting element 180 of the support member 150. Specifically, the locking element 260 of the charger 200 comprises a first arm 261 that is pivotably mounted to the housing 210 to be pivotable about a first axis Z-Z and a second arm 262 that is pivotably mounted to the housing 210 to be pivotable about a second axis Y-Y. The first and second arms 261, 262 are located on opposite sides of the housing 210. Specifically, the first arm 261 is positioned adjacent to the first side surface 213 of the housing 210 and the second arm 262 is positioned adjacent to the second side surface 214 of the housing. Each of the first and second axes Z-Z, Y-Y are perpendicular to and pass through both the front and rear surfaces 201, 202 of the charger 200 (and are normal to the support member 150 when the charger 200 is mounted thereto as discussed in more detail below). The locking element 260 is in the unlocked state when the first and second arms 261, 262 are in a first rotational position as shown in FIG. 11. The locking element 260 is in the locked state when the first and second arms 261, 262 are in a second rotational position as shown in FIG. 10.

More specifically, the locking element 260 is in the locked state when the first and second arms 261, 262 are in a downward vertical position such that a side surface 263 of the first arm 261 is substantially flush with the first side surface 213 of the housing 210 and such that a side surface 264 of the second arm 262 is substantially flush with the second side surface 214 of the housing 210. In this locked state, the first and second arms 261, 262 extend vertically between the top and bottom surfaces 211, 212 of the housing 210 and no portion of the first and second arms 261, 262 protrudes from the first and second side surfaces 213, 214 of the housing 210. However, the first arm 261 includes a gripping portion 265 that protrudes from the bottom surface 212 of the housing 210 and the second arm 262 includes a gripping portion 266 that protrudes from the bottom surface 212 of the housing 210. The gripping portions 265, 266 of the first and second arms 261, 262 provides a portion of the arms 261, 262 for a user to grip when altering the arms 261, 262 between the locked and unlocked states.

The locking element 260 is in the unlocked state when the first and second arms 261, 262 are rotated about the axes Z-Z, Y-Y so that the first arm 261 extends outward from the first side surface 213 of the housing 210 and the second arm 262 extends outward from the second side surface 214 of the housing 210. In the exemplified embodiment, the first arm 261 is oriented perpendicular to the first side surface 213 in the unlocked state and the second arm 262 is oriented perpendicular to the second side surface 214 in the unlocked state such that the first and second arms 261, 262 are rotated 90° between the locked and unlocked states. The charger 200 may include stoppers positioned adjacent to the first and second arms 261, 262 to prevent rotation beyond 90° in the unlocked state, as best seen in FIG. 11. However, the invention is not to be so limited and the first and second arms 261, 262 may rotate more than 90° in some embodiments and less than 90° in some embodiments between the locked and unlocked states.

Each of the first and second arms 261, 262 comprises a first notch 267a, 267b for receiving a portion of the protuberance 281 and a second notch 268a, 268b for receiving a portion of the stopper element 270 when the first and second arms 261, 262 are in the locked state. Specifically, when the first arm 261 is in the locked state, a portion of the protuberance 281 nests within the first notch 267a in the first arm 261 and a portion of the stopper element 270 nests within the second notch 268a in the first arm 261. When the second arm 262 is in the locked state, a portion of the protuberance 281 nests within the second notch 267b in the second arm 262 and a portion of the stopper element 270 nests within the second notch 268b in the second arm 262. The protuberance 281 sticks out from/protrudes beyond the rear surfaces 269a, 269b of the first and second arms 261, 262 when the first and second arms 261, 262 are in the locked state.

The charger 200 further includes a first registration feature 231 on the first side surface 213 of the housing 210 and a second registration feature 232 on the second side surface 214 of the housing 210. More specifically, the first registration feature 231 is formed collectively into first side surface 213 of the housing 210 and the first arm 261. Thus, the first registration feature 231 is a notch or recess formed into the first side surface 213 of the housing 210 and a notch or recess formed into a side surface of the first arm 261. The notch or recess in the first side surface 213 of the housing 210 and the notch or recess in the side surface of the first arm 261 are aligned when the first arm 261 is in the locked state, thereby forming the first registration feature 231. The second registration feature 232 is formed collectively into the second side surface 214 of the housing 210 and the second arm 262. Thus, the second registration feature 232 is a notch or recess formed into the second side surface 214 of the housing 210 and a notch or recess formed into a side surface of the second arm 262. The notch or recess in the second side surface 214 of the housing 210 and the notch or recess in the side surface of the second arm 262 are aligned when the second arm 262 is in the locked state, thereby forming the second registration feature 232. The first and second registration features 231, 232 of the charger 200 correspondingly mate with a registration feature of the accessory 300, described below with reference to FIGS. 20-24, when the accessory 300 is mounted to the charger 200.

Figure 14:
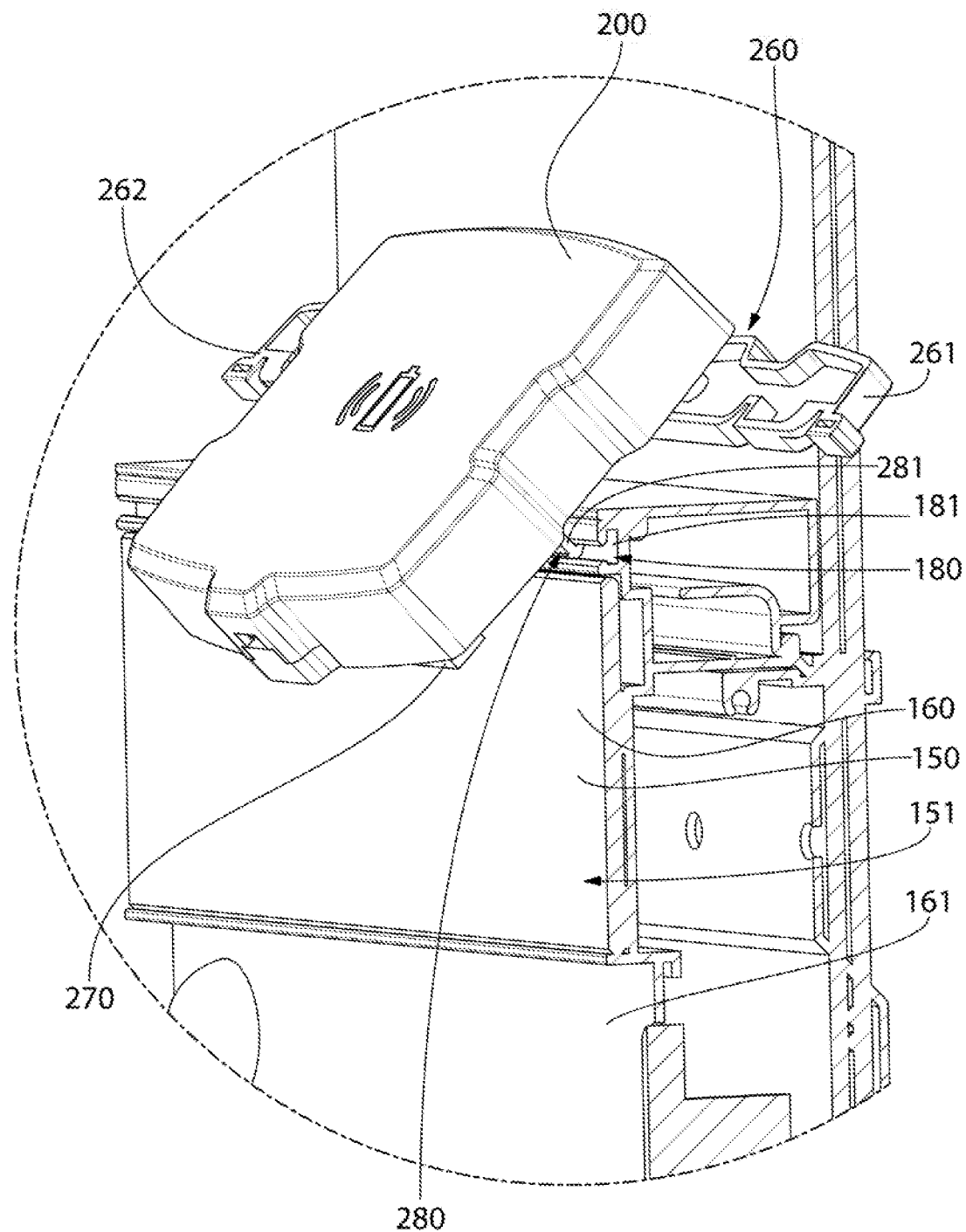
FIG. 14 is a cross-sectional schematic illustrating coupling a mounting element of the charger to a mounting element of a shelf of the cabinet of FIG. 1.

Referring now to FIGS. 14-19, the manner in which the charger 200 is coupled to the support member 150 will be described. The charger 200 is coupled to the support member 150 via a mating engagement between the first mounting element 180 of the support member 150 and the second mounting element 280 of the charger 200. Referring first to FIGS. 14 and 15, in order to couple the charger 200 to the support member 150, first the locking element 260, and more specifically the first and second arms 261, 262 thereof, must be placed into the unlocked state. With the locking element 260 in the unlocked state, the charger 200 is brought close to the support member 150 with the rear surface 201 of the charger 200 facing the front surface 151 of the support member 150. In this manner, the second mounting element 280 of the charger 200 is facing the first mounting element 180 of the support member 150. More specifically, the protuberance 281 of the second mounting element 280 of the charger 200 is facing the groove 181 of the first mounting element 180 of the support member 150. Furthermore, the charger 200 is oriented so that the top portion 284 of the flange section 283 of the protuberance 281 is facing upwards and the bottom portion 285 of the flange section 283 of the protuberance 281 is facing downwards.

The first and second mounting elements 180, 280 can only be matingly coupled or decoupled when the charger 200 is tilted a predetermined amount relative to the support member 150. Thus, as the protuberance 281 of the charger 200 nears the groove 181 of the support member 150, the charger 200 is tilted so that the top portion of the charger 200 is closer to the support member 150 than the bottom portion of the charger 200. The charger 200 is tilted so as to form an acute angle of between 20 and 75 degrees, more specifically between 30 and 65 degrees, and still more specifically between 45 and 55 degrees between the front surface 151 of the support member 150 and the rear surface 201 of the charger 200. In some embodiments the predetermined amount that the charger 200 is tilted is 50 degrees or more. With the charger 200 tilted as shown, the top portion 284 of the flange section 283 of the protuberance 281 is inserted into the entry section 182 of the groove 181. It is worth noting at this point that if the locking element 260 of the charger 200 were in the locked state, the charger 200 would be prohibited from being tilted the necessary amount because the locking element 260 (i.e., the first and second arms 261, 262) would contact the front surface 151 of the support member 150. Thus, it is required that the locking element 260 be in the unlocked state during this part of the installation/coupling process.

Figure 16:
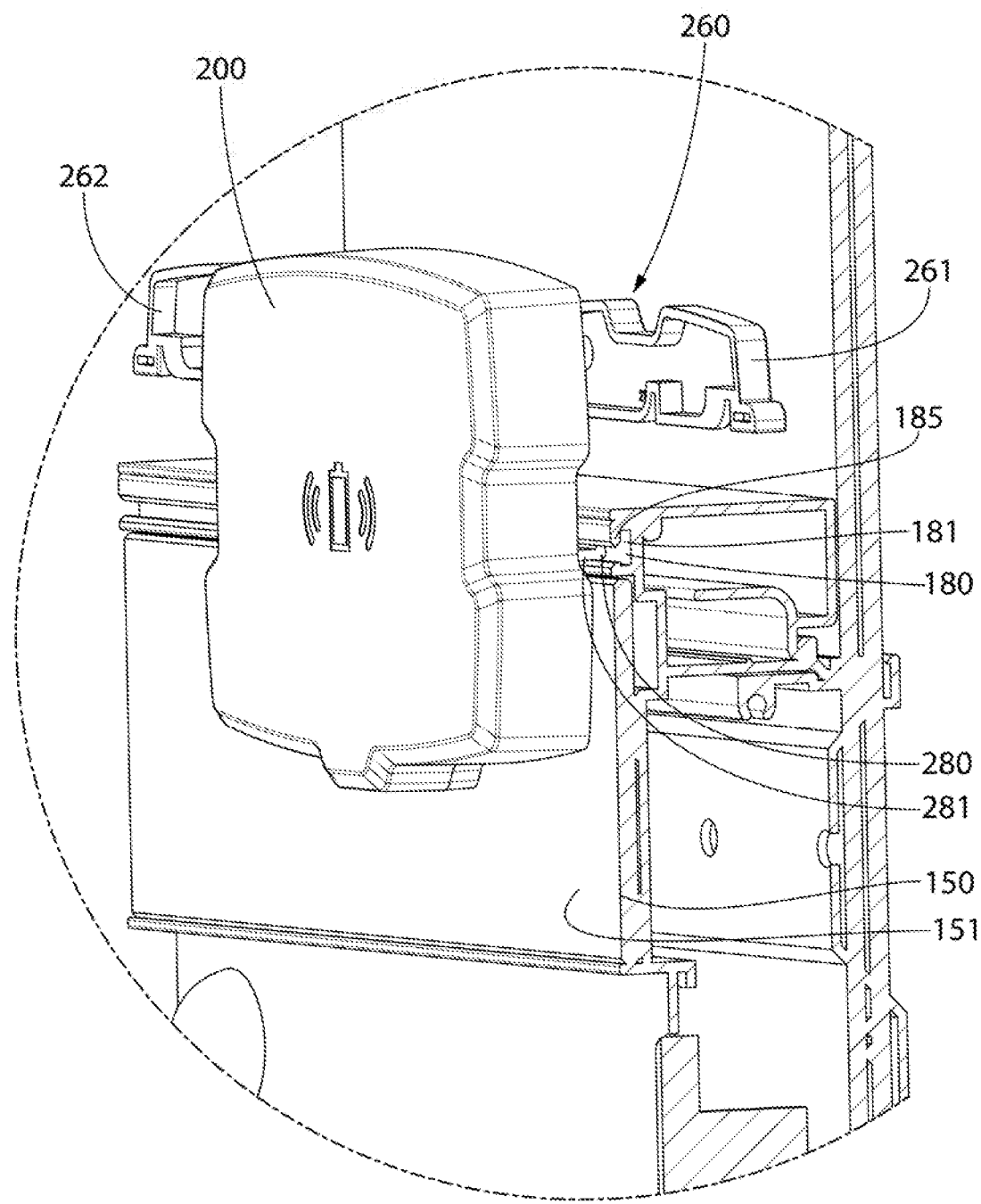
FIG. 16 is a cross-sectional schematic illustrating the mounting element of the charger coupled to the mounting element of the shelf coupling with the locking element of the charger in an unlocked state.
Figure 17:
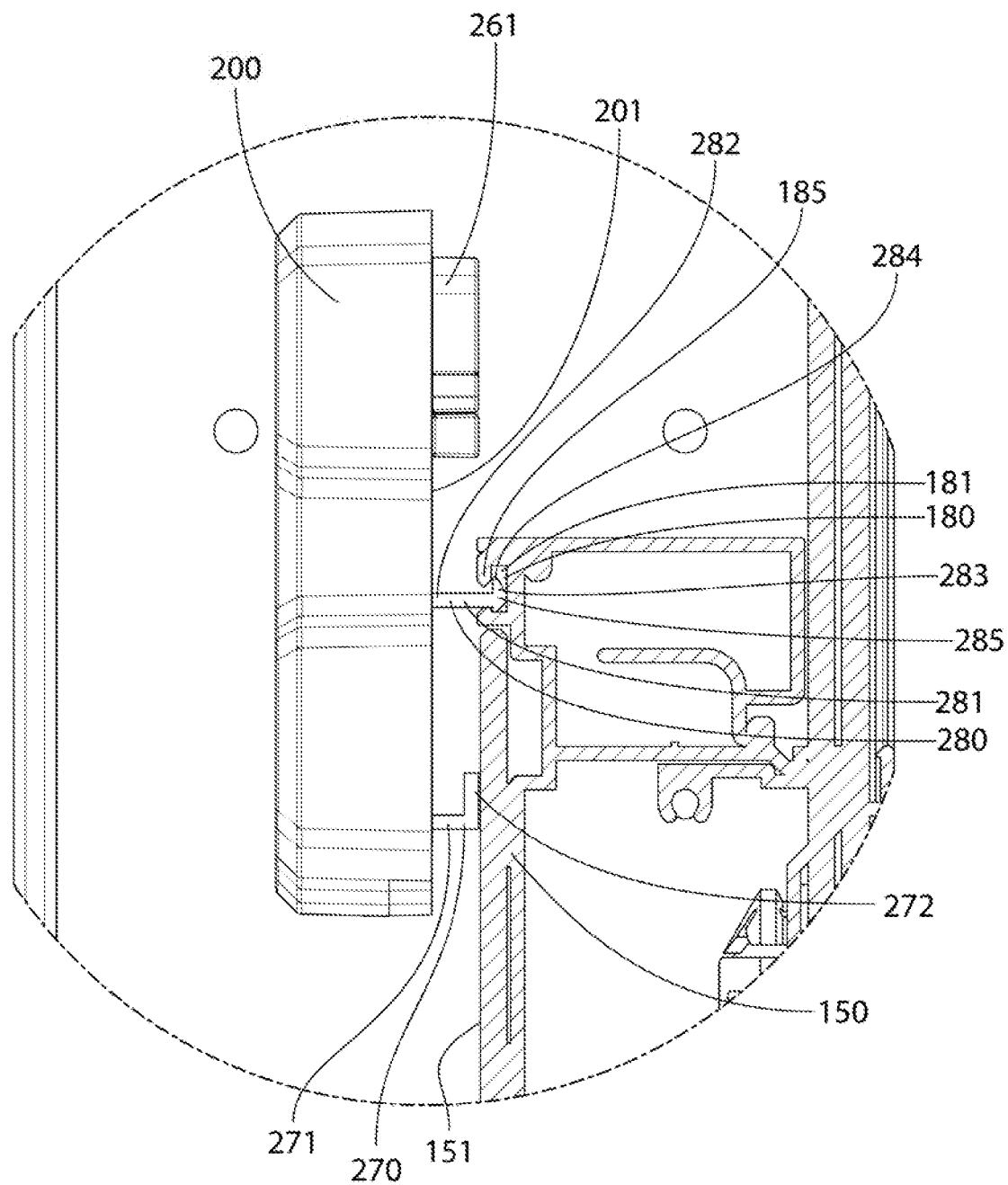
FIG. 17 is a side view of FIG. 16.

Referring to FIGS. 16 and 17, the coupling of the charger 200 to the support member 150 will be further described. With the top portion 284 of the flange section 283 of the protuberance 281 positioned within the entry section 182 of the groove 181 and possibly extending into the nesting section 183 of the groove 181, the charger 200 is tilted back to an upright orientation such that the front and rear surfaces 201, 202 of the charger 200 are parallel with the front surface 151 of the support member 250. The charger 200 is tilted until the stopper element 270, and more specifically the second wall 272 of the stepper element 270, contacts the front surface 151 of the support member 150. The stopper element 270 is oriented to ensure that the charger 200 is in a proper upright position as described herein when coupled to the support member 150. The reverse-tilting action described herein results in the entire flange section 283 of the protuberance 281 entering into and nesting within the nesting section 183 of the groove 181. Furthermore, in this position a portion of the post section 282 of the protuberance 281 nests within the entry section 182 of the groove 181. Once in this position, the protuberance 281 cannot be pulled back out of the groove 181 without going back through the tilting movements described above. Specifically, the protuberance 281 is prevented from being removed from the groove 181 due to interaction between the flange section 283 of the protuberance 281 and the wall 185 that form the narrowing of the entry section 182 of the groove.

At this point, the locking element 260 remains in the unlocked state, which permits the charger 200 to be tilted again the predetermined amount to thereby remove the protuberance 281 from the groove 181 to detach the charger from the support member 150. Thus, the charger 200 can be tilted the predetermined amount when the first and second mounting elements 180, 280 are coupled together and the locking element 260 is in the unlocked state. In this position, the rear surface 201 of the charger 200 is spaced apart from the front surface 151 of the support member 150 due to the stopper element 270. This spacing provides room for the locking element 260 (i.e., the first and second arms 261, 262) to pivot into when they are altered into the locked state.

Figure 18:
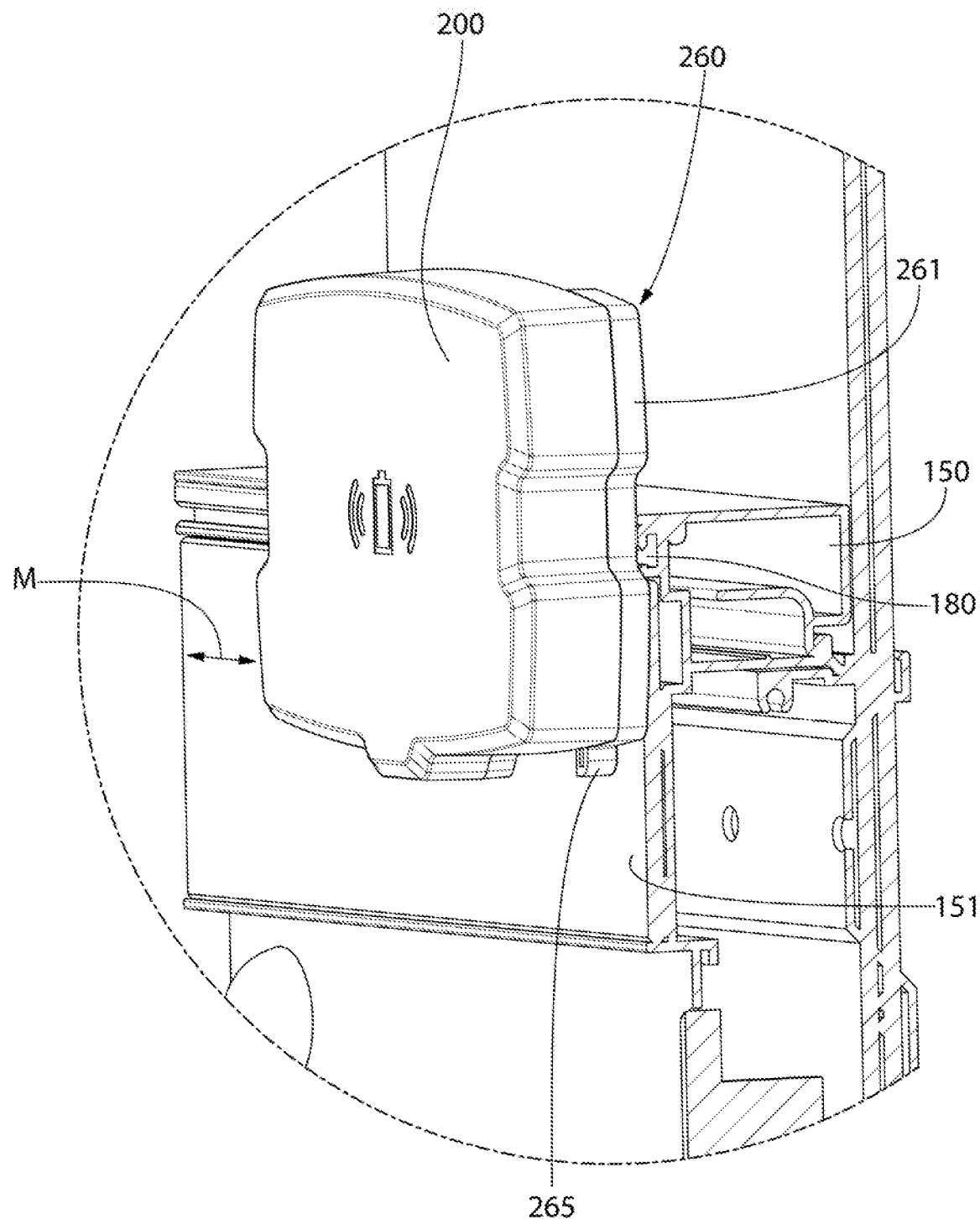
FIG. 18 is a cross-sectional schematic illustrating the mounting element of the charger coupled to the mounting element of the shelf coupling with the locking element of the charger in a locked state.
Figure 19:
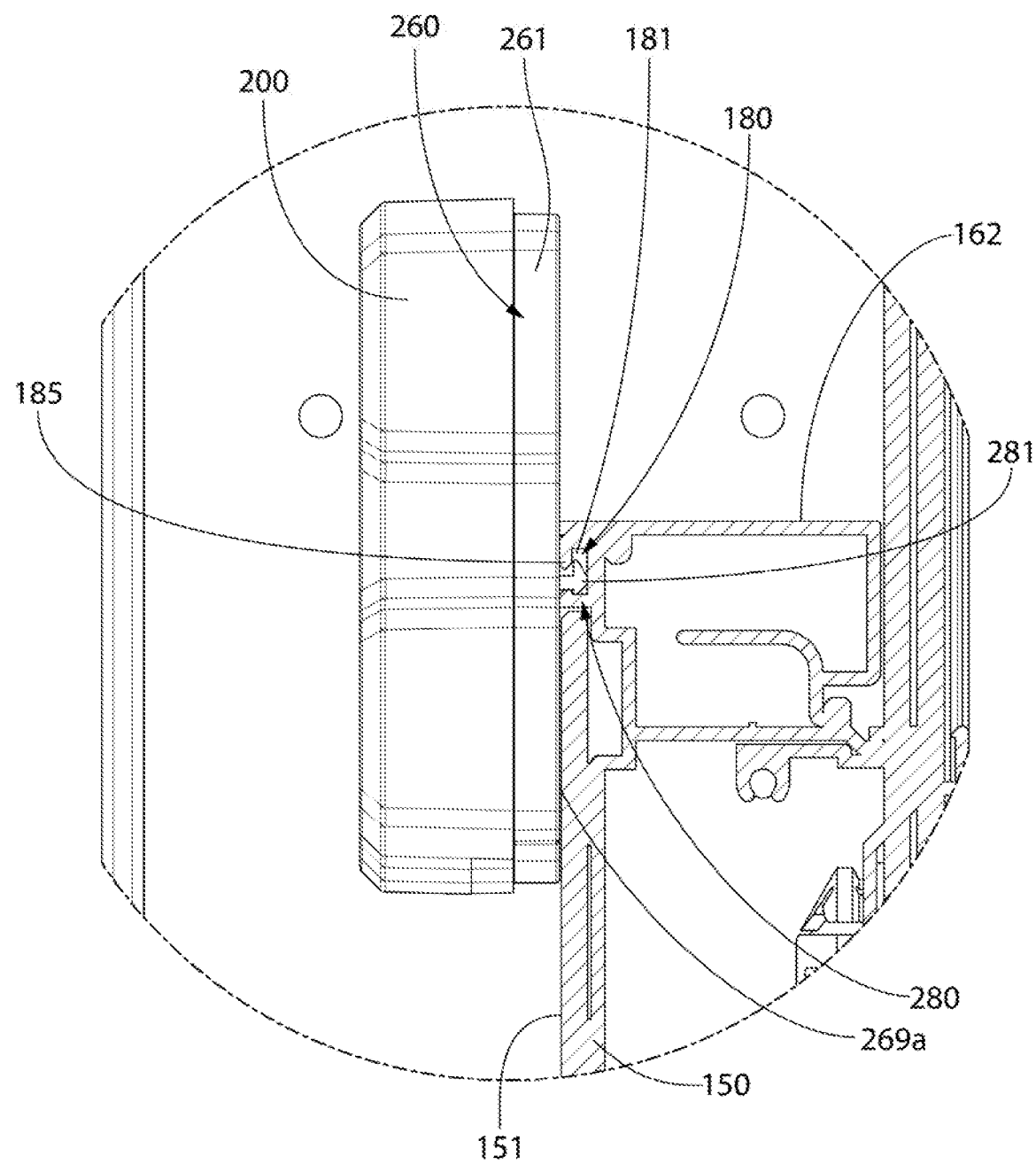
FIG. 19 is a side view of FIG. 18.
Figure 21:
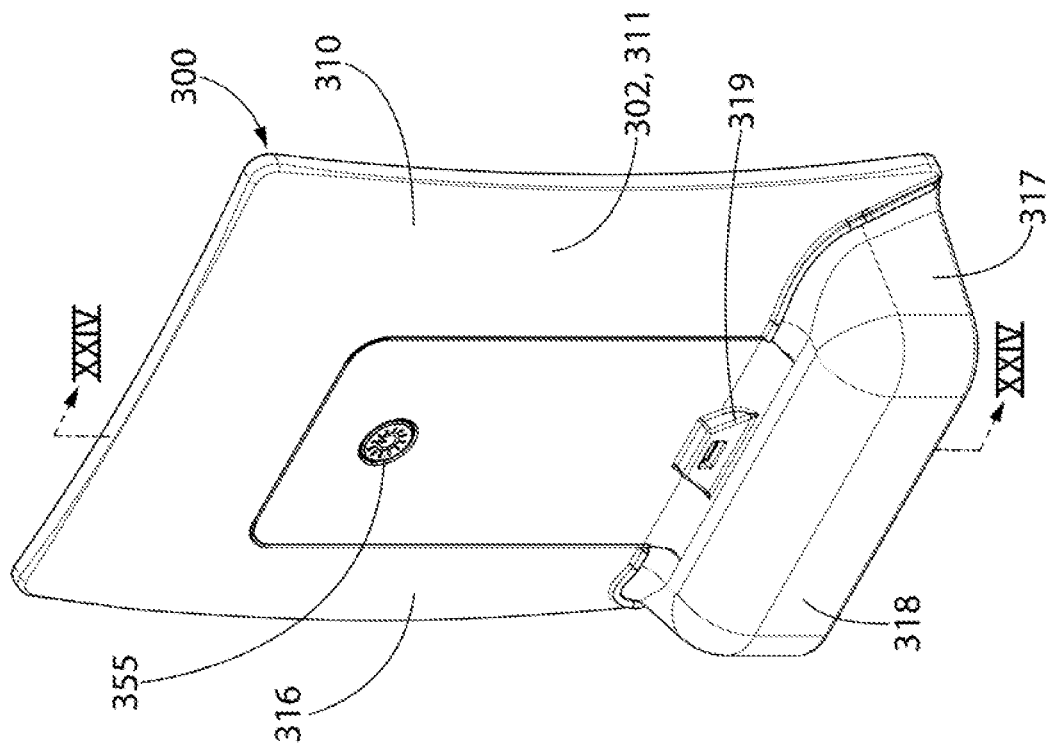
FIG. 21 is a rear view of the accessory of FIG. 20.
Figure 20:
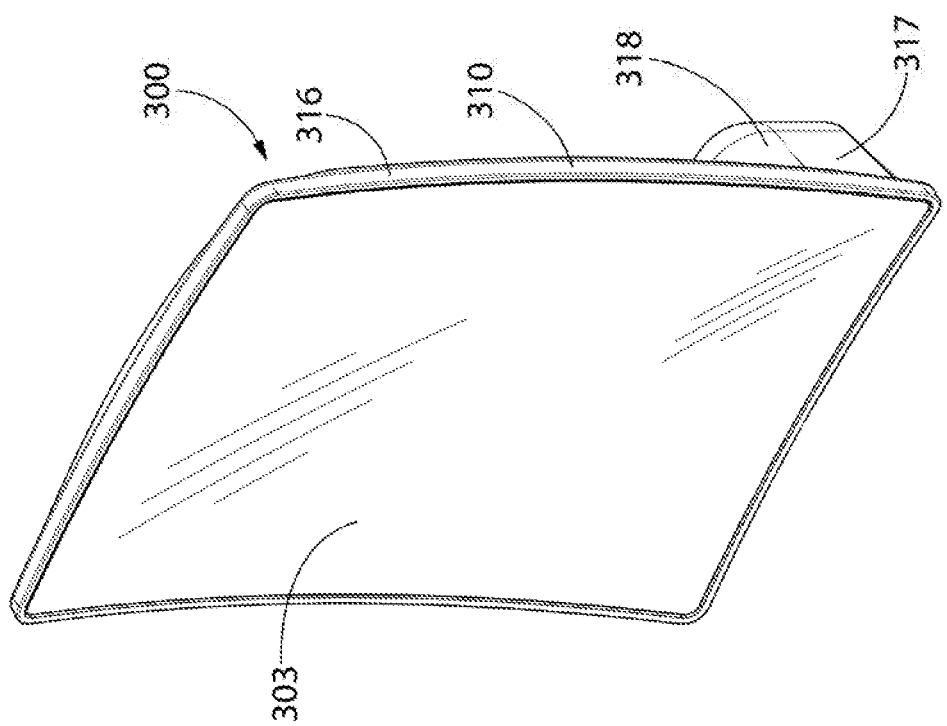
FIG. 20 is a front view of an accessory in accordance with an embodiment of the present invention.
Figure 22:
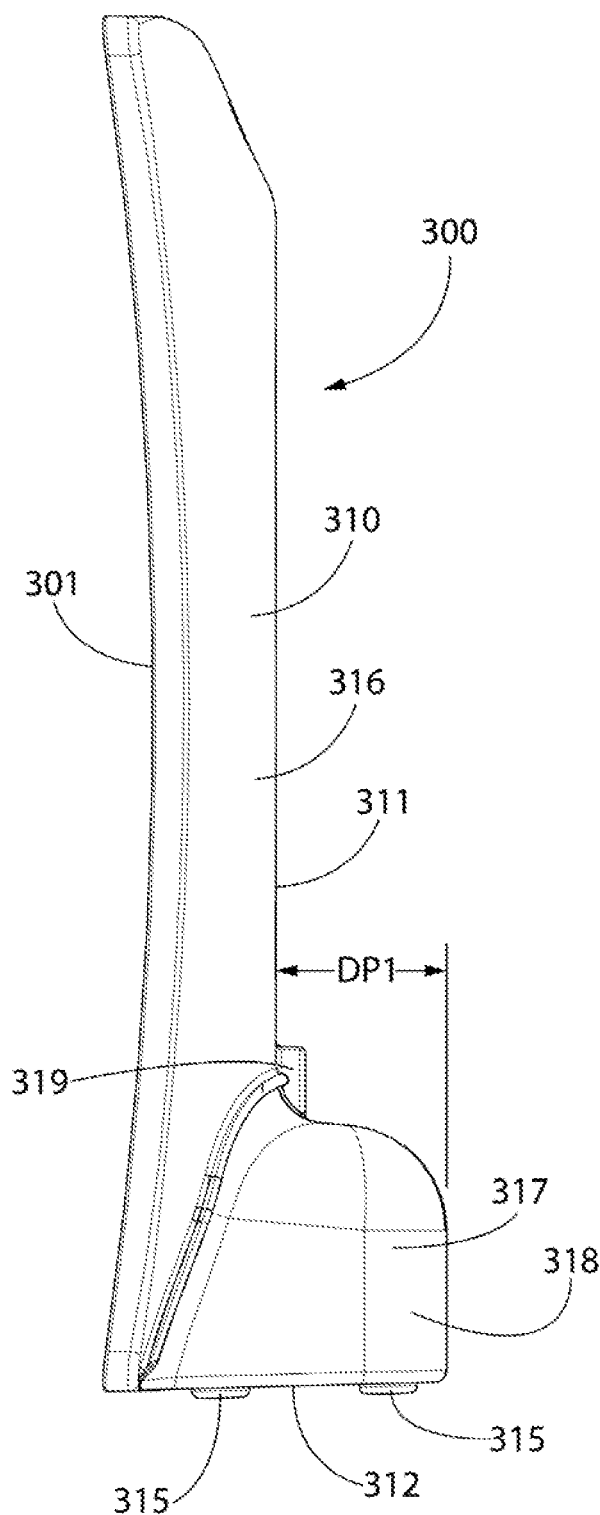
FIG. 22 is a side view of the accessory of FIG. 20.
Figure 23:
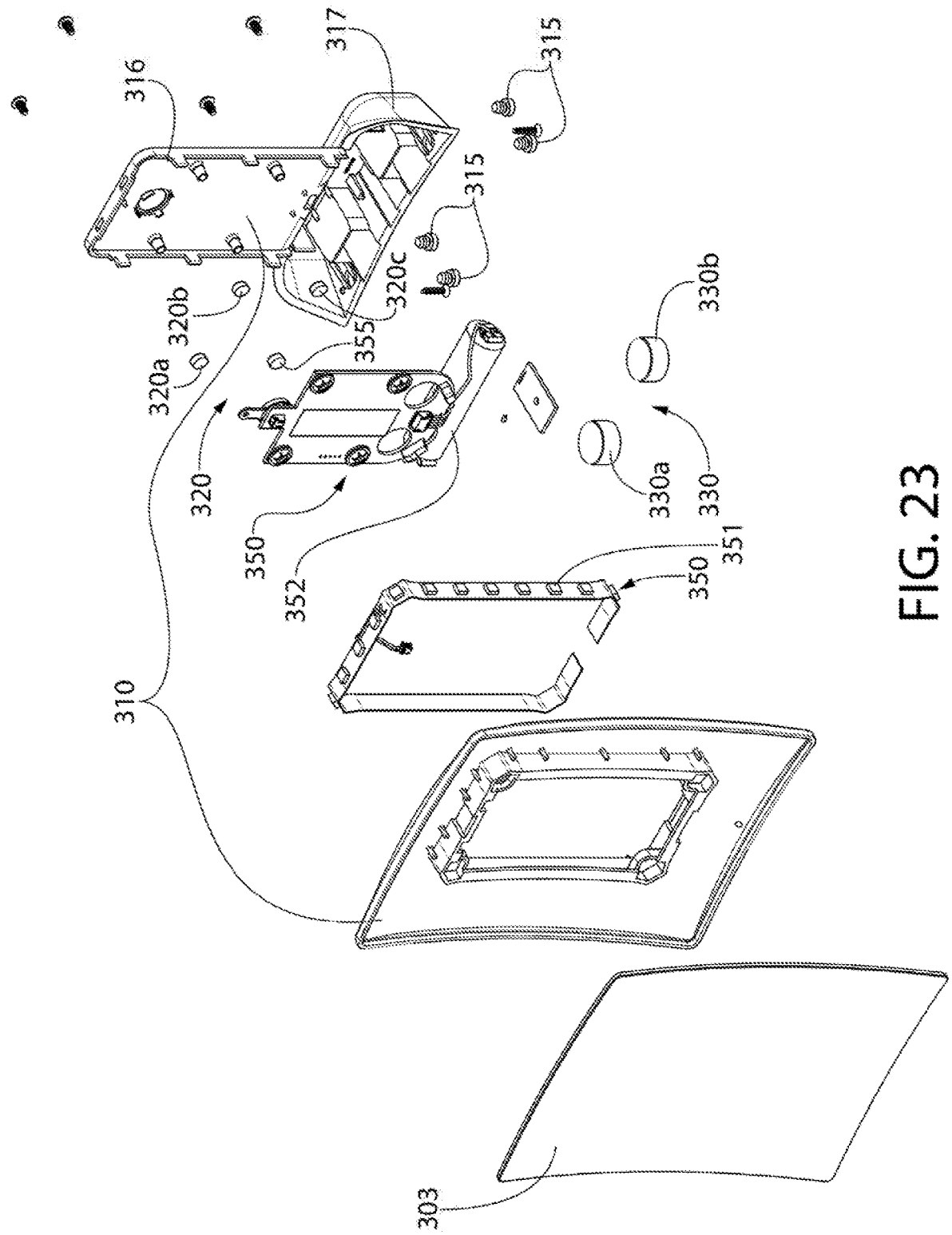
FIG. 23 is an exploded view of the accessory of FIG. 20.
Figure 24:
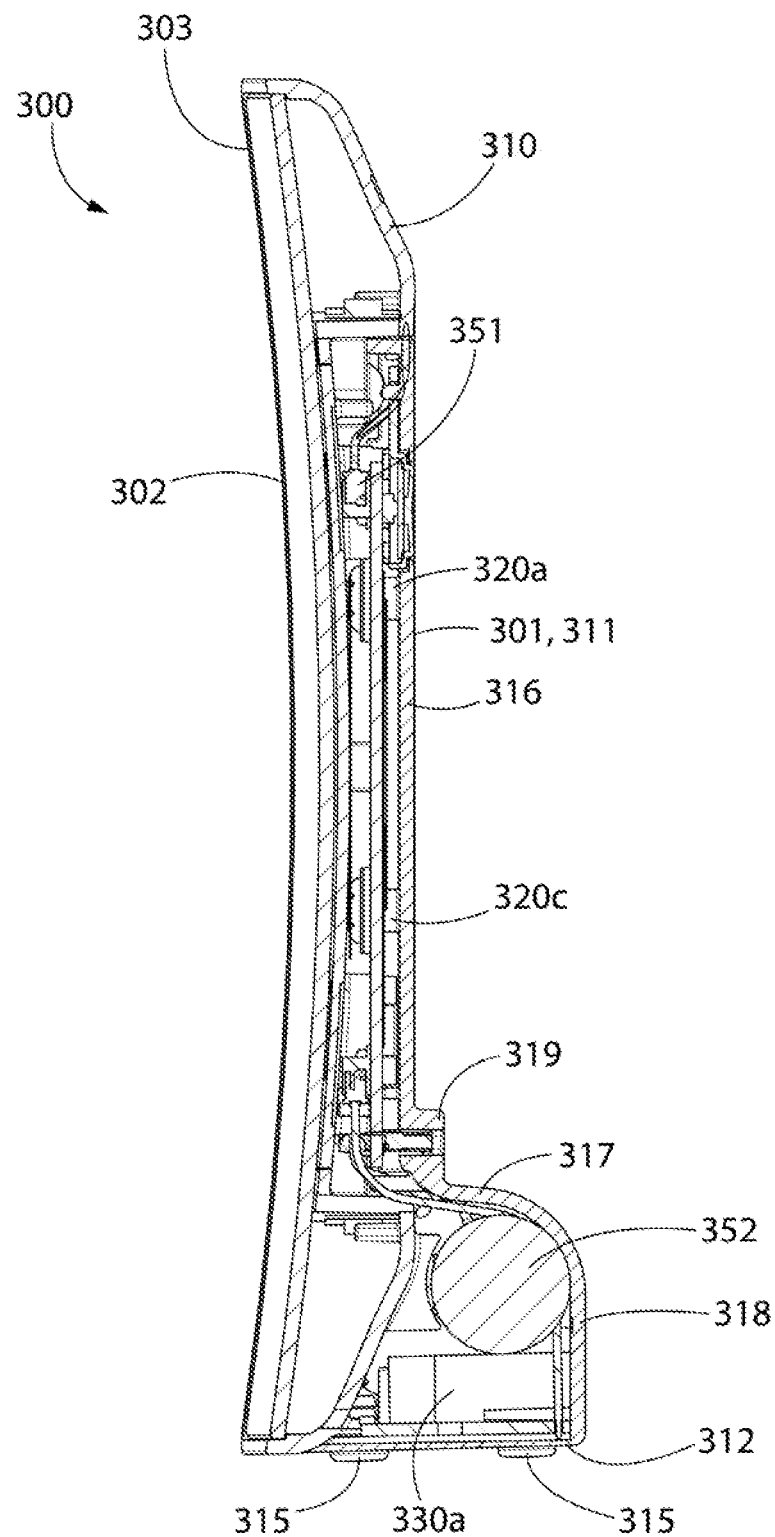
FIG. 24 is a cross-sectional view taken along line XXIV-XXIV of FIG. 21.

Referring to FIGS. 18 and 19, the final step in securing the charger 200 to the support member 150 is to transition the locking element 260 into the locked state by pivoting each of the first and second arms 261, 262 about their respective pivot axes Z-Z, Y-Y. In this position, the rear surfaces 269*a*, 269*b* of the first and second arms 261, 262 are in surface contact with the front surface 151 of the support member 150 and the first and second mounting elements 180, 280 remain coupled together. When the first and second mounting elements 180, 280 are coupled together and the locking element 260 (i.e., the first and second arms 261, 262) is in the locked state, the charger 200 is prohibited from being tilted the predetermined amount relative to the support member 150 due to surface contact between the locking element 260 (i.e., the first and second arms 261, 262) and the front surface 151 of the support member 150.

When the mounting element 280 of the charger 200 is coupled to the mounting element 180 of the support member 150 and the locking member 260 is in the locked state as illustrated in FIGS. 18 and 19, the charger 200 is slidably mounted to the front surface 151 of the support member 150 so as to be capable of being translated horizontally along the front surface 151 of the support member 150 in the opposing directions indicated by the arrow M in FIG. 18. Thus, although the charger 200 cannot be moved upwardly/downwardly or in/out relative to the support member 150 in this locked state, the charger 200 can slide side-to-side between the first and second side surfaces 116, 117 of the cabinet housing 101 along the groove 181.

Referring to FIGS. 20-24 concurrently, the accessory 300 and its components will be described in detail. The accessory 300 comprises an accessory housing 310 and the third mirror 303 coupled to the accessory housing 310. A rear surface 311 of the accessory housing 310 forms the rear surface 301 of the accessory 300 and the third mirror 303 forms the front surface 302 of the accessory 300. More specifically, in the exemplified embodiment the third mirror 303 comprises a reflective surface that forms the front surface 302 of the accessory 300. Furthermore, in the exemplified embodiment the third mirror 303 has a concave curvature, which permits the third mirror 303 to be a magnifying mirror as described above.

The accessory housing 310 comprises a first mounting means 320 that facilitates mounting the accessory 300 to the charger 200 to place the accessory 300 into the charging state and a second mounting means 330 that facilitates mounting the accessory 300 to the door 102 of the cabinet 100, and more specifically to the first ferromagnetic element 108. In the exemplified embodiment, the first mounting means 320 are located at the rear surface 311 of the accessory housing 310 and the second mounting means 330 are located at a bottom surface 312 of the accessory housing 310.

In the exemplified embodiment, the first mounting means 320 is a first set of magnets 320*a-d* and the second mounting means 330 is a second ferromagnetic element, which in the exemplified embodiment is a second set of magnets 330*a-b*. The second ferromagnetic element need not be the second set of magnets 330*a-b* in all embodiments and it may be any of the ferromagnetic elements described herein so long as it permits magnetic attraction between the second ferromagnetic element of the accessory 300 and the first ferromagnetic element 180 on the door 102.

As described in greater detail below, the accessory 300 may be coupled to the charger 200 via magnetic attraction between the first set of magnets 320*a-d* of the first mounting means 320 and the arrangement of magnets 290*a-d* of the charger 200. The details of this embodiment will be described in more detail below with reference to FIGS. 25-27. Of course, the invention is not to be limited to the first mounting means 320 of the accessory 300 and the arrangement of magnets 290*a-d* of the charger 200 being magnets. In other embodiments the first mounting means 320 of the accessory 300 may be a mechanical feature that mates with a mechanical feature of the charger 200 which may be a corresponding mechanical feature. Specifically this may include elements that engage via tight fit, interference fit, lock-and-key fit, threaded engagement, hook-and-loop, adhesion, fasteners, or the like. Thus, although magnetic attraction is used for coupling the accessory 300 to the charger 200 in the exemplified embodiment, other coupling techniques are possible.

The second mounting means 330 comprises, in the exemplified embodiment, the second ferromagnetic element which may be the second set of magnets 330*a-b*. The second set of magnets 330*a-b* permit the accessory 300 to be coupled to the door 102, and more specifically to the first ferromagnetic element 108, via magnetic attraction between the second set of magnets 330*a-b* of the second mounting means 330 and the first ferromagnetic element 108. The invention is not to be so limited in all embodiments and the second mounting means 330 may take on other forms, such as being suction cups that permit the accessory 300 to be suctioned to the door 102 or other location, adhesive that permits the accessory 300 to be adhesively coupled to the door 102, hook-and-loop fasteners, mechanical features that mate with a mechanical feature on the door 102 to permit coupling of the accessory 300 to the door 102, or the like.

In the exemplified embodiment, the first and second sets of magnets 320*a-d*, 330*a-b* are positioned within the accessory housing 310 such that the first and second sets of magnets 320*a-d*, 330*a-b* are not exposed on the exterior surface of the accessory housing 310. This provides a cleaner appearance to the accessory 300 without the first and second sets of magnets 320*a-d*, 330*a-b* being visible. However, the first and second sets of magnets 320*a-d*, 330*a-b* have sufficient magnetic strength to permit the coupling of the accessory 300 to the charger 200 and/or to the first ferromagnetic element 108 as has been described herein. Of course, in other embodiments the first and/or the second sets of magnets 320*a-d*, 330*a-b* may be exposed on the exterior of the accessory housing 310 if so desired.

The accessory 300 further comprises an accessory circuit 350 disposed within the accessory housing 310. The accessory circuit 350 comprises, in operable cooperation, a user perceptible signal generator 351 and an accessory power source 352. In the exemplified embodiment, the user perceptible signal generator 351 comprises a light source and the accessory power source 352 comprises one or more batteries, although the invention is not to be limited in this regard in all embodiments. The one or more batteries may be lithium-ion batteries or the like. The accessory 300 further comprises one or more anti-skid elements 315 that, as discussed in more detail below, contact the door 102 when the accessory 300 is mounted thereto to prevent relative sliding between the accessory 300 and the door 102.

The accessory housing 310 comprises a panel section 316 and a base section 317. In the exemplified embodiment, the power source 352 and the second mounting means 330 (i.e., the first set of magnets 330a, 330b) are located within the base section 317 and the user perceptible signal generator 351 and the first mounting means 320 (i.e., the first set of magnets 320a, 320b) are located within the panel section 316. The third mirror 303 extends over both of the panel section 316 and the base section 317 of the accessory housing 310.

The panel section 316 of the accessory housing 310 comprises the rear surface 311 of the accessory housing 310. The base section 317 of the accessory housing 310 comprises the bottom surface 312 of the accessory housing 310. The base section 317 of the accessory housing 310 comprises a protruding portion 318 that protrudes from/beyond the rear surface 311 of the accessory housing 310. More specifically, the protruding portion 318 protrudes from the rear surface 311 of the accessory housing 310 a first distance DP1. The accessory housing 310 further includes a registration feature 319. The registration feature 319 mates with the first and second registration features 231, 232 of the charger 200 when the accessory 300 is in the charging state, as described further below.

The accessory 300, or the accessory circuit 350 thereof, further comprises a user-operated actuator 355 that is operably coupled to the user perceptible signal generator 351 to control the on/off status of the user perceptible signal generator 351. Furthermore, when the user perceptible signal generator 351 is a light source, the user-operated actuator 355 may control the brightness of the light source. The functionality of the user-operated actuator 355 may change depending on the status or location of the accessory 300. For example and as described in more detail below, in some embodiments the user-operated actuator 355 may control the on/off status of the user perceptible signal generator 351 at any time that the accessory 300 is not coupled to the door 102 (or more specifically to the first ferromagnetic element 108). In a different functionality, the user-operated actuator 355 may control the brightness of the user perceptible signal generator 351 at any time that the accessory 300 is coupled to the door 102 (or more specifically to the first ferromagnetic element 108). Again, this feature will be described in more detail below.

In the exemplified embodiment, the user-operated actuator 355 is a depressible button that is actuated by a user pressing downwardly thereon. However, the invention is not to be so limited in all embodiments and the user-operated actuator 355 may be any other type of actuator device or switch, such as a slide-switch, a toggle switch, a DIP switch, a proximity switch, a temperature switch, or the like.

Referring to FIGS. 2, 5, and 6, the coupling between the accessory 300 and the charger 200 and the coupling between the accessory 300 and the door 102 will be described again now that the accessory 300 and the charger 200 have been more fully described. As shown in FIG. 2, the accessory 300 may be coupled to the charger 200 via magnetic attraction between the first set of magnets 320a-d of the accessory 300 and the arrangement of magnets 290a-d of the charger 200.

Figure 25:
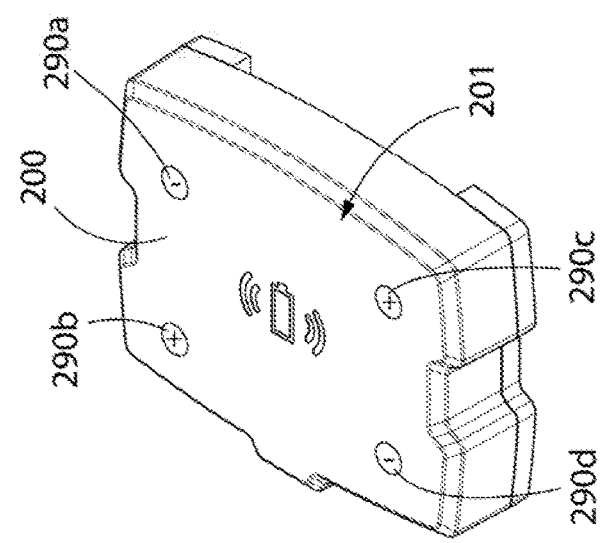
FIG. 25 is an illustration of ferromagnetic elements on the charger of FIG. 9 and on the accessory of FIG. 20.
Figure 25:
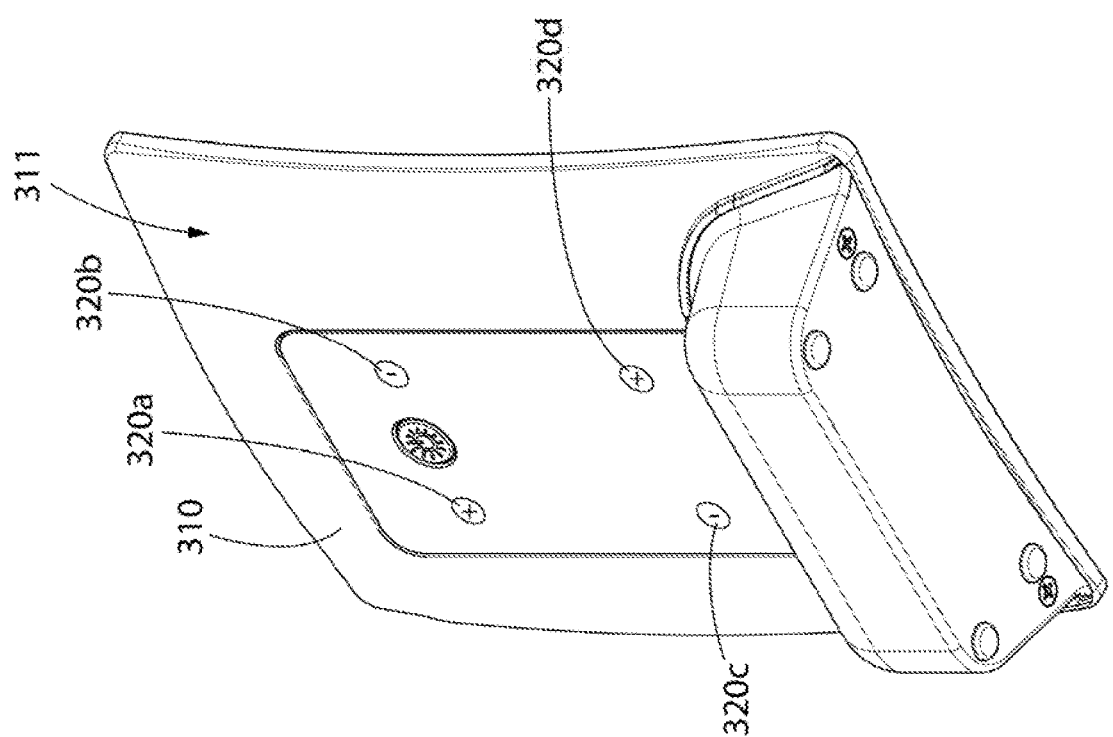
Figure 26:
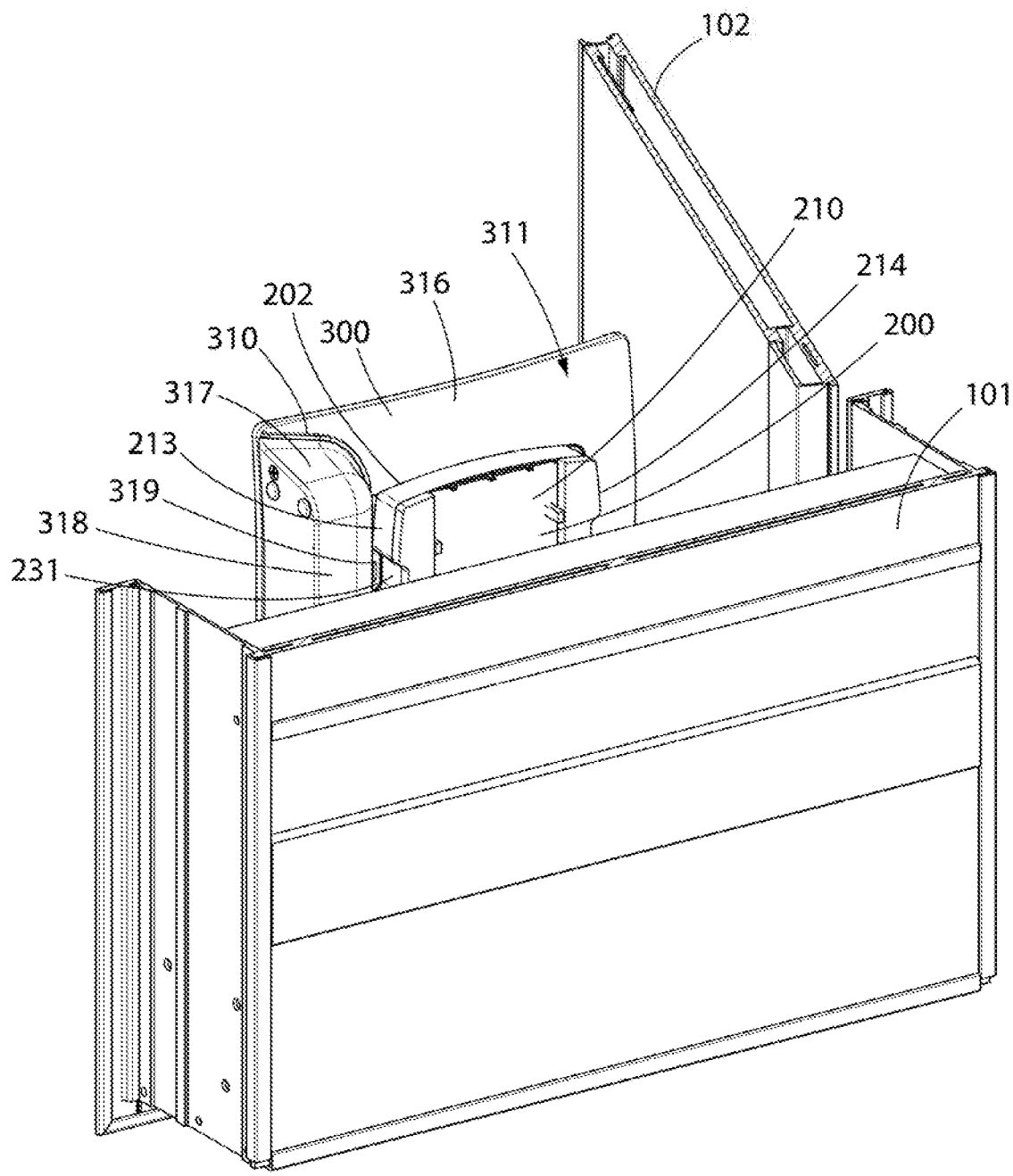
FIG. 26 is a schematic cross-sectional view of the cabinet of FIG. 1 illustrating the accessory coupled to the charger in a first orientation.
Figure 27:
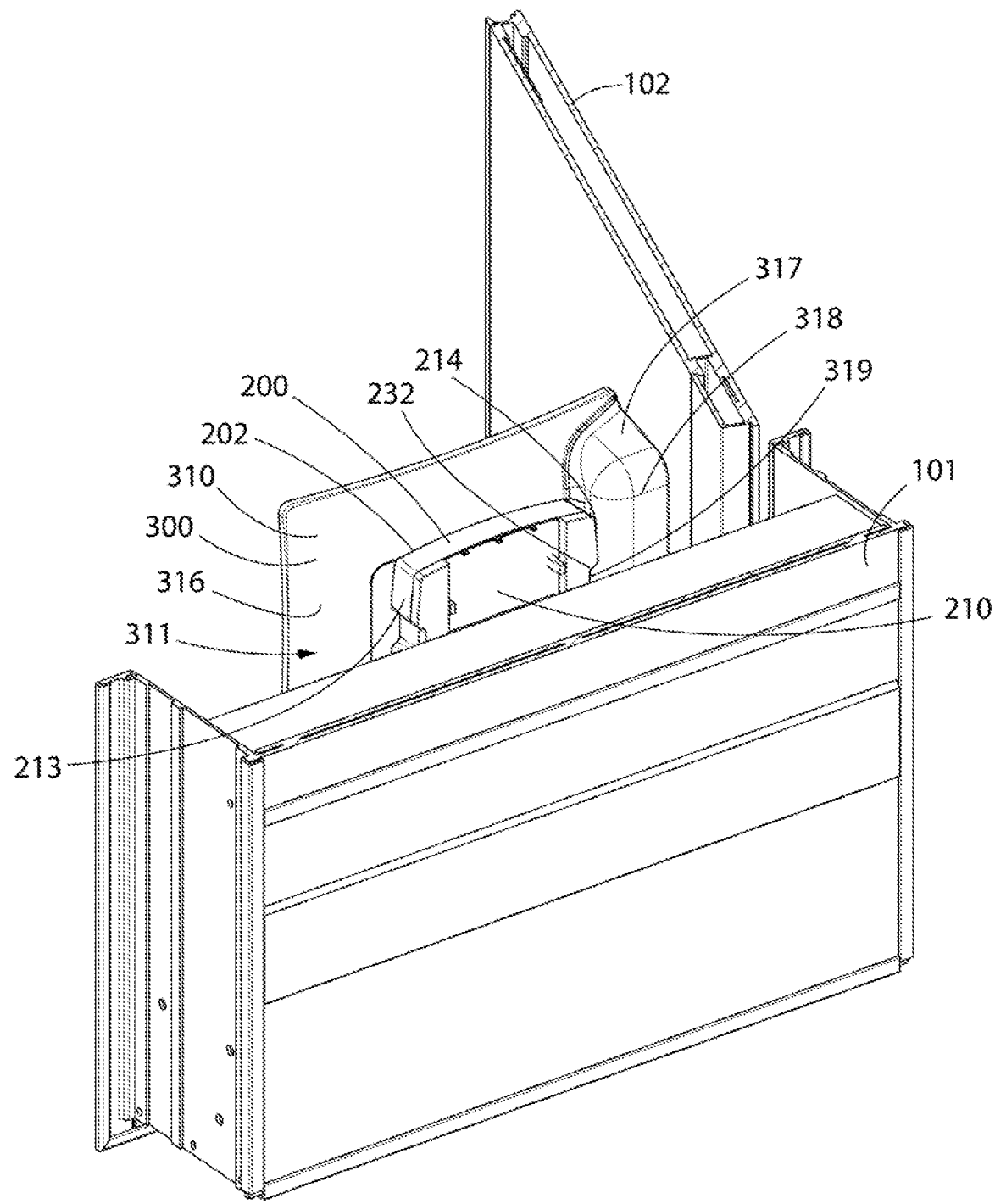
FIG. 27 is a schematic cross-sectional view of the cabinet of FIG. 1 illustrating the accessory coupled to the charger in a second orientation.

Specifically, referring to FIGS. 25-27, the coupling of the accessory 300 to the charger 200 will be further described. The accessory 300 comprises the first set of magnets 320a-d positioned at the rear surface 311 of the accessory housing 310. Of the first set of magnets 320a-d, two of the magnets 320a, 320d have a positive charge facing out at the rear surface 311 and two of the magnets 320b, 320c have a negative charge facing out at the rear surface 311. The two positive magnets 320a, 320d are arranged diagonal relative to one another and the two negative magnets 320b, 320c are arranged diagonal relative to one another. The charger 200 comprises the arrangement of magnets 290a-d positioned at the front surface 202 of the charger 200. Of the arrangement of magnets 290a-d, two of the magnets 290a, 290d have a negative charge facing out at the front surface 201 and two of the magnets 290b, 290c have a negative charge facing out at the front surface 201. The two positive magnets 290b, 290c are arranged diagonal relative to one another and the two negative magnets 290a, 290d are arranged diagonal relative to one another.

The accessory 300 can be coupled to the charger 200 so that the positive magnet 320a aligns with one of the negative magnets 290a, 290d, the positive magnet 320d aligns with one of the negative magnets 290a, 290d, the negative magnet 320b aligns with one of the positive magnets 290b, 290c, and the negative magnet 320c aligned with one of the positive magnets 290b, 290c. Due to the arrangement of the magnets, the charger 200 and the accessory 300 are configured so that the accessory 300 can be mounted to the charger 200 in a first rotational orientation and a second rotational orientation. In both rotational orientations, an inductive element of the accessory 300 is in operable cooperation with an inductive element of the charger 200 to charge the accessory 300.

FIG. 26 illustrates the accessory 300 mounted to the charger 200 in the first rotational orientation. In the first rotational orientation, the registration feature 319 of the accessory 300 mates with the first registration feature 231 of the charger 200. Furthermore, in the first rotational orientation, the rear surface 311 of the panel section 316 of the accessory 300 is adjacent to the front surface 202 of the housing 210 of the charger 200. Furthermore, in the first rotational orientation, the base section 317 of the accessory housing 310 extends beyond the first side surface 213 of the housing 210 of the charger 200 such that the protruding portion 318 of the base section 317 is adjacent to the first side surface 213 of the housing 210 of the charger 200.

FIG. 27 illustrates the accessory 300 mounted to the charger 200 in the second rotational orientation. As shown, the second rotational direction is 180 degrees from the first rotational direction. Thus, the accessory can be rotated 180 degrees from the first rotational direction and mounted to the charger 200 in the second rotational direction. This is possible due to the placement of the positive and negative magnets on the accessory 300 and the charger 200 as described above. In both the first and second rotational orientations of the accessory 300, the positive magnets of the accessory 300 are aligned with the negative magnets of the charger 200 and the negative magnets of the accessory 300 are aligned with the positive magnets of the charger 200.

In the second rotational orientation, the registration feature 319 of the accessory 300 mates with the second registration feature 232 of the charger 200. Furthermore, in the second rotational orientation, the rear surface 311 of the panel section 316 of the accessory 300 is adjacent to the front surface 202 of the housing 210 of the charger 200. Furthermore, in the first rotational orientation, the base section 317 of the accessory housing 310 extends beyond the second side surface 214 of the housing 210 of the charger 200 such that the protruding portion 318 of the base section 317 is adjacent to the second side surface 214 of the housing 210 of the charger 200.

As noted above, the protruding portion 318 protrudes from the rear surface 301, 311 of the accessory housing 310 the first distance DP1. Furthermore, the charger housing 210 has a second depth DP2 (see FIG. 13) measured from the rear surface 201 of the charger housing 210 to the front surface 202 of the charger housing 210. The first distance DP1 is less than or equal to the second depth DP2.

Referring again to FIGS. 2, 5, and 6, as noted above in FIG. 2 the accessory 300 is coupled to the charger 200 in one of the first and second rotational orientations. The accessory 300 can be rotated between the first and second rotational orientations as desired and coupled to the charger 200 in either orientation. In the exemplified embodiment, this coupling is achieved via magnetic mating or magnetic attraction between the magnets 320a-d of the accessory 300 and the magnets 290a-d of the charger 200. As shown in FIG. 5, the accessory 300 may be decoupled from the charger 200 by pulling the accessory 300 away from the charger 200 with sufficient force to overcome the magnetic attraction between the magnets 320a-d of the accessory 300 and the magnets 290a-d of the charger 200.

As shown in FIG. 6, the accessory 300 can then be coupled to the door 102 at any location along the first ferromagnetic element 108. The accessory 300 is coupled to the first ferromagnetic element 108 using the second set of magnets 330a-b rather than the first set of magnets 320a-d. Thus, the first set of magnets 320a-d are used to couple the accessory 300 to the charger 200 and the second set of magnets 330a-b are used to couple the accessory 300 to the first ferromagnetic element 108. The accessory 300 is coupled to the door 102 in such a manner that the accessory 300, and more specifically the third mirror 303, extends outwardly and away from the inner surface 105 of the door 102 in a normal/perpendicular manner with the third mirror 303 facing away from the cabinet housing 101. As a result, with the door 102 in an open state, the third mirror 303 faces a user so that the user can use the third mirror 303, which may be a magnification mirror as described herein above. When the accessory 300 is coupled to the door 102, the anti-skid elements 315 are in contact with the inner surface 105 of the door 102, thereby providing friction to prevent the accessory 300 from sliding down along the inner surface 105 of the door 102.

As discussed above, in some embodiments the charger 200 may be omitted and the accessory 300 may be coupled directly to the support member 150. The accessory 300 may be both mechanically and electrically coupled to the support member 150 so that the support member 150 supplies power to the accessory 300 and holds the accessory 300 within the cabinet 100. Thus, the accessory 300 may include the second mounting element (i.e., the protuberance) to facilitate coupling of the accessory 300 to the support member 150. In some embodiments the electronic components of the accessory 300 (such as the light source) may be powered by a battery such that there is no need to charge the accessory 300. In such embodiments the accessory 300 may be held within the cabinet 100 in any manner as described herein without power being supplied to the accessory 300.

The above is a detailed description of the structure of the components of the system 1000 along with a brief description of the functionality of the components of the system 1000. Starting with FIG. 28, a system 2000 will be described providing additional detailed description of the functionality. Although the numeral 2000 is used below to describe the system, the description below is applicable to the system 1000 described above and vice versa. Specifically, the functionality provided below is in some embodiments the functionality of the system 1000 described above despite the fact that the reference numeral 2000 and the 2000-series of numbers is used to designate the components of the system. Furthermore, the structure of the components of the system 1000 described above is applicable to the components of the system 2000 described below. For example, the accessory is designated as numeral 300 in the description above and the accessory is designated as numeral 2001 in the description below, but the descriptions above and below with regard to the structure and functionality of the accessory may be applicable to one stand-alone embodiment of the accessory. Thus, despite the fact that two different numerals are used herein to describe the accessory and some of the other components of the system 1000, 2000, in some embodiments this may be describing the same accessory (or other component). The same is true with regard to each of the other components, including the charger, the support structure, the power supply, the charging circuit, etc.

Figure 28:
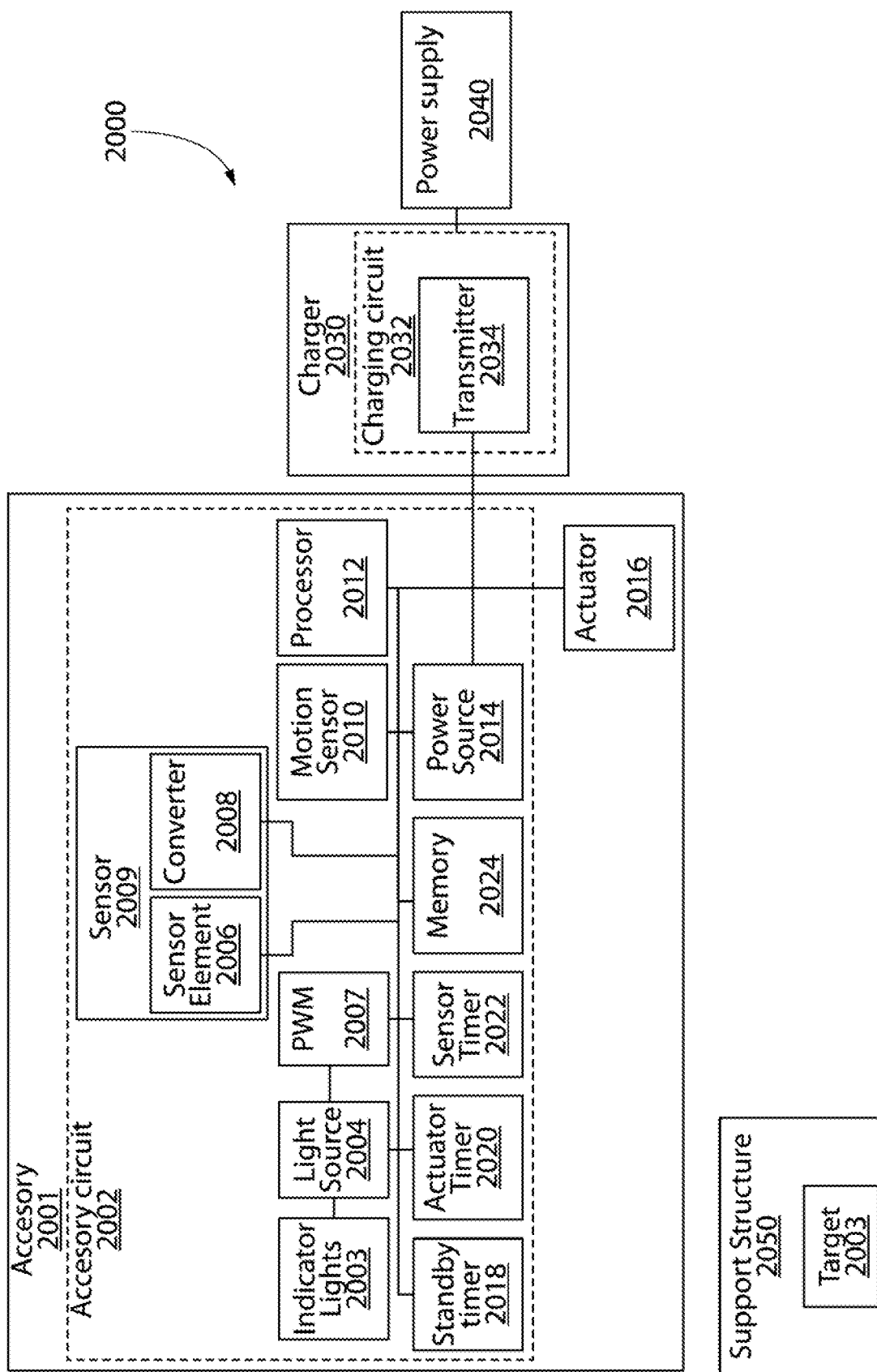
FIG. 28 is a schematic of a system according to one embodiment.

FIG. 28 is a schematic of a system 2000 that will be described according to one embodiment. The system 2000 generally includes an accessory 2001, a charger 2030, a support structure 2050, and a power supply 2040. As noted above, the structural details and some functional details of the accessory 2001 are described above with regard to the accessory 300 and the structural details and some functional details of the charger 2030 are described above with regard to the charger 200. The functionality of these components and their interaction with one another will be elaborated below. The support structure 2050 is any structure that the accessory 2001 is coupled to when in the use state, such as the door 102 of the cabinet 100, or more specifically the ferromagnetic element 108 as described above, or any other structure. Specifically, while the accessory 2001 (or the accessory 300) is coupled to the support member 150 indirectly via the charger 2030 (200) when in the charging state, the accessory 2001 (or the accessory 300) is coupled to the support structure 2050 (which, as described above, may be the door 102 of the cabinet 100 or the like) when in the use state.

The charger 2030 is operably coupled to the power supply 2040 and to the accessory 2001 to provide power to the accessory 2001 when the accessory 2001 is in the docked state (also referred to herein as the charging state) and not coupled to the support structure 2050. In the exemplified embodiment, the power supply 2040 is standard mains power that can be provided by a wall outlet. In other embodiments, the power supply 2040 can be any other source of power as discussed in detail above. As described above, the power supply 2040 (such as the power supply circuit 157 described above) may form a part of or be housed within the support structure 2050 and the charger 2030 may be coupled to the support structure 2050 and to the power supply 2040 as described above. The charger 2030 is discussed in detail above. The charger 2030 may in some embodiments be a docking station and it may include a charging circuit 2032 (which may be the charging circuit 250 described above). The charging circuit 2032 includes a transmitter 2034 for transmitting power to the accessory 2001. One of ordinary skill in the art will understand that the charger 2030 and the accessory 2001 can include other standard electrical components for performing standard operations such as analog-to-digital conversion or the like.

The accessory 2001 can take several forms, as discussed above. In the exemplified embodiment illustrated in FIG. 28, the accessory 2001 is in the charging state (operably coupled to the charger 2030), rather than in the use state (decoupled from the charger 2030 and/or coupled to the support structure 2050). The accessory 2001 can include an accessory circuit 2002 (which may be the accessory circuit 350 described above). The accessory circuit 2002 can include, in operable communication, a user perceptible signal generator 2004 (described above as numeral 351), an accessory power source 2014 (described above as numeral 352), and a sensor 2009 configured to detect when the accessory 2001 is mounted to the support structure 2050. The accessory 2001 can further include a processor 2012 for transmitting and receiving data and carrying out programmed operations, such as those discussed below, and memory 2024 for storing data. As discussed above, the support structure 2050 can be a cabinet, a component within a cabinet, a component coupled to a cabinet, a component that is distinct from a cabinet, or other structure.

The user perceptible signal generator 2004 can be used to generate any type of signal, including sound, light, a tactile signal that a user can perceive by touch, a scented signal that a user can perceive by smell, or the like. In the exemplified embodiment, the user perceptible signal generator is a light source 2004 such that the user perceptible signal generator or light source 2004 provides a white LED light that is emitted about the perimeter/periphery (or otherwise, such as emitted from a central region, from the corners, or the like) of the accessory 2001. The accessory circuit 2002 can further include a pulse width modulator (PWM) 2007 for altering the illumination intensity of the light source 2004 (or the intensity of any other type of user perceptible signal when the user perceptible signal is not a light source, such as adjusting volume when the user perceptible signal is a sound source). In other embodiments, other means can be used for altering such signal intensity. The accessory power source 2014 can be any source of power. In the exemplified embodiment, the accessory power source 2014 is a battery for powering the light source 2004 and other elements.

The sensor 2009 can be configured to detect (directly or indirectly) when the accessory 2001 is mounted to the support structure 2050 (that is, in a mounted state) or not mounted to the support structure 2050 (that is, in a non-mounted state). This detection can be based on the detected presence of a target 2052 of the support structure. In one embodiment, the support structure 2050 can include a target 2052 having a predetermined characteristic (or characteristics), such as a composition (e.g., type of metal), size, thickness, shape, an/or location on or within the support structure 2050. This predetermined characteristic can be used as a basis for detecting the target 2052. As discussed above, the target 2052 can be any object to be sensed by the accessory 2001. For example, in one exemplified embodiment, the target 2052 may be the first ferromagnetic element 108 described above with specific reference to FIGS. 5-7. Thus, in the exemplified embodiment, the target 2052 is an elongated plate formed of a ferromagnetic material. The accessory circuit 2002 is configured to automatically transition the circuit from an inactive state to an active state upon the sensor 2009 detecting that the accessory 2001 is mounted to the support structure 2050. In such embodiment, the user perceptible signal generator may generate a user perceptible signal (i.e., emit light, emit sound, or the like) when the accessory circuit 2002 is in the active state, and not generate a user perceptible signal when the accessory circuit 2002 is in the inactive state. The target 2052 can also be configured to enable the accessory 2001 to mount to the support structure 2050 (e.g., by magnetic attraction between the accessory and the target 2052, which is described in detail above with the target 2052 being the first ferromagnetic element 108).

The sensor 2009 can be any device configured to determine (directly or indirectly) that the accessory 2001 is mounted to the support structure 2050 by detecting the target 2052. In one embodiment, the sensor 2009 can be configured to detect the target 2052 by detecting a predetermined parameter associated with the target 2052. The predetermined parameter can be any parameter associated with the target 2052. The sensor 2009 can comprise a sensor element 2006 that is responsive to the presence of the target. In one embodiment, the sensor element 2006 comprises an inductor (e.g., a coil or spring), and the predetermined parameter is an inductance of the inductor when the accessory is mounted to the support structure 2050. In another embodiment, the predetermined parameter is a resonant frequency of a resonator. For example, the sensor element 2006 can be an LC circuit. An AC current can be transmitted through an inductor of the LC circuit (sensor element 2006) to generate an AC magnetic field. The presence of a metal target can induce an eddy current on the surface of the metal target, which causes a new magnetic field that opposes the magnetic field caused by the inductor, and thereby change the resonant frequency (and inductance) of the LC circuit. A predetermined number or range can reflect the expected resonant frequency (or inductance or similar parameter) of the LC circuit (sensor element 2006) when the accessory 2001 is mounted to the support structure 2050 and the LC circuit (sensor element) is thereby in the presence of the metal target 2052. The sensor 2009 can include a converter 2008 to drive the sensor element 2006 and/or determine measured values and provide a digital signal for the processor 2012. In one embodiment, the converter 2008 is the LDC1101 inductance-to-digital converter provided by Texas Instruments. The LCD1101 can measure both the impedance and the resonant frequency of an LC circuit by regulating the oscillation amplitude in a closed-loop configuration at a constant level, while monitoring the energy dissipated by the resonator. The resonant frequency of the LC circuit (sensor element) can used to determine the inductance of the LC circuit.

Further, as will be explained in more detail with respect to FIG. 37, the accessory 2001 can have a calibration mode whereby the predetermined number or range is reset. Thus, for example, if properties of the target 2052 do not correspond with the predetermined range (e.g., the metal has a shape, size, or location that is different than expected), the predetermined range can be changed to reflect sensor measurements when the accessory 2001 is mounted to the support structure 2050 having the target 2052. For example, if the target 2052 is a metal plate of differing composition or size, the predetermined range of values (e.g., resonant frequency or inductance values) can be changed to reflect the effect of the current target. The predetermined range is sometimes referred to as the detection range to reflect the range of values indicative of a detected target. As will be described in more detail below, the accessory 2001 can be mounted and a calibration mode can be entered. In calibration mode, the accessory 2001 can measure certain values (e.g., frequency or inductance values) and store these values (or values based thereon) in the memory 2024 as new predetermined numbers defining a range indicative of the presence of the target 2052.

As indicated above, in other embodiments the sensor 2009 or sensor element 2006 can use different technologies or parameters. For example, the sensor 2009 or sensor element 2006 can comprise a mechanical switch that is triggered when the accessory 2001 mounts to the support structure 2050. Thus, the accessory 2001 (or the accessory 300) may include a mechanical switch, such as a spring switch or the like, that is activated when the accessory 2001 is mounted to the support structure 2050. Specifically, as discussed above, such switch may extend from the bottom surface of the accessory 2001, 300 so that the contact between the accessory 2001, 300 and the support structure 2050 (i.e., the door 102, the first ferromagnetic element 108, or the like) causes the mechanical switch to activate and power the accessory 2001, 300. In other embodiments, the sensor 2009 or sensor element 2006 can comprise a hall-effect sensor, an infrared (IR) sensor, or another type of sensor. The detected parameter can be indicative of a composition, size, shape, location, or other characteristic of the target 2052.

The accessory circuit 2002 can include a standby timer 2018 for use with an auto-off feature. The accessory circuit 2002 can be configured to automatically start the standby timer 2018 upon the sensor 2009 detecting that the accessory 2001 is mounted to the support structure 2050, or at another time (such as when an actuator 2016, which may be the actuator 355 described above, is actuated). The accessory circuit 2002 can be further configured to automatically transition the accessory circuit 2002 from the active state to the inactive state upon the standby timer 2018 running for a predetermined time. In the inactive state, the light source 2004 (or other user perceptible signal generator) can cease generating light. One embodiment of this feature is discussed below with respect to FIG. 31, where the predetermined time is 15 minutes (operation 2228), and there is confirmation that there has been no movement of the accessory 2001 (operation 2216). In this embodiment, the accessory 2001 then enters a standby mode, which is discussed in detail with respect to FIG. 30.

Figure 31:
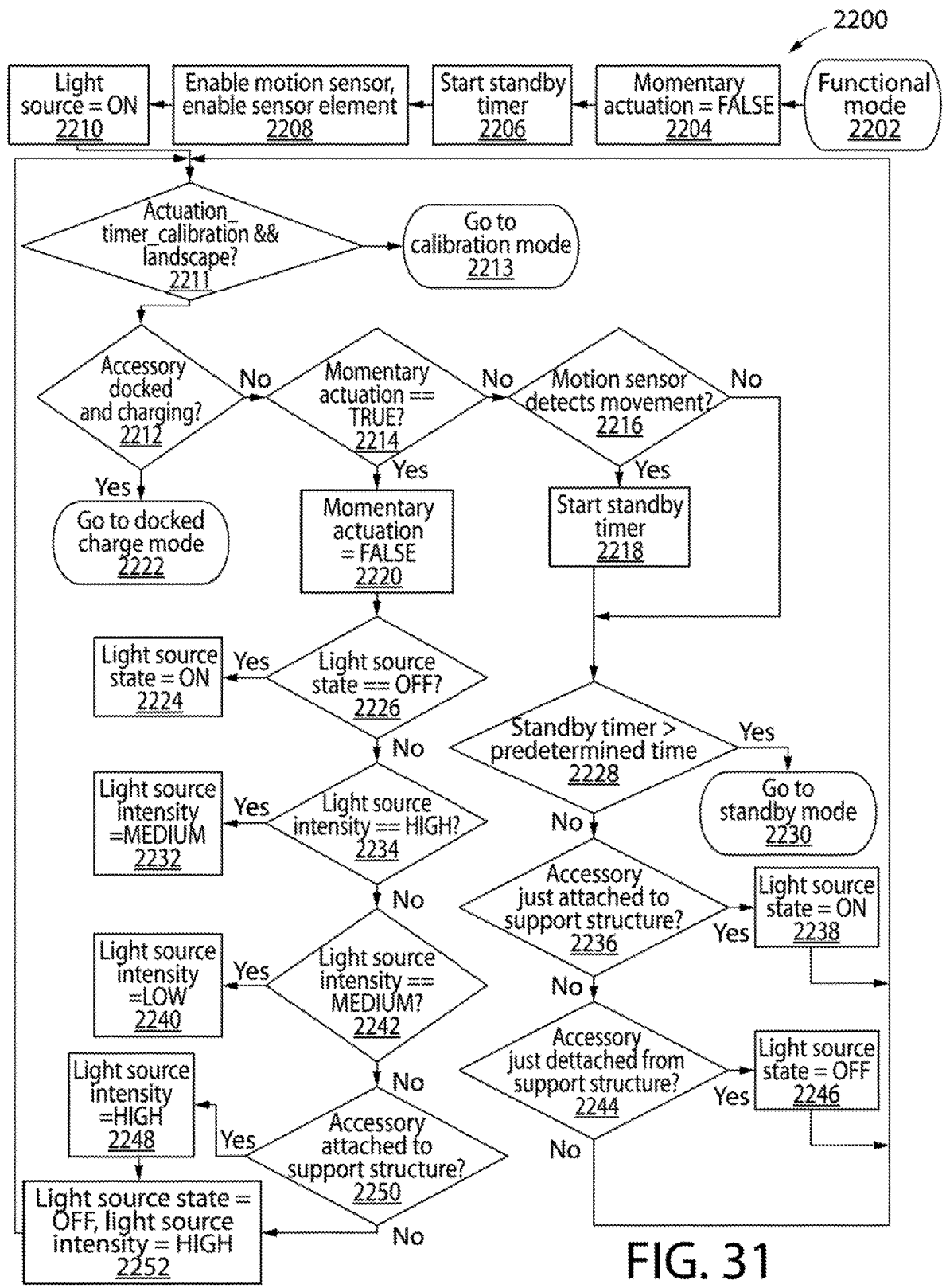
FIG. 31 is a flow chart describing a functional mode according to one embodiment.

The accessory circuit 2002 can further include a motion sensor 2010 configured to detect movement, vibration, and/or a change of orientation of the accessory 2001. Further, the accessory circuit 2002 can be configured to automatically reset the standby timer 2018 upon the motion sensor 2010 detecting the at least one of movement, vibration, or change of orientation of the accessory 2001. In the embodiment of FIG. 31 which is described in more detail below, this feature is shown at operation 2216. The motion sensor 2010 can be any sensor capable of detecting movement, vibration, and/or a change of orientation. In the exemplified embodiment, the motion sensor 2010 is an accelerometer.

The accessory 2001 can further include indicator lights 2003. In one embodiment, the indicator lights 2003 include a green LED and a red LED. These lights 2003 can be used, for example, to indicate that the accessory 2001 is charged or fully charged. Potential operations of the indicator LEDs are discussed in subsequent figures, including FIG. 35.

The accessory 2001 can further include a sensor timer 2022. As will be described in more detail below, the sensor timer 2022 can track the time when the sensor 2009 or sensor element 2006 is enabled, and the sensor 2009 or sensor element 2006 can be activated (thus triggering the timer) at predetermined events, such as when the motion sensor 2010 detects movement (see FIG. 30).

The accessory 2001 can further include a user-operated actuator 2016 (referred to above as user-operated actuator 355). The actuator 2016 can be any user-operated device for controlling some aspect of the accessory 2001. In the exemplified embodiment, the actuator 2016 is a button. The accessory circuit 2002 can be configured such that the actuator 2016 causes the performance of different routines depending on whether the accessory 2001 is mounted or not. A routine can comprise a sequence of one or more computer operations (or instructions) performed by the accessory, where the operation performed can depend on different factors. Actuation of the actuator 2016 can cause a first routine when the accessory 2001 is in the mounted state, and a second routine when the accessory 2001 is in the non-mounted state.

In one embodiment, the first routine is an adjustment of an illumination intensity of the light source 2004, and the second routine comprises (a) deactivation of the light source 2004 when the light source 2004 is in an active state; and (b) activation of the light source 2004 when the light source 2004 is in an inactive state. In some embodiments the first routine comprises adjusting the illumination intensity of the light source 2004 without permitting the light source 2004 to be powered off and the second routine comprises adjusting the illumination intensity of the light source 2004 while also permitting the light source to be powered off. Stated another way, in the non-mounted state an additional intensity is included in the routine, which is an "off" intensity such that the light source is not emitting any light. This "off" intensity is unavailable via the user-operated actuator 2016 when the accessory 2001 is in the mounted state. Thus, the "off" intensity can only be achieved via the user-operated actuator 2016 when the accessory 2001 is in the non-mounted state. There are other ways that the light source 2004 can be powered off with the accessory 2001 in the mounted state, including the use of a timer, which are described in more detail below.

In the exemplified embodiment with the user perceptible signal generator being the light source 2004, when the accessory 2001 is in the mounted state, actuation of the user-operated actuator 2016 can adjust an illumination intensity of the light source 2004 without turning the light source off. In the exemplified embodiment, the light source 2004 in the active state has three different intensities (high, medium, and low), though an infinite number of intensities can be used. In a preferred embodiment, adjustment of the illumination intensity can alter the illumination from high to medium, then medium to low, then low back to high, so that the light source 2004 remains in the active state. An example process is shown in FIG. 31, where if the illumination intensity is low, the actuator 2016 has been actuated, and the accessory 2001 is mounted (operation 2250), the light source intensity becomes high (operation 2248). Thus, the first routine enables adjustment of the illumination of the light source 2004 within the active state (i.e., from one active state illumination intensity to another active state illumination intensity). In other embodiments, actuation of the actuator 2016 can adjust the illumination intensity from high to medium, medium to low, low to off, then off to high or another intensity.

When the accessory 2001 is non-mounted, the actuator 2016 can provide on-off functionality. When the accessory 2001 is non-mounted and the light source 2004 is in an active state (that is, on), actuation of the user-operated actuator 2016 can deactivate the light source 2004 (that is, turn the light source off). Further, when the accessory 2001 is non-mounted and the light source 2004 is in an inactivate state (e.g., off), actuation of the user-operated actuator 2016 can activate the light source 2004. Furthermore, as discussed above, when the accessory 2001 is non-mounted, the actuator 2016 may also be able to adjust an illumination intensity of the light source 2004, while also being able to turn the light source off. In the exemplified embodiment, the light source 2004 in the inactive state (i.e., with the accessory 2001 in the non-mounted state) has three different intensities (high, medium, and low, though an infinite number of intensities can be used) and an off state. Thus, with the accessory 2001 in the non-mounted state, actuation of the actuator 2016 can adjust the illumination from high to medium, medium to low, low to off, and off back to high. In other embodiments, the second routine can only activate and deactivate the light, functioning like an on-off switch (without providing a range of illumination intensities).

Although described herein as illumination intensity and activation/deactivation of the light source 204, the invention is not to be so limited and in other embodiments the light source may be replaced with a sound source or the like as described above. In such other embodiments the first routine may adjust a volume or other parameter of the sound source or other user perceptible signal generator, and the second routine may control the activation/deactivation of the user perceptible signal generator.

In the embodiment shown in FIG. 30, when the accessory 2001 is non-mounted, actuation of the user-operated actuator 216 (operation 2180) causes the accessory 2001 to enter functional mode (operation 2186), where the light source 2004 is turned on in operation 2210 (described in more detail below with reference to FIG. 31). In this embodiment, in the non-mounted state, actuation of the actuator 2016 causes the light source 2004 to change from high to medium, medium to low, low to off, and off to high. In FIG. 31 it is shown that, when the accessory 2001 is non-mounted, actuation of the actuator 2016 can turn the light source 2004 off (operation 2252). In other embodiments, in the non-mounted state, the actuator 2016 can simply function as an on-off switch, rather than providing differing levels of light intensity.

The accessory circuit 2002 can be further configured to automatically transition the light source 2004 from the inactive state to the active state upon the sensor 2009 detecting that the accessory 2001 is mounted to the support structure 2050. In this regard, the light source 2004 can be actuated without use of the actuator 2016. Specifically, as soon as the sensor 2009 detects that the accessory 2001 is mounted to the support structure 2050, the accessory circuit 2002 will automatically activate the light source or other user perceptible signal (i.e., cause the light source to emit light). Such a process is shown in FIG. 31, particularly operation 2238, which is described in greater detail below.

The accessory 2001 can further include an actuator timer 2020. As discussed in greater detail below with reference to FIG. 29B, the actuator timer 2020 can begin when the actuator 2016 is actuated and can help determine how long the actuator 2016 is actuated. If the actuator 2016 is actuated longer than a predetermined time, the accessory 2001 can enter a ship mode (see FIG. 33). This will preserve battery so that the user perceptible signal generator is only generating a signal when the accessory 2001 is being used.

Figure 29A:
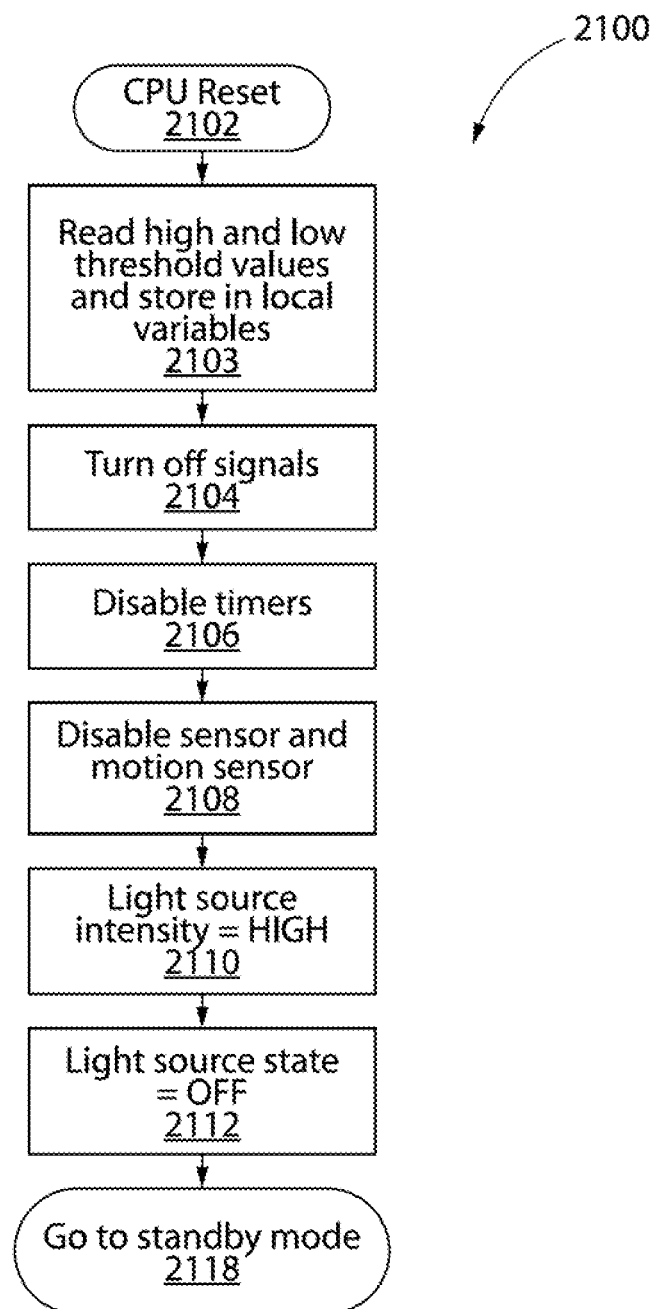
FIG. 29A is a flow chart describing a CPU reset mode according to one embodiment.

FIGS. 29A-36 provide several flow charts describing different possible operations and modes of operation for the accessory. FIG. 29A is a flow chart 2100 describing a CPU reset mode 2102 according to one embodiment. The CPU reset mode 2102 can be initiated in a number of ways, for example, by a user holding down the user-operated actuator for a predetermined period of time, by pressing a separate reset button on the accessory, or by otherwise triggering a reset. When the CPU reset 2102 is triggered, high and low threshold values (e.g., resonant frequency values for an LC circuit sensor element) are read from memory 2024 and stored in local variables. In the exemplified embodiment, the threshold values read from an EEPROM, though the invention is not limited to a particular type of memory. In the exemplified embodiment, the high and low frequency threshold values represent a range of resonant frequency values for an LC circuit sensor element. If the sensor detects a resonant frequency value within this range (between the high and low thresholds), it will be determined that the accessory 2001 is mounted to the support structure 2050. In other embodiments, the threshold values can be other types of values, such as inductance or impedance values.

Further, when the CPU reset 2102 is triggered, the accessory user perceptible signals (such as, for example without limitation green, red, and/or white LEDs, or sounds) can be turned off (operation 2104), the accessory's timers can be disabled (operation 2106), and the accessory's sensor and the motion sensor can be disabled (operation 2108). In the exemplified embodiment, the user perceptible signal is a light from a light source, the light source being capable of differing illumination intensities. In this mode, a light source illumination intensity setting can be set to high (operation 2110), and the light source can be turned off (operation 2112). By setting the illumination intensity to high, the illumination intensity will be high when the light source is turned back on. Further, the accessory can enter a standby mode (operation 2118), which is shown in FIG. 30. Other operations can be included. In one embodiment, there can be a determination whether a TST pin on a PCB board of the accessory is low and, if so, the accessory can go to a manufacturing test.

Figure 29B:
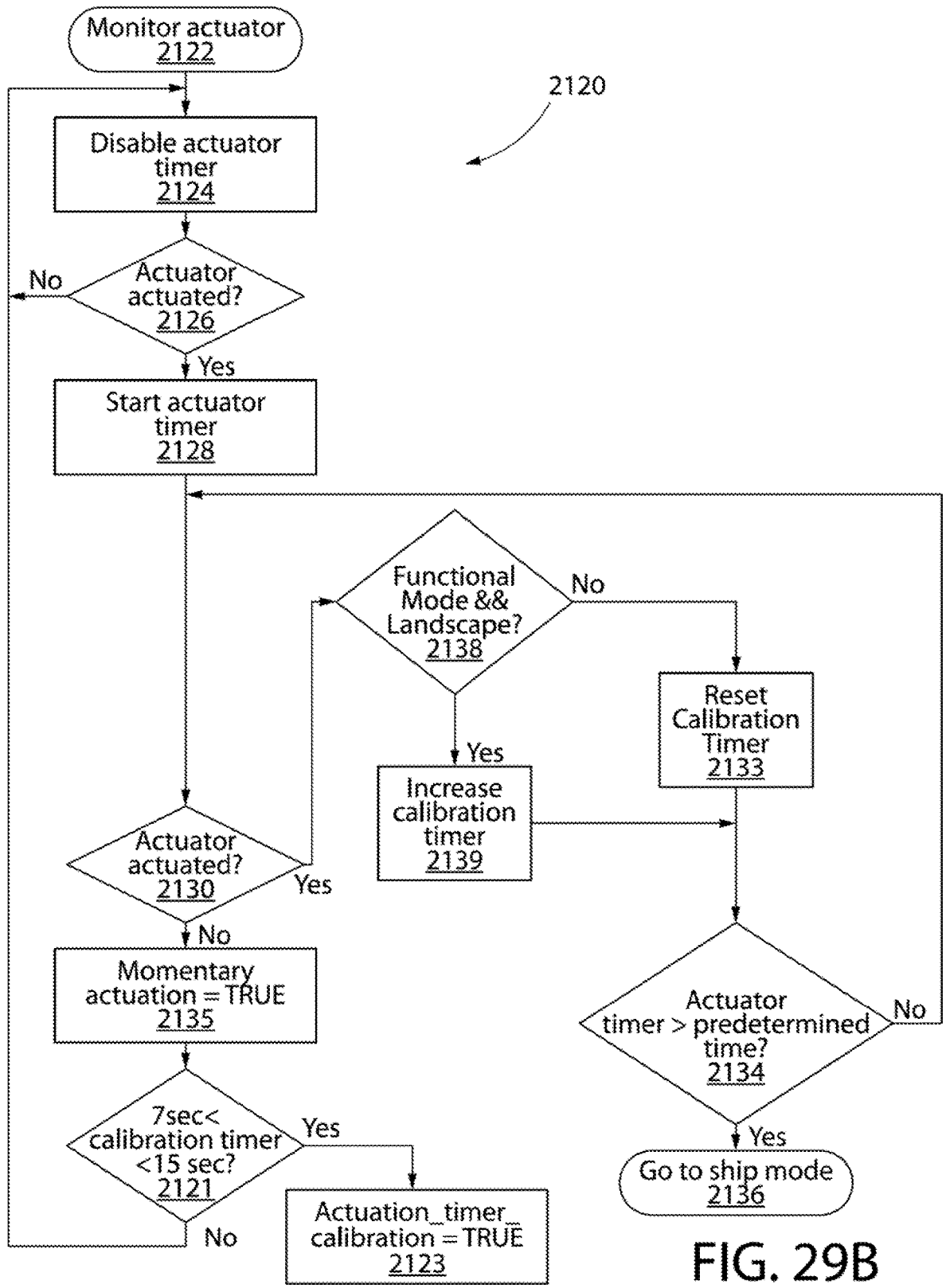
FIG. 29B is a flow chart describing a monitor actuator mode according to one embodiment.

FIG. 29B is a flow chart 2120 describing a monitor actuator mode according to one embodiment. The monitor actuator mode 2122 runs in the background. This mode can be used to determine whether the user-operated actuator is being held down to put the accessory in a ship mode (shown in FIG. 33) where all background tasks are disabled. The accessory can include an actuator timer. After the actuator timer is disabled (operation 2124), there can be a determination whether the actuator is actuated (operation 2126). If it is, the actuator timer starts (operation 2128). There is again a determination whether the actuator is actuated (operation 2130).

If the actuator is actuated, and there is a determination that the accessory is in functional mode and landscape orientation (operation 2138), the calibration timer is increased (operation 2139). If the button is pressed more than a predetermined time (e.g., 20 seconds) (operation 2134), the accessory goes to ship mode (operation 2136). If not, there is return to operation 2130. If the button is pressed but the accessory is not in functional mode and landscape orientation, the calibration timer is reset (operation 2133).

If the actuator is not actuated at operation 2130, and there is a momentary actuation (e.g., button press) (operation 2135), and the calibration timer has been set for a predetermined time (e.g., between 7 and 15 seconds) (operation 2121), then a flag is set indicating the actuation timer calibration is true (e.g., button_pressed_timer_calibration) (operation 2123).

Figure 29C:
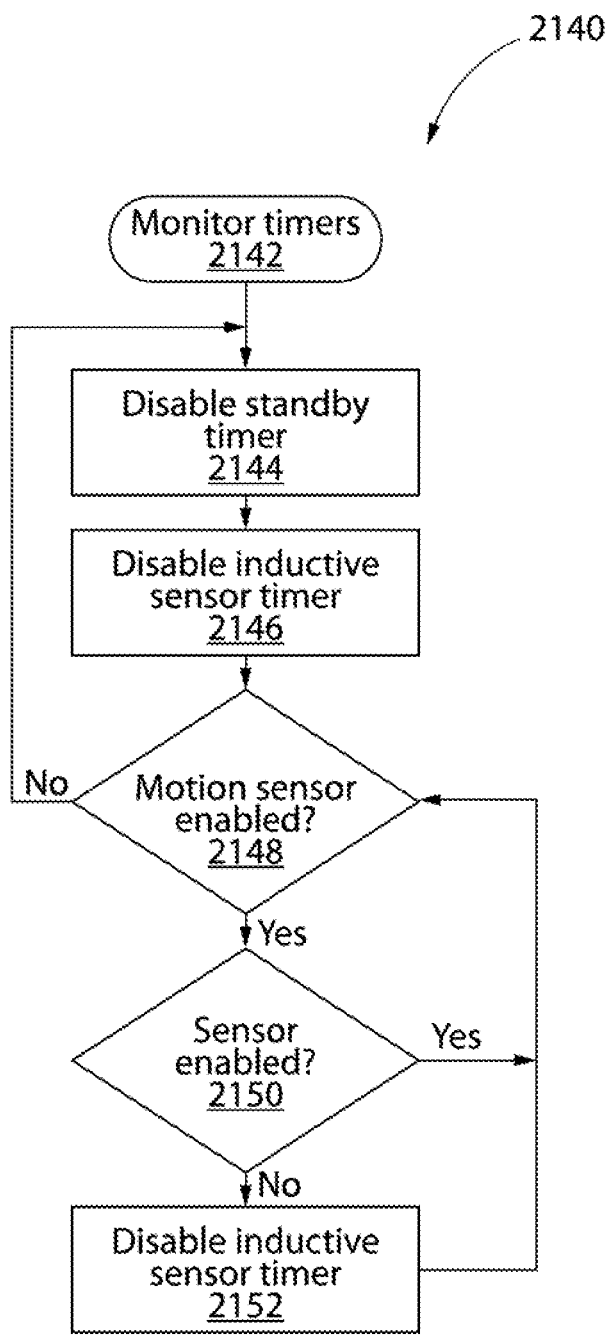
FIG. 29C is a flow chart describing a monitor timers mode according to one embodiment.

FIG. 29C is a flow chart 2140 describing a monitor timers mode according to one embodiment. The monitor timers mode 2142 can run in the background to disable timers that are not needed. A standby timer can be disabled (operation 2144). Further the inductive timer can be disabled (operation

2146). Further, a determination can be made whether the motion sensor has been enabled (operation 2148). If so, there is a determination whether the sensor is enabled (e.g., to sense metal) (operation 2150). If the sensor is not enabled, the sensor timer can be disabled (operation 2152). If the sensor is enabled, another determination will be made regarding whether the motion sensor is enabled (operation 2148).

Figure 30:
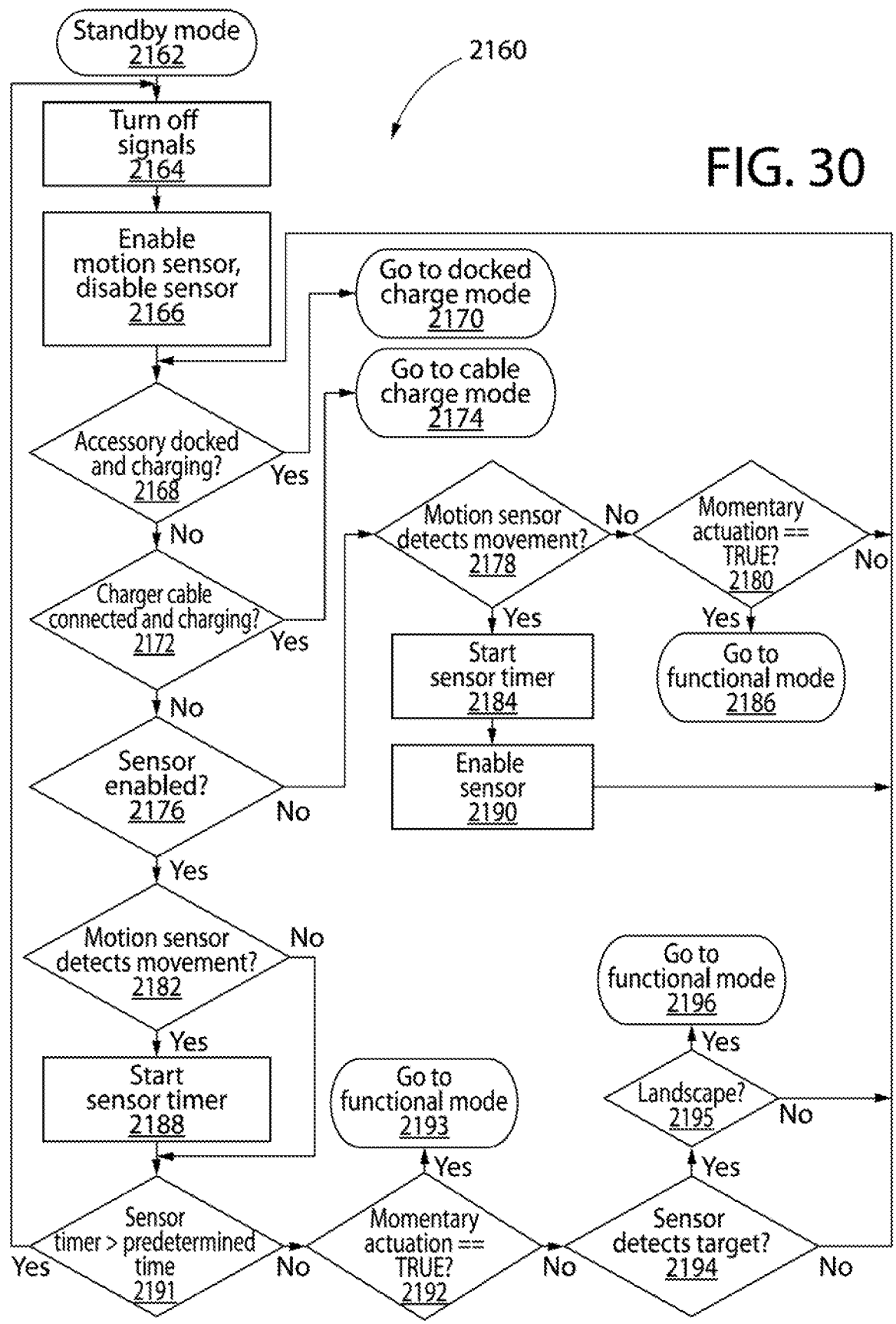
FIG. 30 is a flow chart describing a standby mode according to one embodiment.

FIG. 30 is a flow chart 2160 describing a standby mode 2162 according to one embodiment. Standby mode 2160 can be used to reduce power consumption by disabling features when the accessory is not in use. The user can exit standby mode, for example, by actuating the actuator or by removing and reattaching the accessory (such as to the support member or the cabinet as described above). In standby mode 2162, the signals (e.g., green, red, and white LEDs) can be turned off (operation 2164). Further, the motion sensor can be enabled, and the sensor can be disabled (operation 2166). If the accessory is docked and charging (operation 2168), then docked charge mode is activated (operation 2170). Docked charge mode is shown in FIG. 32.

If the accessory is not docked and charging, a determination can be made whether the accessory is connected to a charging cable (e.g., a USB cable) for charging (operation 2172). Thus, the accessory can be charged by directly coupling the accessory to a power source (i.e., a wall socket or the like) rather than by inductive charging or the like from the charger. If so, the cable charge mode is activated (operation 2174), which is shown in FIG. 32. If not, a determination is made whether the sensor is enabled (operation 2176). If not, a determination is made whether the motion sensor detected movement (operation 2178). If not, a determination is made whether there was a momentary actuation of the actuator (e.g., a momentary button press) (operation 2180). If not, there is a return to operation 2168 to determine whether the accessory is docked and charging. If there was a momentary actuation, then the accessory goes to functional mode (operation 2186), which is shown in FIG. 31 and described below.

If in operation 2178 the motion sensor detects movement, the sensor timer starts (operation 2184), the sensor is enabled (operation 2190), and there is a return to operation 2168 to determine whether the accessory is docked and charging.

If in operation 2176 it is determined that the sensor is enabled, there is a determination whether the motion sensor detects movement (operation 2182). If so, the sensor timer for the sensor is started (operation 2188). Next, there is a determination whether the sensor timer has been running from more than a predetermined time (e.g., 10 seconds) (operation 2191). If so, the accessory returns to the beginning of the standby mode process 2160. If the sensor timer has not been running from more than 10 seconds, there is a determination whether there was a momentary actuation of the actuator (operation 2192). If there was, the accessory enters functional mode 2193, which is shown in FIG. 31.

If there was not a momentary actuation of the actuator at operation 2192, there is a determination whether the sensor detects a target (operation 2194), which can occur when the accessory is attached to a support structure. If a target is not detected, there is a return to operation 2168. If a target is detected, the user perceptible signal (i.e., light source, etc.) may be automatically activated. Furthermore, if a target is detected, there can be a determination whether the accessory is in a landscape orientation (operation 2195). In one embodiment, the orientation of the accessory is determined by the motion sensor, which comprises an accelerometer. In other embodiments, this operation (as with other operations) can be omitted. If the accessory is in landscape orientation, the accessory can go to functional mode 2196. If not, there can be a return to operation 2168.

FIG. 31 is a flow chart 2200 describing a functional mode 2202 according to one embodiment. Functional mode 2202 is used to activate/deactivate the user perceptible signal (i.e., turn on/off a light source) and possibly also adjust the user perceptible signal (i.e., adjust illumination intensity of the light source) when the accessory is detached from the support structure/cabinet and to adjust the user perceptible signal (i.e., adjust illumination intensity of the light source) when the accessory is attached to the support structure/cabinet. The light source can cycle different light source illumination intensities when the actuator is actuated. In one embodiment, the user must detach the accessory from the support structure (e.g., cabinet) to turn off the light source such that the light source can not be turned off when the accessory is coupled to the support structure.

In functional mode, when the actuator is no longer actuated (operation 2204), the standby time can be started (operation 2206). Further, the motion sensor can be enabled, and the sensor can be enabled (operation 2208). Further, the light source can be on (operation 2210).

If the actuation timer calibration is true and the accessory is in landscape (operation 2211), the accessory can enter calibration mode (operation 2213). If not, a determination can be made whether the accessory is docked and charging (operation 2212). If it is, the accessory goes to docked charge mode 2222, shown in FIG. 32. If the accessory is not docked and charging (i.e., not coupled to the charger as described above), there is a determination whether there was a momentary actuation of the actuator (operation 2214) and then a cessation of the actuation (operation 2220). Further, there is a determination whether the light source is off (operation 2226). If so, then the light source turns on (operation 2224), and there is a return to operation 2212. If the light source was not off, there is a determination whether the light source intensity was high (operation 2234). If so, the light source intensity dims from high to medium (operation 2232). If the light source intensity was not high, there is a determination whether the light source intensity is medium (operation 2242). If so, the light source intensity dims to low (operation 2240). If not, the light source intensity is low, and there is a determination whether the accessory is attached to the support structure (operation 2250). If it is, the light source intensity becomes high (operation 2248). If the accessory is not mounted to the support structure, the light source is switched off (operation 2252). Furthermore, if the accessory is not mounted to the support structure, the intensity can be set to high such that, when the light source is later turned on, the light source provides a high illumination intensity. Thus, setting the illumination intensity to high is done in the background because the light source is actually off at this stage, but the high illumination will be generated upon the next time that the light source is powered on.

Thus, in this embodiment, when the accessory is mounted/coupled to the support structure, activating the actuator changes the illumination of the light source (or volume of sound source, etc.) from high to medium to low and then back to high. Furthermore, in this embodiment when the accessory is not mounted/coupled to the support structure, activating the actuator changes the illumination of the light source (or volume of sound source, etc.) from high to medium to low to off and then back to high. Thus, in the exemplified embodiment, there is an additional state, which is the off state, when the accessory is not mounted/coupled to the support structure which is not available when the accessory is mounted/coupled to the support structure. This is the reason that in the exemplified embodiment there is no determination made regarding whether the accessory is coupled to the support structure unless the intensity is low. Specifically, actuation of the actuator changes the intensity from high to medium and from medium to low regardless of whether the accessory is coupled to the support structure. However, when the intensity is low, if the accessory is coupled to the support structure the intensity changes from low to off and if the accessory is not coupled to the support structure the intensity changes from low to high. In other embodiments, when the accessory is not mounted/coupled to the support structure, activating the actuator simply changes the light source between an "on" state and an "off" state without altering illumination whereas when the accessory is mounted/coupled to the support structure, activating the actuator changes the illumination of the light source as described herein.

If it is determined in operation 2214 that the actuator is not actuated, there is a determination whether the motion sensor detects movement (operation 2216). If so, the standby timer starts (operation 2218). If not, this operation is skipped. Further, there is a determination whether the standby timer has been running for more than a predetermined time (e.g., 15 minutes) (operation 2228) to determine whether the light source should shut off for non-use. If it is, the accessory goes to standby mode 2230, shown in FIG. 30 and described above.

If the standby timer has not been running for the predetermined time, there is a determination whether the accessory was recently attached to the support structure (operation 2236). If so, the light source turns on (operation 2238). If not, there is a determination whether the accessory was recently detached from the support structure (operation 2244). If so, the light source is turned off (operation 2246). Thus, in the exemplified embodiment, when the accessory is first attached to the support structure after being not attached to the support structure, the light source will automatically turn on. The intensity of the light source at this stage may always be high, or it may be whatever the previous intensity was prior to the light source being turned off. Further, in the exemplified embodiment, when the accessory is detached from the support structure, the light source will automatically turn off. Although described herein with regard to a light source, it should be appreciated that other user perceptible signals such as those described herein may be used instead of the light source.

Figure 32A:
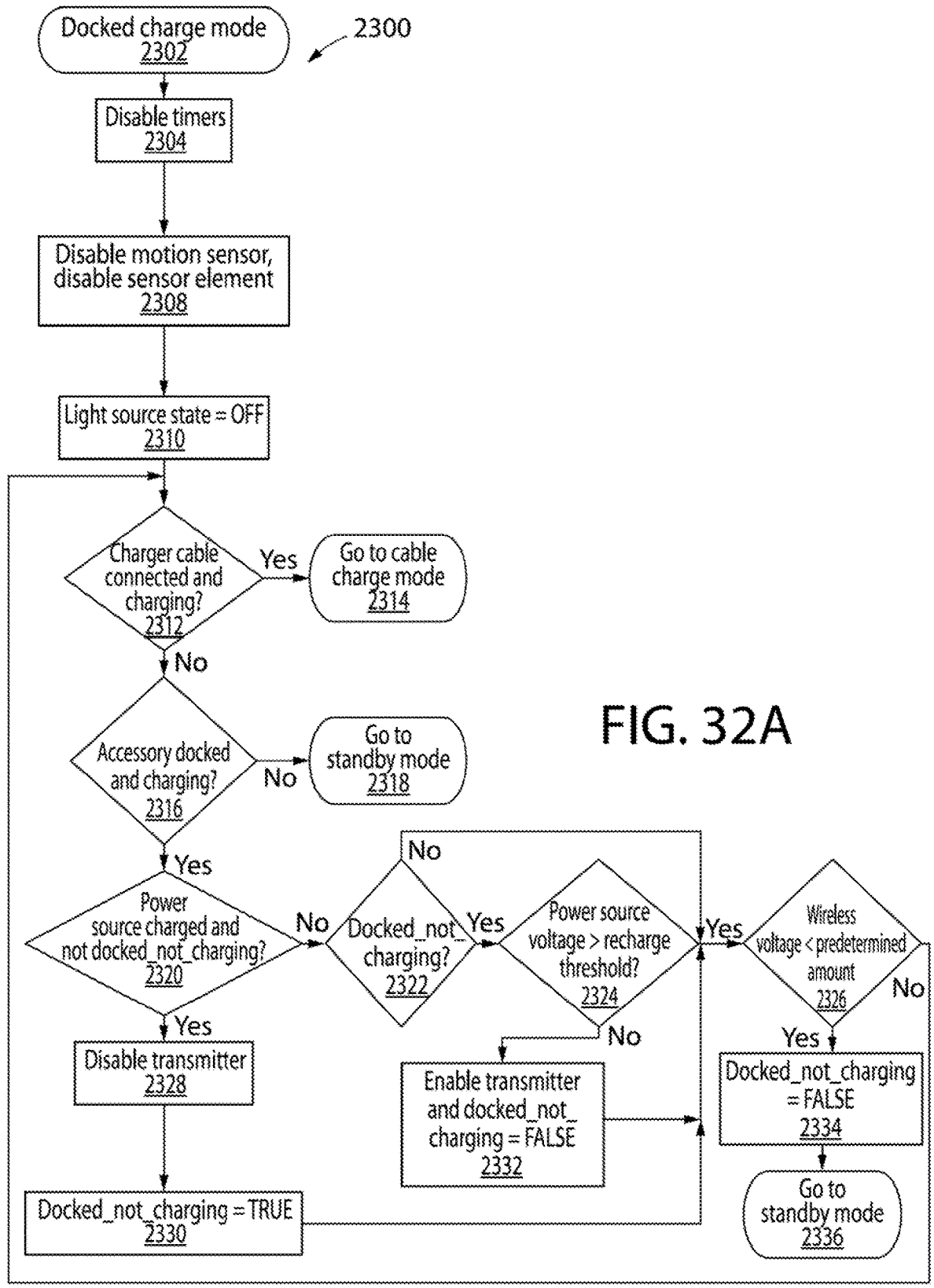
FIG. 32A is a flow chart describing a docked charge mode according to one embodiment.

FIG. 32A is a flow chart 2300 describing a docked charge mode 2302 according to one embodiment. Docked charge mode describes functions of the accessory when the accessory is docked in the charger. The timers can be disabled in this mode (operation 2304). Further, the motion sensor and sensor can be disabled (operation 2308), and the light source can be turned off (operation 2310). It is determined whether the charger cable is connected directly to the accessory and charging the accessory (operation 2312). If so, the accessory goes to cable charge mode 2314 (see flow chart 2350 of FIG. 32B described below). If the charger cable is not connected and charging, there is a determination whether the accessory is docked to the charger and charging (operation 2316). If not, the accessory goes to standby mode (operation 2318).

Provided the accessory is docked and charging, there is a determination whether the power source of the accessory is charged (operation 2320). If so, the transmitter transmitting power from the charger to the accessory is disabled (operation 2328) and this new state is recognized (operation 2330). If the power source of the accessory is not charged, it is determined whether the accessory is docked but not charging (operation 2322). If so, there is a determination whether the power source voltage is greater than a recharge threshold (operation 2324). If not, the transmitter is enabled (operation 2332). If the power source voltage is greater than a recharge threshold, there is a determination whether the wireless voltage is less than a predetermined amount (e.g., 200 mV) (operation 2326). If so, it is recognized the accessory is not docked and not charging (operation 2334), and the accessory goes to standby mode (operation 2336).

Figure 32B:
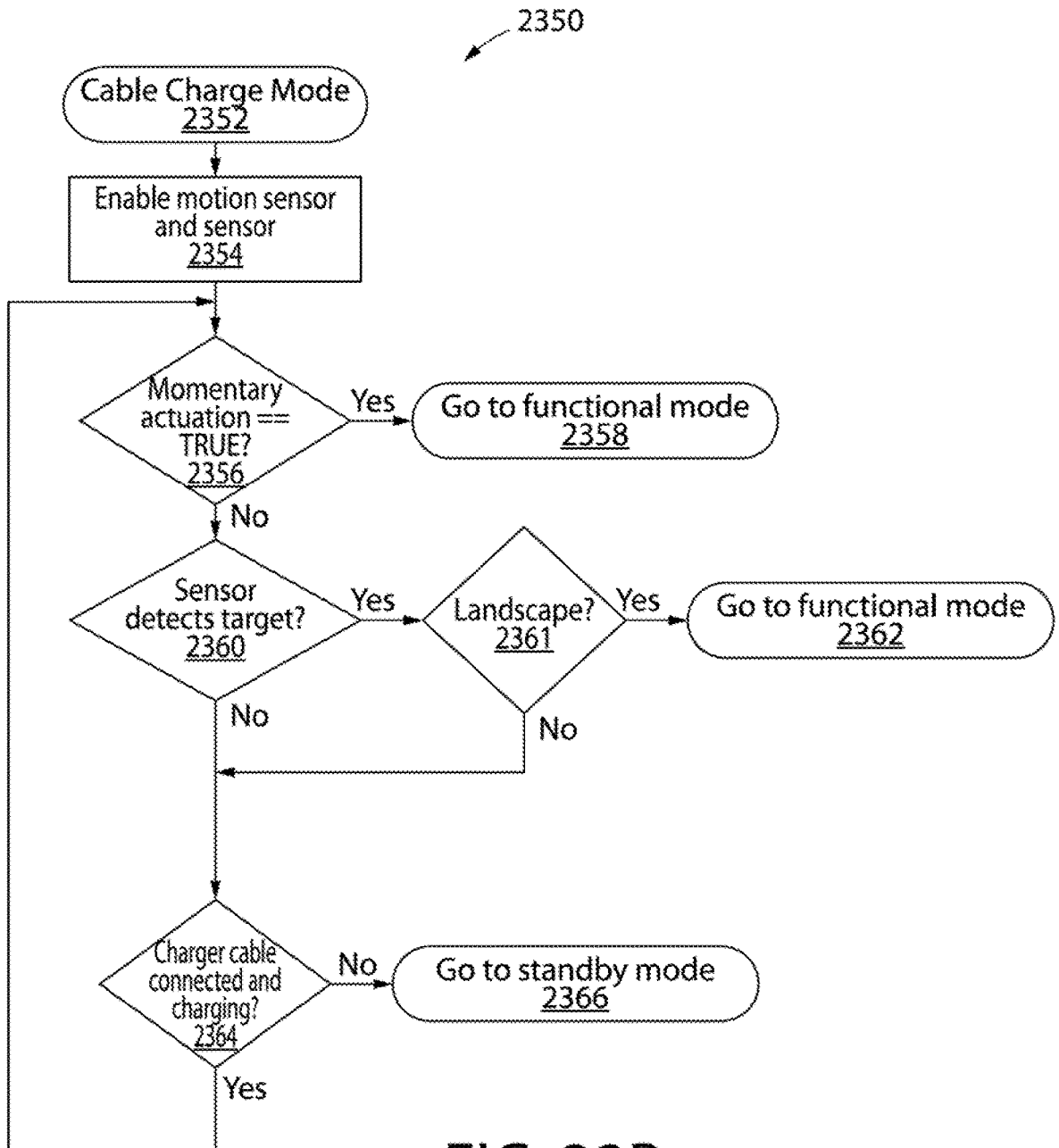
FIG. 32B is a flow chart describing a cable charge mode according to one embodiment.

FIG. 32B is a flow chart 2350 describing a cable charge mode 2352 according to one embodiment. Cable charge mode describes operations of the accessory when the accessory is charged by the cable charger. In this mode, the motion sensor can be enabled and the sensor can be enabled (operation 2354). If there is a momentary actuation of the actuator (operation 2356), the accessory can go to functional mode (operation 2358). Further, if the sensor detects the target (e.g., from being mounted to the cabinet) (operation 2360) and the accessory is in landscape (operation 2361), the accessory can go to functional mode (operation 2362). Further, if the charger cable is no longer connected and charging (operation 2364), the accessory can go to standby mode (operation 2366).

Figure 33:
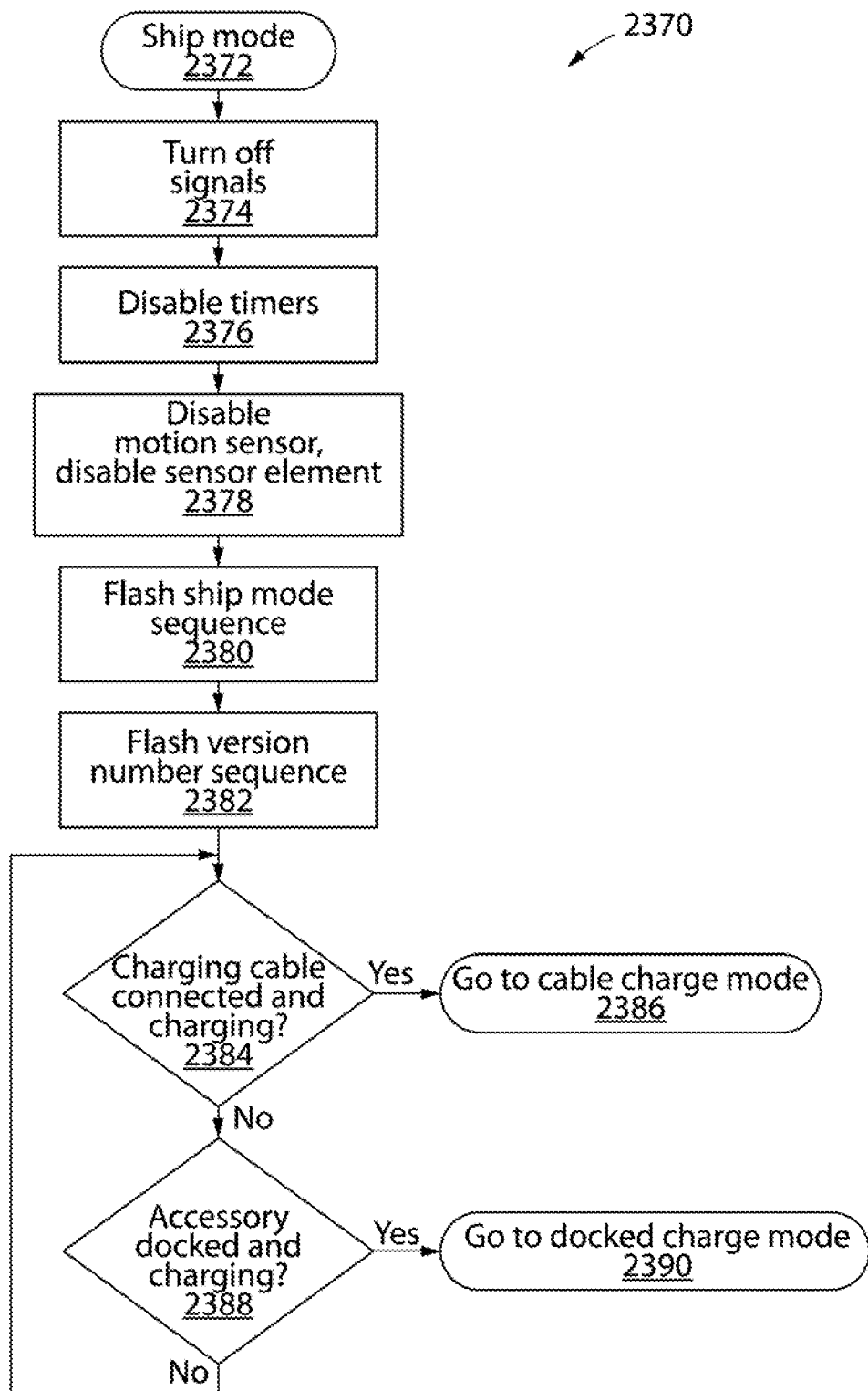
FIG. 33 is a flow chart describing a ship mode according to one embodiment.

FIG. 33 is a flow chart 2370 describing a ship mode 2372 according to one embodiment. In this mode, all background tasks can be disabled. When the ship mode 2372 is triggered, the accessory user perceptible signals (such green, red, and white LEDs, sounds, or the like) can be turned off (operation 2374), the accessory's timers can be disabled (operation 2376), and the accessory's sensor and the motion sensor can be disabled (operation 2378). Further, a ship mode sequence can be flashed (operation 2380). In one embodiment, the mode sequence is as follows: (1) green LED on for 1 seconds, (2) red LED on for 1 seconds, (3) red and white LED on for 1 seconds, (4) white LED on for 4 seconds, and (5) all LEDs off (including light source) for 2 seconds. Further, a version number sequence can be flashed (operation 2382). In one embodiment, the version number sequence is as follows: (1) flash major revision number on red LED, (2) red LED off for 2 seconds, (3) flash minor revision number on red LED. If the charging cable is connected and charging (operation 2384), the accessory goes to cable charge mode (operation 2386). If the accessory is docked and charging (operation 2388), the accessory goes to docked charge mode (operation 2390).

Figure 34A:
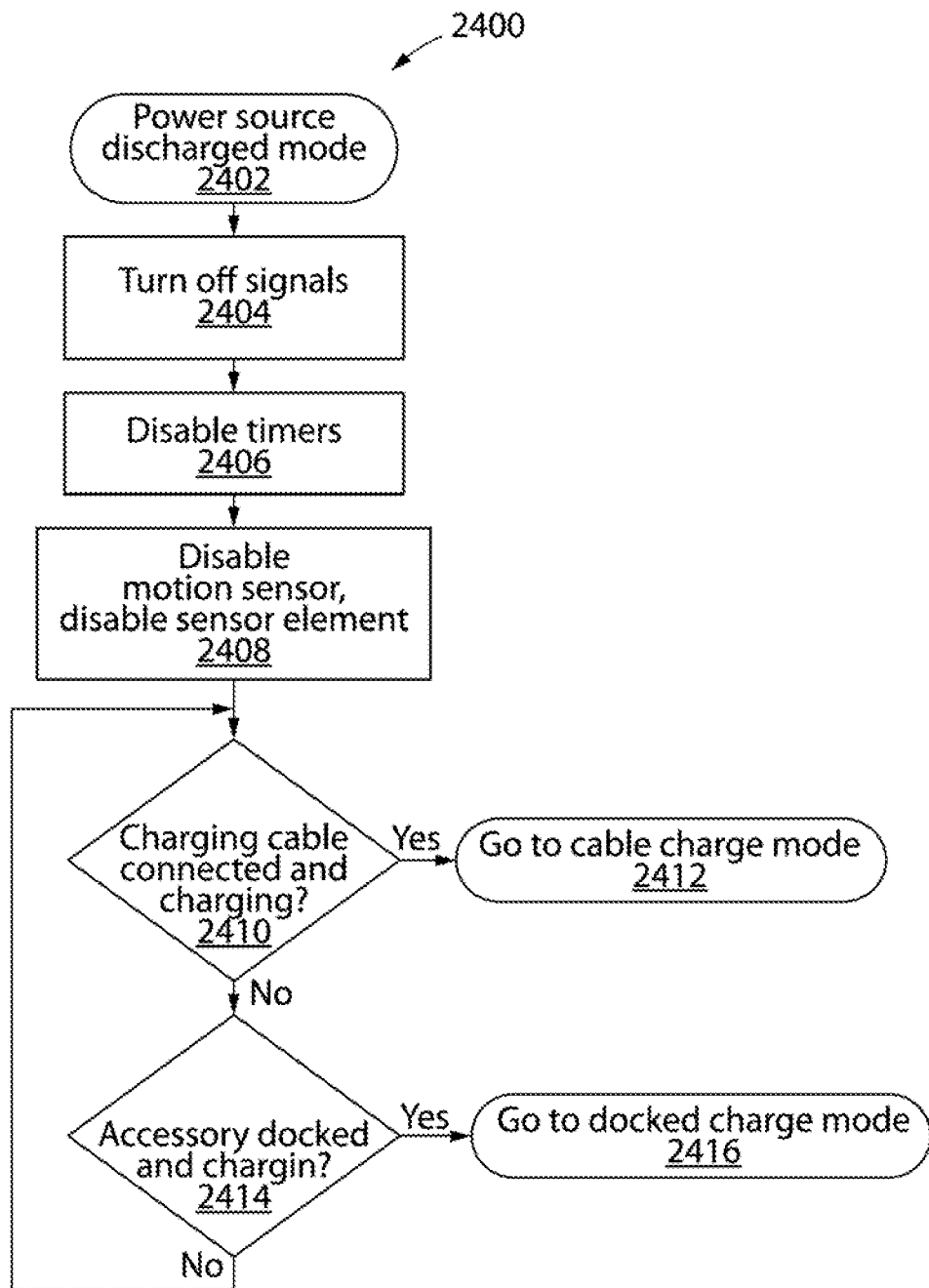
FIG. 34A is a flow chart describing a power source discharged mode according to one embodiment.

FIG. 34A is a flow chart 2400 describing a power source discharged mode 2402 according to one embodiment. In this mode, the power source has reached a discharged state. All background tasks can be disabled. Further, the accessory user perceptible signals (such as green, red, and white LEDs, or sounds) can be turned off (operation 2404), the accessory's timers can be disabled (operation 2406), and the accessory's sensor and the motion sensor can be disabled (operation 2408). If the charging cable is connected and charging (operation 2410), the accessory goes to cable charge mode (operation 2412). If the accessory is docked and charging (operation 2414), the accessory goes to docked charge mode (operation 2416).

Figure 34B:
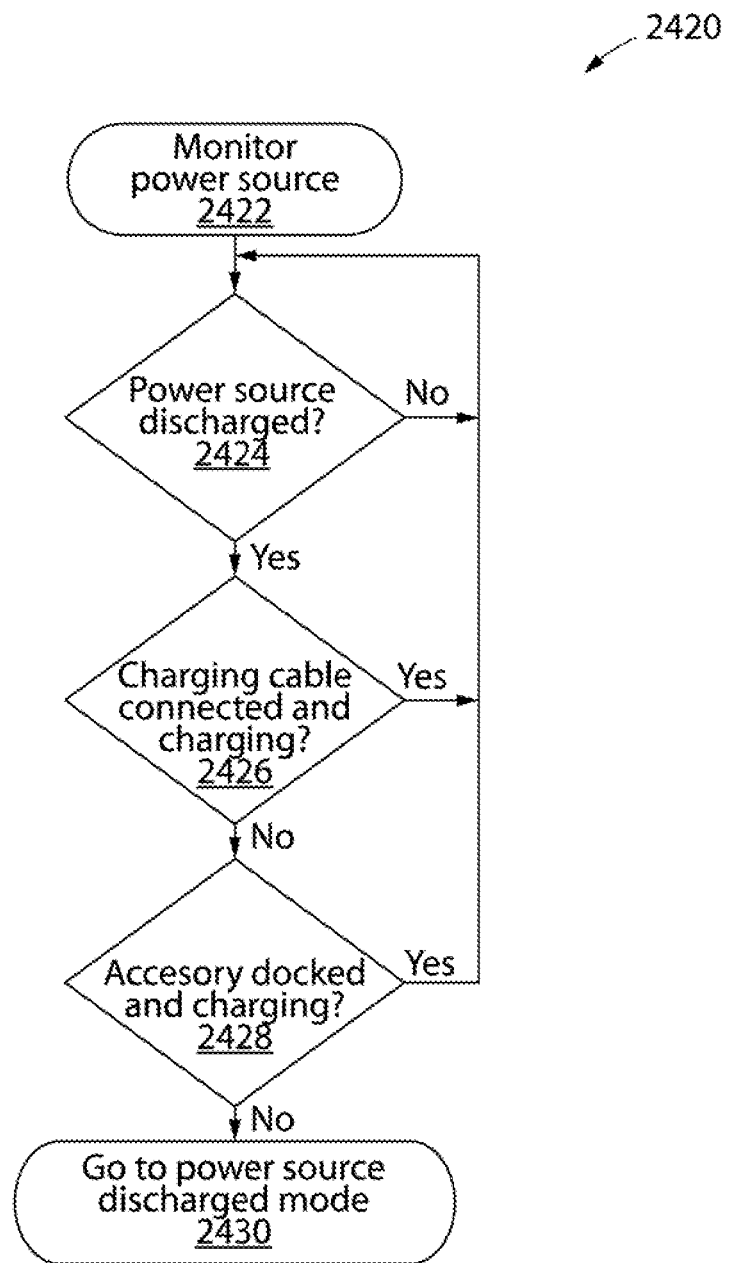
FIG. 34B is a flow chart describing a monitor power source sequence according to one embodiment.

FIG. 34B is a flow chart 2420 describing a monitor power source sequence 2422 according to one embodiment. In this sequence, if the power source is discharged (operation 2424), the charging cable is not connected and charging (operation 2426), and the accessory is not docked and charging (operation 2428), the accessory goes to power source discharged mode (operation 2430). Otherwise, the sequence returns to operation 2424 to again determine whether the battery is discharged.

Figure 35:
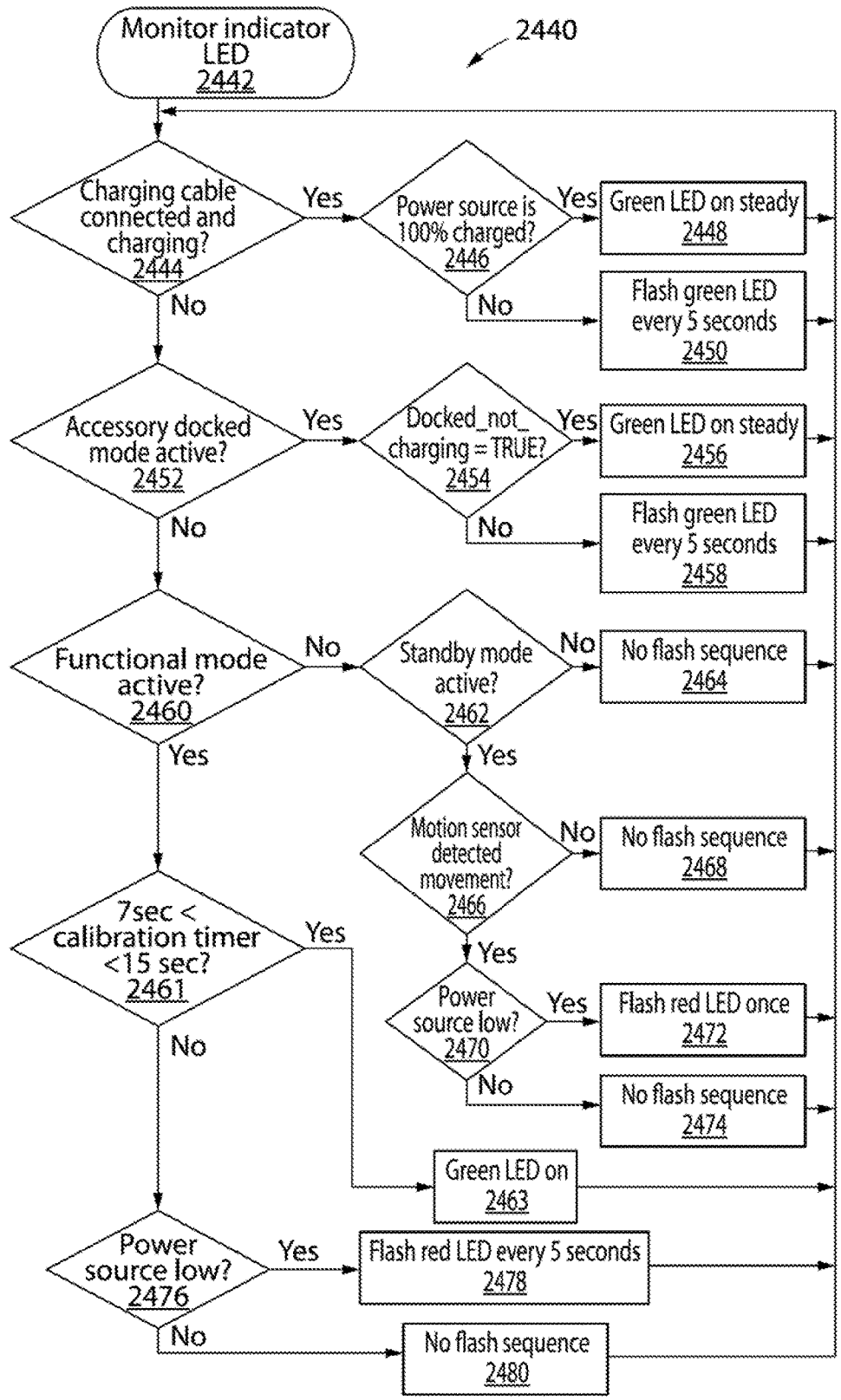
FIG. 35 is a flow chart describing a monitor indicator LED sequence according to one embodiment.

FIG. 35 is a flow chart 2440 describing a monitor indicator LED sequence 2442 according to one embodiment. This sequence can control the behavior of the indicator LEDs (in this embodiment, green and red LEDs), and can run in the background. It can be determined whether charging cable is connected and charging (operation 2444). If so, it can be determined whether the power source is 100% charged (operation 2446). If so, the green LED is on steady (operation 2448). If not, the green LED flashes every 5 seconds (operation 2450). Similarly if the accessory docked mode is active (operation 2452) and the accessory is docked and not charging (operation 2454), the green LED is on steady (operation 2456), while if the accessory is docked charging the green LED flashes every 5 seconds (operation 2458).

If the accessory is not charging or docked and functional mode is not active (operation 2460), it is determined whether standby mode is active (operation 2462). If not, there is no flash sequence (operation 2464). If standby mode is active, it is determined whether the motion sensor detected movement (operation 2466). If so, there is no flash sequence (operation 2468). If so, it is determined whether the battery is low (operation 2470). If so, the red LED flashes once (operation 2472). If not, there is no flash sequence (operation 2474).

If the accessory is not charging or docked and functional mode is active, and the calibration time is a predetermined time (e.g., between 7 and 15 seconds) (operation 2461), a green LED can be activated (which can be helpful to notify the person calibrating when he or she can release the button) (operation 2463). If the calibration is not the predetermined time, it is determined whether the power source is low (operation 2476). If so, the red LED flashes every 5 seconds (operation 2478). If not, there is no flash sequence (operation 2480). In other embodiments, other indicators can be used, other conditions can be set, and/or one or more of these operations can be omitted.

Figure 36:
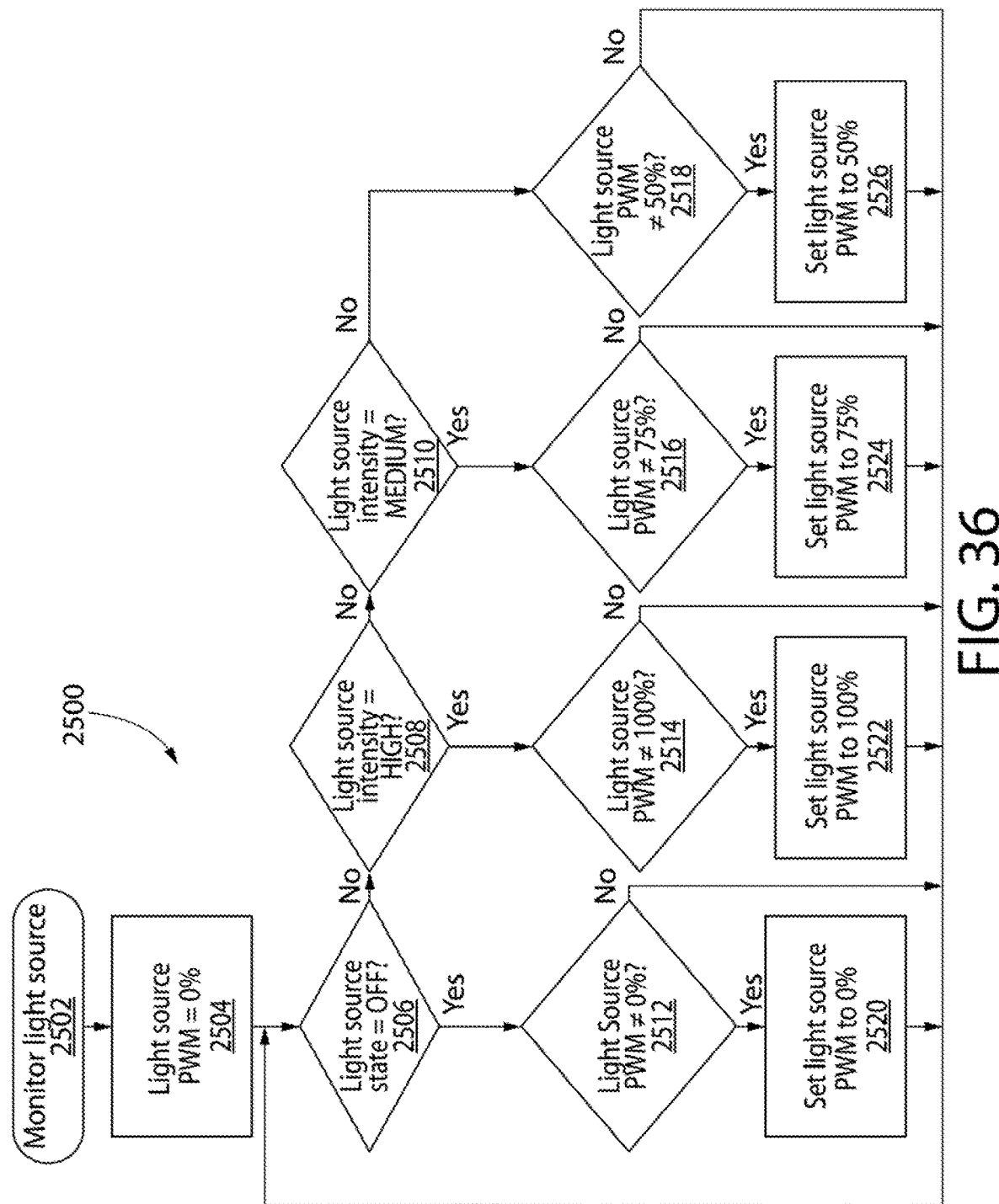
FIG. 36 is a flow chart describing a monitor light source sequence according to one embodiment.

FIG. 36 is a flow chart 2500 describing a monitor light source sequence 2502 according to one embodiment. This sequence can run in the background to control the intensity of the light source. The light source can have any number of intensities. In the exemplified embodiment, the light source has a high, medium, and low intensity, and can be turned off. Further, pulse width modulation (PWM) can be used to control the intensity of the light source. In the exemplified embodiment, a PWM of 50% corresponds to the low intensity, a PWM of 75% corresponds to the medium intensity, a PWM of 100% corresponds to a high intensity, and a PWM of 0% corresponds with the off condition.

The PWM can be set to 0% (operation 2504). If the light source state is off (operation 2506), and the light source PWM does not equal 0% (operation 2512), the light source PWM is set to 0% (operation 2520). If the light source PWM is 0%, there is a return to operation 2506.

If the light source intensity is high (operation 2508), there is a determination whether the light source does not equal 100% (operation 2514). If so, the light source PWM is set to 100% (operation 2522). If not, the sequence goes to operation 2506.

If the light source intensity is medium (operation 2510), there is a determination whether the light source does not equal 75% (operation 2516). If so, the light source PWM is set to 75% (operation 2524). If not, the sequence goes to operation 2506.

If the light source intensity is not off, high, or medium, the light intensity is low, and there is a determination whether the light source does not equal 50% (operation 2518). If so, the light source PWM is set to 50% (operation 2526). If not, there is a return to operation 2506.

Figure 37:
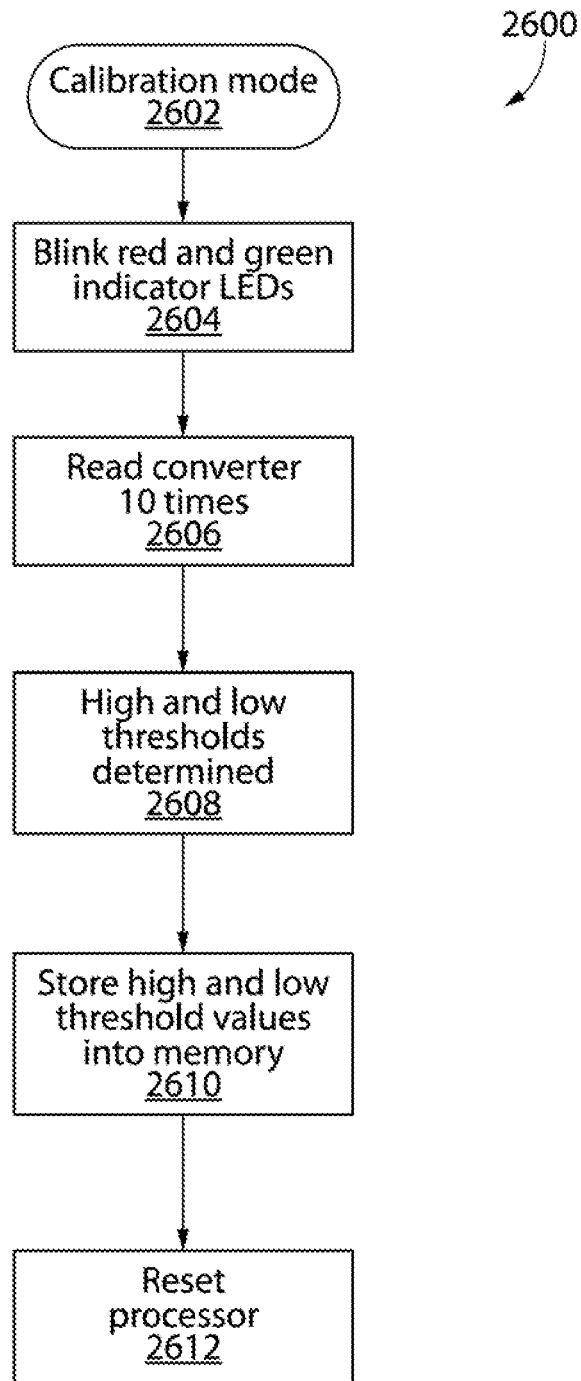
FIG. 37 is a flow chart describing a calibration sequence according to one embodiment.

FIG. 37 is a flow chart 2600 describing a calibration sequence 2602 according to one embodiment. Indicator LEDs (e.g., red and green) can blink (operation 2604). The converter (or sensor or other sensor element) can be read a predetermined number of times (e.g., 10 times) (operation 2606). In the exemplified embodiment, resonant frequency values of an LC circuit forming part of the sensor are read. Based on these readings, high and low thresholds are determined (operation 2608). In the exemplified embodiment, while the accessory is mounted to the support structure, the resonant frequency value is read 10 times. In one embodiment, the lowest measured frequency value is then determined. The high detection threshold is determined to be the lowest frequency value plus a predetermined number (e.g., 5000 Hz). The low detection threshold is the lowest frequency value minus a predetermined number (e.g., 5000 Hz). These high and low threshold values are stored in memory (operation 2610) and the processor is reset (operation 2612). In the exemplified embodiment, the high-to-low threshold band is 10000 Hz. Once the calibration is carried out, any time the measured resonant frequency value is between the high and low threshold values (i.e., within the band), there is a determination that the accessory is mounted to the support structure. While in the exemplified embodiment the threshold values are frequency values, the invention is not so limited. For example, inductance values (including inductance values based on resonant frequency readings) or impedance values can alternatively be used. Further, the invention is not limited to systems using LC circuits, as other types of sensors and sensor elements can be used.

Providing this calibration feature provides for more reliable detection of the accessory being mounted to the support structure. Calibrating enables the system to compensate for several factors, such as variances in the manufacturing of the metal target or other target in the support structure, variances in the distance between the target and the sensor, variances in the assembly of the components, and variances in the general environment in which the accessory and support structure are located. Calibration allows for each system to be individually calibrated for more reliable detection. Note, however, that the invention is not so limited. In other embodiments, such calibration can be omitted and default values can be used for detection of a target.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A system comprising:
a cabinet comprising:
a cabinet housing; and
a mirrored door coupled to the cabinet housing to form a cabinet storage compartment, the mirrored door comprising a first ferromagnetic element; and
an accessory sized and shaped to be capable of being stored within the storage compartment of the cabinet, the accessory comprising a second ferromagnetic element;
wherein the accessory can be mounted to the mirrored door by magnetic attraction between the first and second ferromagnetic elements
wherein the accessory further comprises an accessory housing and an accessory circuit; and
wherein the accessory circuit comprises an accessory power source disposed within the accessory housing and a sensor configured to cause the accessory circuit to transition from an inactive state to an active state.

2. The system according to claim 1, wherein the sensor is configured to cause the accessory circuit to transition from an inactive state to an active state upon the accessory being mounted to the mirrored door.

3. A system comprising:
a cabinet comprising:
a cabinet housing;
a door coupled to the cabinet housing to form a cabinet storage compartment, the cabinet storage compartment having a first depth measured from a rear surface of the cabinet housing and an inner surface of the door;
a support member within the cabinet storage compartment, the support member having a front surface; and
a power supply circuit;
a charger mounted to the front surface of the support member, the charger comprising a charging circuit in operable cooperation with the power supply circuit; and
an accessory comprising an accessory housing and an accessory circuit, the accessory circuit comprising, in operable cooperation, a power source and a user perceptible signal generator;
the accessory alterable between: (1) a charging state in which the accessory is mounted to the charger and the charging circuit provides power to the power source; and (2) a use state in which the accessory is decoupled from the charger;
wherein, in the charging state, the support member, the charger and the accessory are arranged in a horizontal stack having a cumulative depth that is less than or equal to the first depth.

4. The system according to claim 3 wherein the accessory further comprises: first mounting means that facilitate mounting of the accessory to the charger in the charging state;
and second mounting means that facilitate mounting of the accessory to the door in the use state.

5. The system according to claim 4 wherein the first mounting means are located on a rear surface of the accessory housing and the second mounting means are located on a bottom surface of the accessory housing.

6. The system according to claim 3 further comprising:
the accessory housing comprising a panel section comprising a rear surface of the accessory housing and a base section comprising a bottom surface of the accessory housing, the base section comprises a protruding portion that protrudes from the rear surface of the accessory housing; and
the charger comprising a charger housing having a front surface, a rear surface, and a side surface extending between the front and rear surfaces of the charger housing;
wherein, in the charging state, the panel section of the accessory is adjacent the front surface of the charger housing and the base section extends beyond the side surface of the charger housing such that the protruding portion of the base section extends toward the front surface of the support member and is adjacent the side surface of the charger.

7. The system according to claim 3 wherein a top surface of the support member forms a shelf.

8. A system comprising:
a cabinet comprising:
a cabinet housing;
a door coupled to the cabinet housing to form a cabinet storage compartment; and
a power supply circuit;
a charger mounted within the cabinet storage compartment, the charger comprising:
a charger housing; and
a charging circuit in operable cooperation with the power supply circuit, the charging circuit comprising an inductive element; and
an accessory comprising an accessory circuit comprising, in operable cooperation, an inductive element, a power source, and a user perceptible signal generator;
wherein the charger and the accessory are configured so that the accessory can be mounted to the charger in a first rotational orientation and a second rotational orientation, the inductive element of the accessory being in operable cooperation with the inductive element of the charger irrespective of whether the accessory is mounted to the charger in the first or second rotational orientations.

9. The system according to claim 8 wherein the second rotational orientation is 180 degrees from the first rotational orientation.

10. The system according to claim 8 wherein the accessory comprises a registration feature and the charger comprises a first registration feature and a second registration feature; wherein when the accessory is mounted to the charger in the first rotational position, the registration feature of the accessory mates with the first registration feature of the charger; and wherein when the accessory is mounted to the charger in the second rotational position, the registration feature of the accessory mates with the second registration feature of the charger.

11. The system according to claim 8 further comprising:
the accessory comprising an accessory housing having a panel section and a base section, the base section comprising a protruding portion that protrudes from a rear surface of the panel section; and
the charger housing having a front surface, a rear surface, and first and second side surfaces extending between the front and rear surfaces of the charger housing;
wherein when the accessory is mounted to the charger in the first rotational orientation, the rear surface of the panel section of the accessory is adjacent the front surface of the charger housing and the base section extends beyond the first side surface of the charger housing such that the protruding portion of the base section is adjacent the first side surface of the charger; and wherein when the accessory is mounted to the charger in the second rotational orientation, the rear surface of the panel section of the accessory is adjacent the front surface of the charger housing and the base section extends beyond the second side surface of the charger housing such that the protruding portion of the base section is adjacent the second side surface of the charger.

12. The system according to claim 8 wherein the charger comprises a first arrangement of magnets at a front surface of the charger housing; wherein the accessory comprises a second arrangement of magnets at a rear surface of the accessory; and wherein the first and second arrangements of magnets are configured to magnetically mate with one another to mount the accessory to the charger in both the first and second rotational orientations.

13. The system according to claim 8 wherein the accessory comprises at least one of a tablet, a smart phone, a radio, a television, or a touch screen.

\* \* \* \* \*